United States Patent
Suzuki

(10) Patent No.: US 7,140,088 B2
(45) Date of Patent: *Nov. 28, 2006

(54) TURNING TOOL FOR GROOVING POLISHING PAD, APPARATUS AND METHOD OF PRODUCING POLISHING PAD USING THE TOOL, AND POLISHING PAD PRODUCED BY USING THE TOOL

(75) Inventor: Tatsutoshi Suzuki, Yokkaichi (JP)

(73) Assignee: Toho Engineering Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/360,441

(22) Filed: Feb. 23, 2006

(65) Prior Publication Data

US 2006/0137170 A1   Jun. 29, 2006

Related U.S. Application Data

(60) Continuation of application No. 10/828,911, filed on Apr. 21, 2004, now Pat. No. 7,017,246, which is a division of application No. 10/026,504, filed on Dec. 19, 2001, now Pat. No. 6,869,343.

(51) Int. Cl.
*B23P 13/00* (2006.01)
*B23B 27/16* (2006.01)
*B23B 27/04* (2006.01)

(52) U.S. Cl. ............... 29/557; 407/67; 407/69; 407/70; 407/117; 407/113; 82/1.11

(58) Field of Classification Search .......... 29/27 C, 29/557, 50; 407/67, 69, 70, 113–117; 82/1.11
See application file for complete search history.

(56) References Cited

U.S. PATENT DOCUMENTS

| | | | |
|---|---|---|---|
| 798,856 | A | 9/1905 | Wetter |
| 1,410,451 | A | 3/1922 | Bullard et al. |
| 1,416,843 | A | 5/1922 | Labonte |
| 2,701,192 | A | 2/1955 | Maass |
| RE25,955 | E | 2/1966 | Emmons |
| 3,466,721 | A | 9/1969 | Binns |
| 4,063,841 | A | 12/1977 | Niman, Jr. |
| 4,474,721 | A | 10/1984 | Carpenter |
| 5,031,491 | A | 7/1991 | Hofmann |
| 5,067,377 | A | 11/1991 | Dona et al. |
| 5,205,678 | A | 4/1993 | Britsch et al. |

(Continued)

FOREIGN PATENT DOCUMENTS

JP    47-16044    6/1972

(Continued)

OTHER PUBLICATIONS

The Science of CMP; Aug. 20, 1997; pp. 113-119; Chapter 4, Part III "Structure and Feature of the polishing pad". (Partial Translation).

*Primary Examiner*—Erica Cadugan

(74) *Attorney, Agent, or Firm*—Rossi, Kimms & McDowell, LLP

(57) ABSTRACT

Disclosed is a turning tool for cutting circumferential grooves into a surface of a polishing pad formed of a resin material and utilized for polishing semiconductor devices. The turning tool comprising a cutting part arranged to have a tooth width within a range of 0.005–1.0 mm, a wedge angle within a range of 15–35 degrees, and a front clearance angle within a range of 65–45 degrees. A polishing pad effectively formed by using the turning tool, and an apparatus and a method of producing such a polishing pad by utilizing the turning tool are also disclosed.

16 Claims, 46 Drawing Sheets

U.S. PATENT DOCUMENTS

| | | | |
|---|---|---|---|
| 5,329,735 | A | 7/1994 | Charlton et al. |
| 5,370,023 | A | 12/1994 | Morgan et al. |
| 5,398,458 | A | 3/1995 | Henriksen et al. |
| 5,578,362 | A | 11/1996 | Reinhardt et al. |
| 5,921,855 | A | 7/1999 | Osterheld et al. |
| 5,984,769 | A | 11/1999 | Bennett et al. |
| 6,206,759 | B1 | 3/2001 | Agarwal et al. |
| 6,227,771 | B1 | 5/2001 | Lagerberg et al. |
| 6,238,271 | B1 | 5/2001 | Cesna |
| 6,241,585 | B1 | 6/2001 | White |
| 6,340,325 | B1 | 1/2002 | Chen et al. |
| 6,406,363 | B1 | 6/2002 | Xu et al. |
| 6,439,989 | B1 | 8/2002 | Reinhardt et al. |
| 6,464,563 | B1 | 10/2002 | Lensing |
| 6,488,575 | B1 | 12/2002 | Agarwal et al. |
| 6,520,847 | B1 | 2/2003 | Osterheld et al. |
| 6,544,104 | B1 | 4/2003 | Koike et al. |
| 6,561,891 | B1 | 5/2003 | Eppert et al. |
| 6,572,445 | B1 | 6/2003 | Laursen |
| 6,602,436 | B1 | 8/2003 | Mandigo et al. |
| 6,632,129 | B1 | 10/2003 | Goetz |
| 6,641,471 | B1 | 11/2003 | Pinheiro et al. |
| 6,656,019 | B1 | 12/2003 | Chen et al. |
| 6,656,030 | B1 | 12/2003 | Xu et al. |
| 6,685,548 | B1 | 2/2004 | Chen et al. |
| 6,688,957 | B1 | 2/2004 | Tolles |
| 6,736,714 | B1 | 5/2004 | Dudovicz |
| 6,749,485 | B1 | 6/2004 | James et al. |
| 6,749,714 | B1 | 6/2004 | Ishikawa et al. |
| 6,758,735 | B1 | 7/2004 | Blalock |
| 6,783,436 | B1 | 8/2004 | Muldowney |
| 6,852,020 | B1 | 2/2005 | Petroski et al. |
| 6,869,343 | B1 | 3/2005 | Suzuki |
| 6,893,325 | B1 | 5/2005 | Robinson |
| 7,017,246 | B1 * | 3/2006 | Suzuki .................. 29/50 |
| 2003/0003857 | A1 | 1/2003 | Shimagaki et al. |
| 2004/0014413 | A1 | 1/2004 | Kawahashi et al. |

FOREIGN PATENT DOCUMENTS

| | | |
|---|---|---|
| JP | 63-22002 | 6/1988 |
| JP | 11-70463 | 3/1999 |
| JP | 2000-94303 | 4/2000 |
| JP | 2001-018164 A | 1/2001 |
| JP | 2002-011630 A | 1/2002 |

* cited by examiner

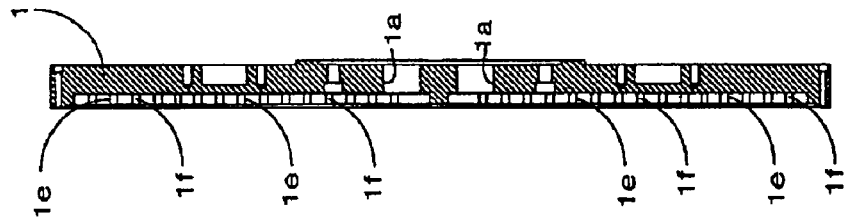
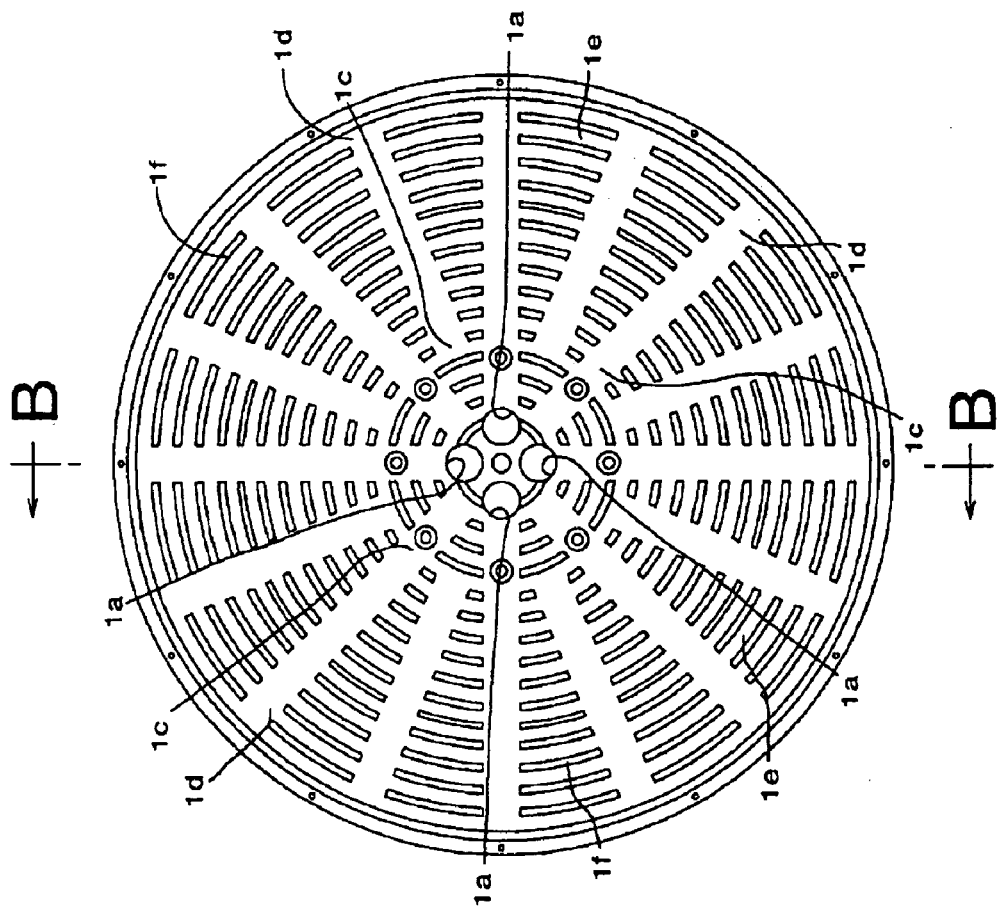

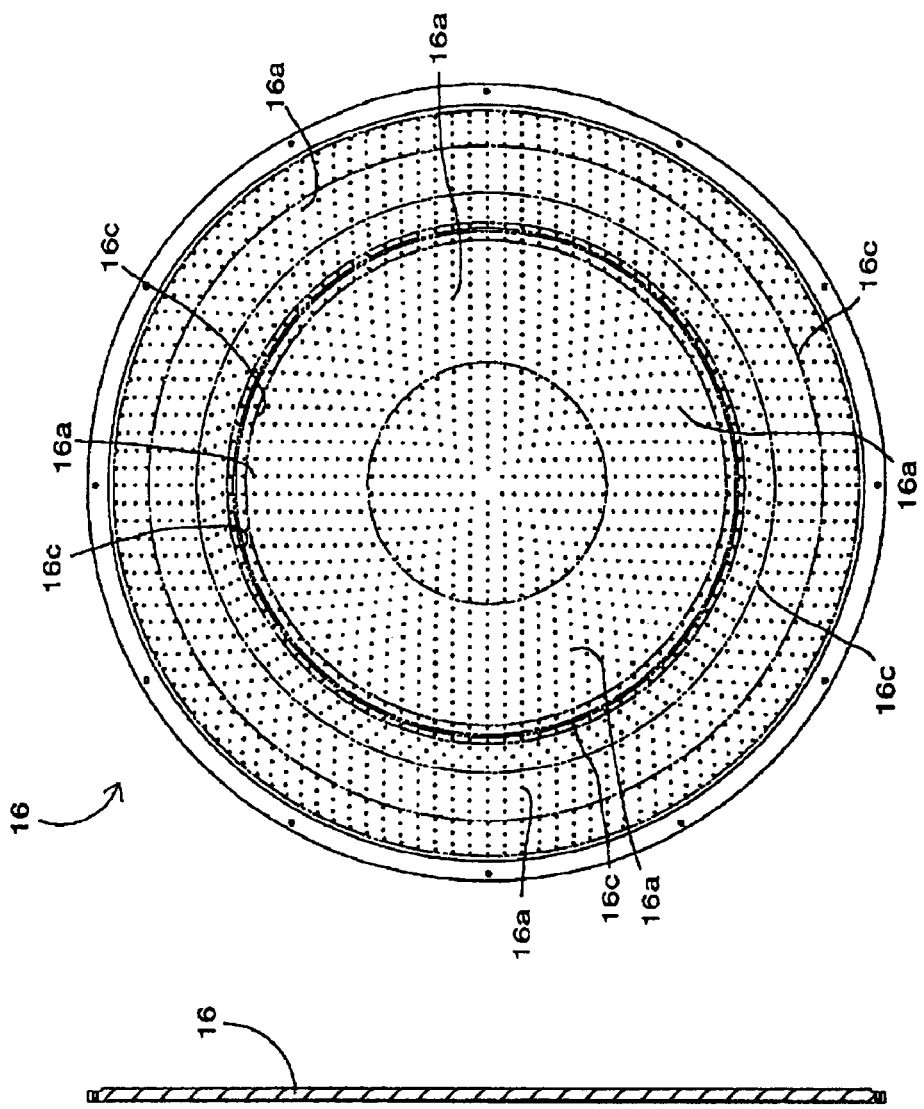
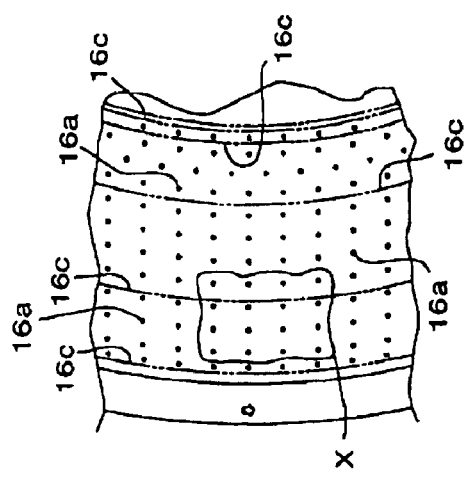

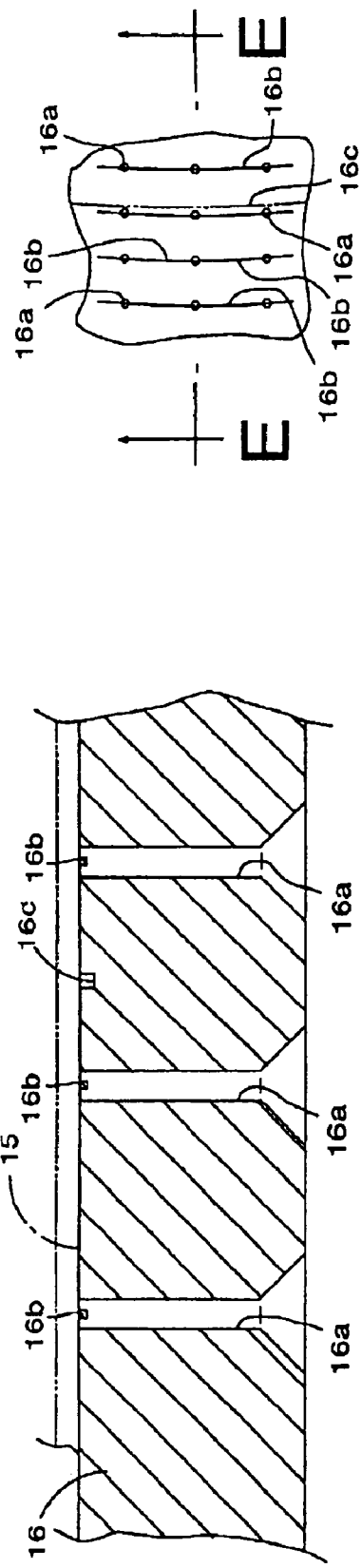

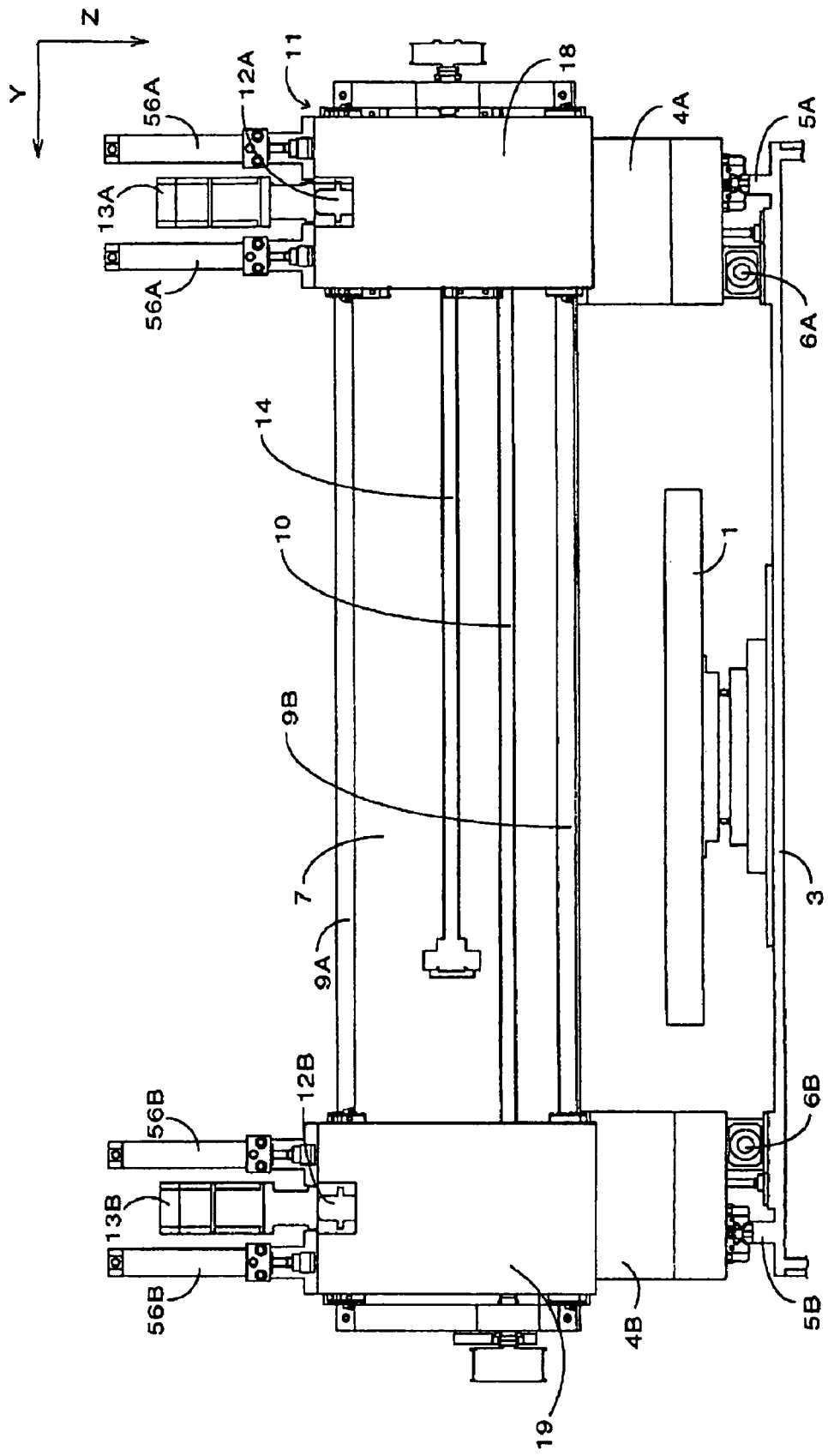

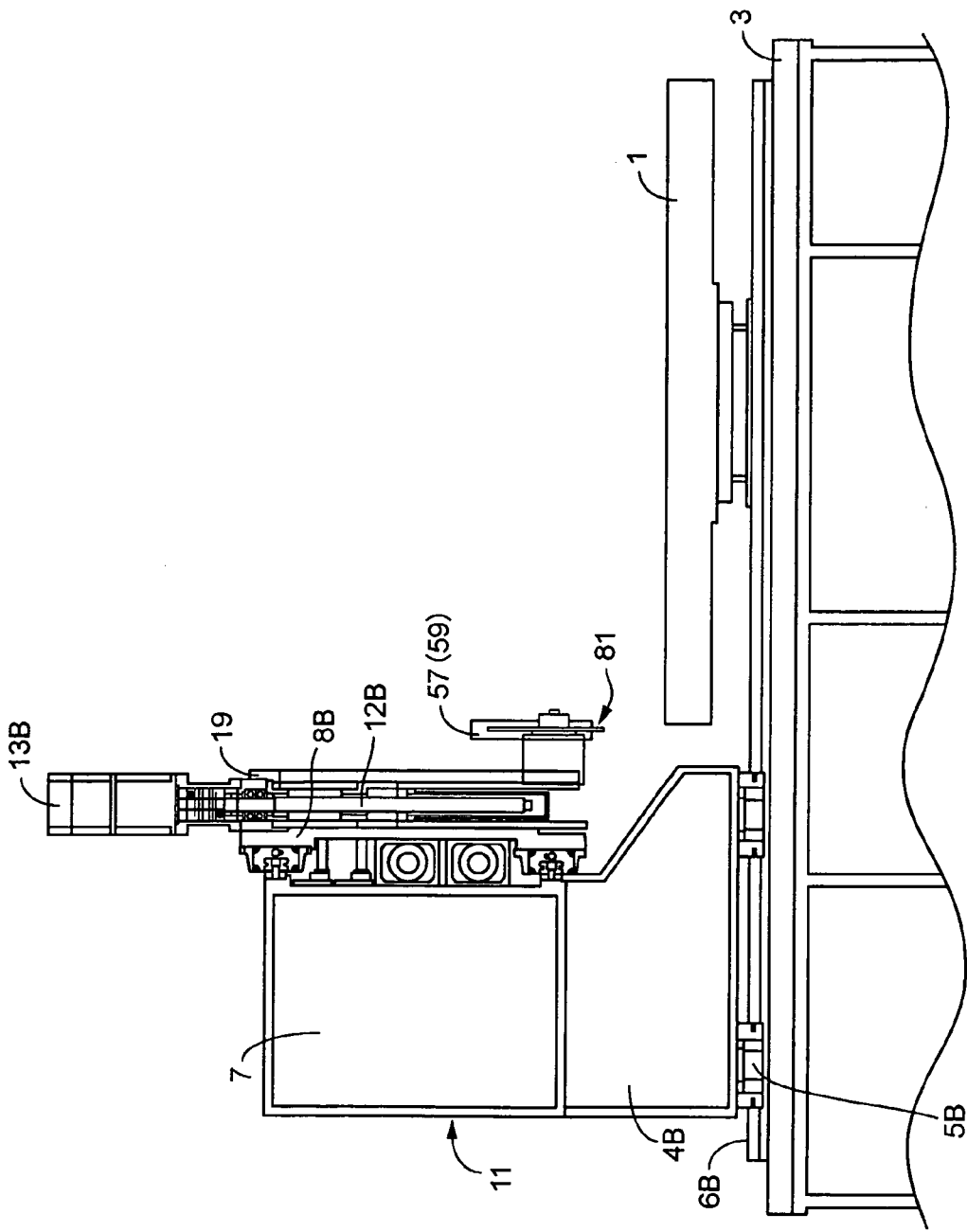

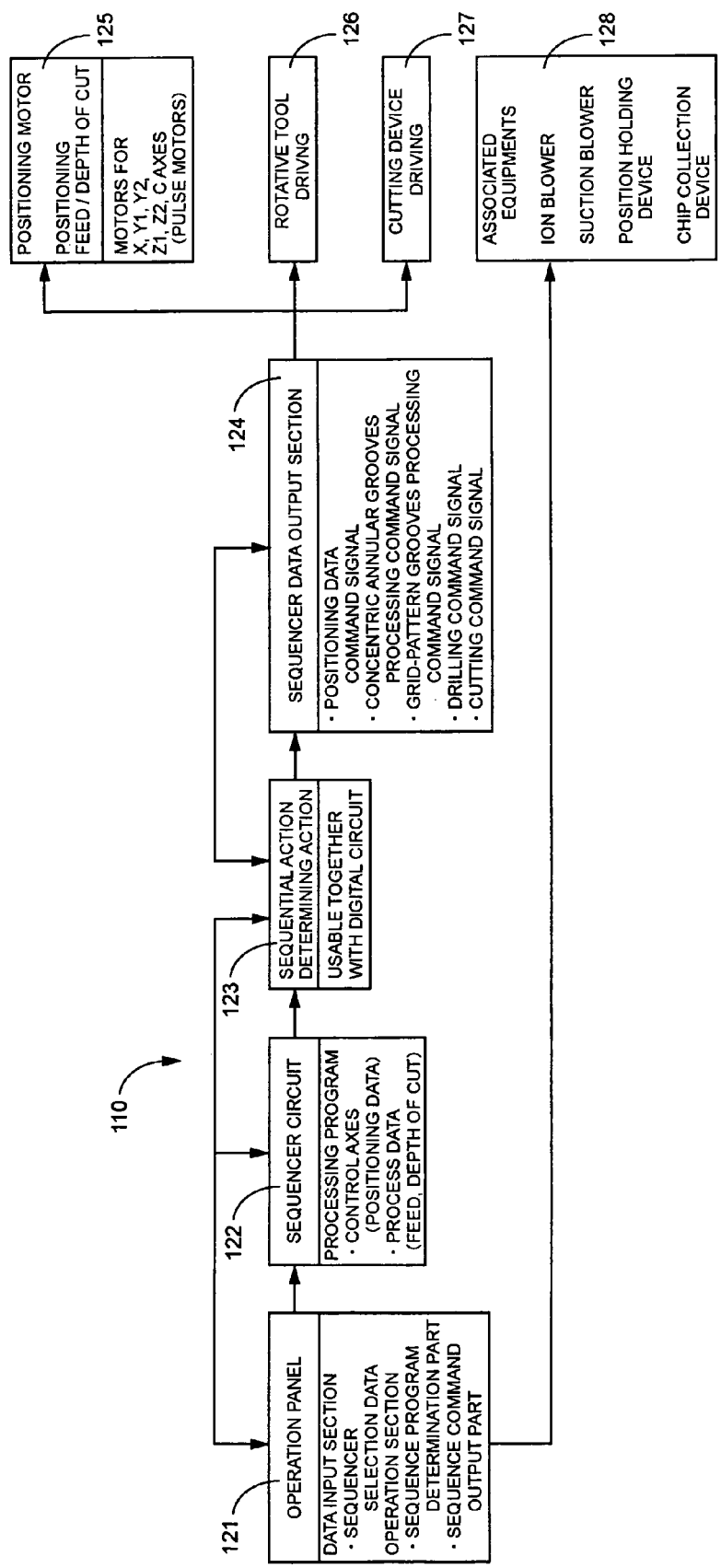

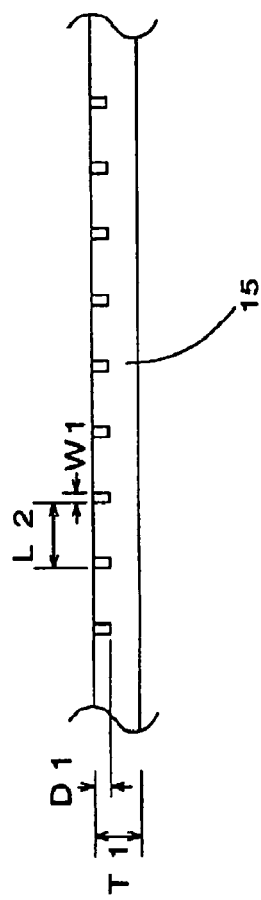
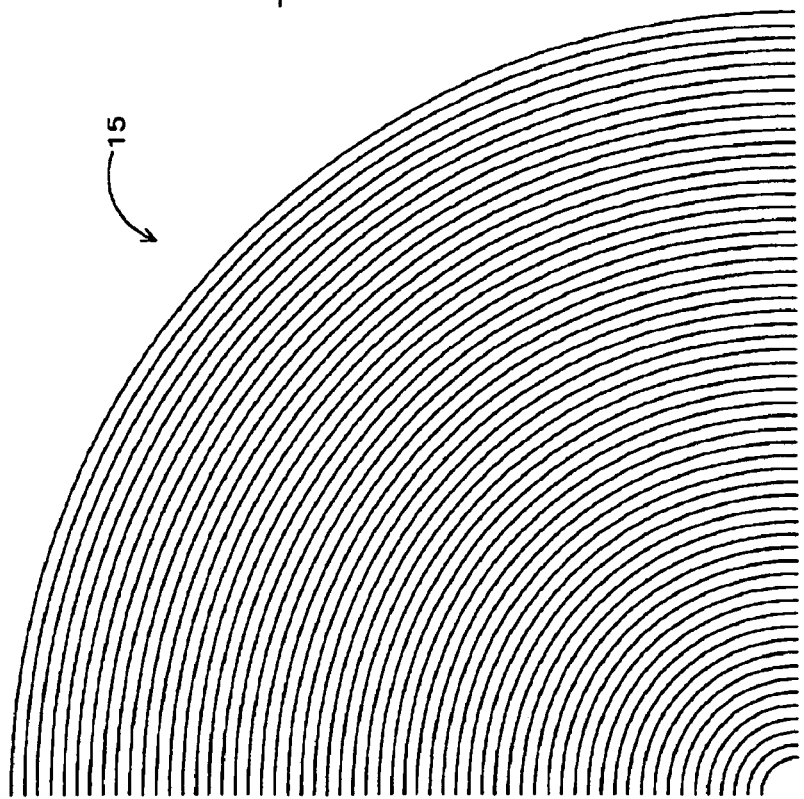

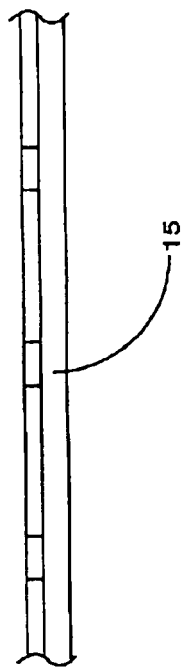
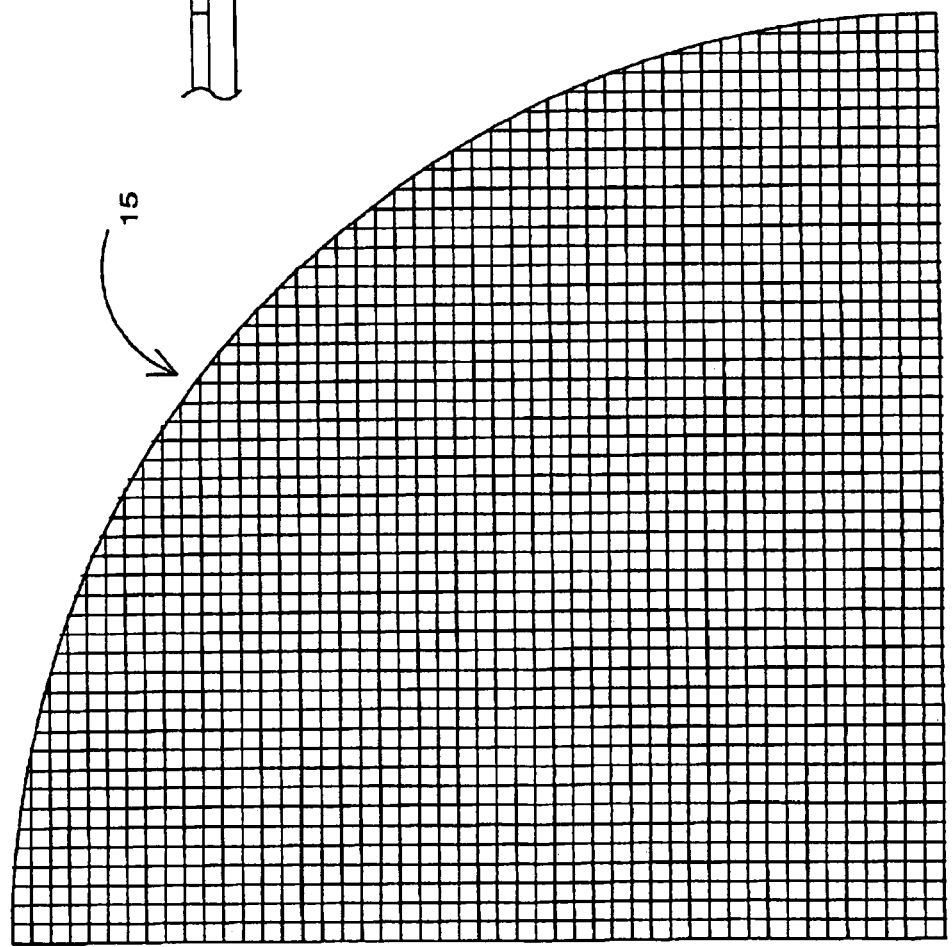

30 / 1

100 / 1

↓ V-SHAPED GROOVES

DULLED EDGE

TURNING TOOL FOR GROOVING POLISHING PAD, APPARATUS AND METHOD OF PRODUCING POLISHING PAD USING THE TOOL, AND POLISHING PAD PRODUCED BY USING THE TOOL

This application is a Continuation of U.S. patent application Ser. No. 10/828,911 filed Apr. 21, 2004, now U.S. Pat. No. 7,017,246, which itself is a Division of U.S. patent application Ser. No. 10/026,504 filed Dec. 19, 2001, now U.S. Pat. No. 6,869,343.

BACKGROUND OF THE INVENTION

1. Field of the Invention

The present invention relates to a turning tool for producing a polishing pad made of a resin material and usable in the fabrication of semiconductor devices, especially for chemical mechanical polishing (CMP) executed for planaraizing surfaces of semiconductor wafers or devices. The present invention further relates to a polishing pad effectively formed by using the turning tool, and an apparatus and a method of producing such a polishing pad by utilizing the turning tool.

2. Description of the Related Art

In the semiconductor fabrication processes, a substrate, e.g., a silicon wafer, may undergo multiple masking, etching, implantation, and dielectric and conductor deposition processes, to thereby form a lamination of various kinds of thin layers such as metallic layers and insulative layers. Between each processing steps, it is usually necessary to polish or planarize an outer or upper most surface of the wafer to obtain a substrate surface having a high degree of planarity. Chemical mechanical polishing (hereinafter referred to as "CMP") is one of known methods of planarization. CMP typically involves placing the wafer mounted on and rotated about an axis of a carrier against a polishing pad mounted on and rotated about an axis of a platen, and pushing the wafer against the polishing pad while supplying a polishing slurry at an interface between the upper most surface of the wafer and the polishing pad. The polishing slurry consists of fine abrasive particles and suitable kind of liquid in which the abrasive particles are dispersed. Typically, the polishing pad is made of a foamed rigid-resin material, so that a surface of the polishing pad has a cellular structure of independent-cell type in which cells are independent of each other or of open-cell type in which cells are communicated with each other, in order to facilitate conditioning of the slurry distribution between the wafer and the polishing pad.

Namely, the polishing pad for CMP is required to be capable of evenly distributing the slurry over a substantially entire area of the upper most surface of the wafer that is to be polished, while preventing a stay or clogging of the slurry at a local portion of the upper most surface of the wafer. The polishing pad for CMP is further required to be capable of promoting renewal of the slurry.

To meet these requirements, conventionally employed polishing pads for CMP are arranged to have polishing surfaces formed with respective predetermined patterns, e.g., a pattern of recess or a pattern of checked grooves intersecting at right rights. After a number of polishing runs, the polishing pad having the pattern of recesses may suffer from variation of diameter of the recesses, whereby the pad suffers from difficulty in exhibiting a desired chemical mechanical polishing effect with high stability. In the case of the polishing pad having the pattern of checked grooves, a polishing condition is likely to vary in the radial direction of the polishing pad, whereby the pad suffers from a high tendency of occurrence of uneven wearing of its surface, resulting in uneven polishing.

Another known example of conventionally employed polishing pad for CMP is disclosed in U.S. Patent Publication Nos. U.S. Pat. Nos. 5,921,855 and 5,984,769. The disclosed polishing pad is provided with a plurality of annular grooves open in its polishing surface. The plurality of annular grooves are arranged in a generally concentric or coaxial relationship with each other, and are dimensioned to have a width of not smaller than 0.38 mm and a depth of not smaller than 0.51 mm, and are uniformly spaced with a pitch of 2.29 mm in a radial direction of the polishing pad. However, the disclosed polishing pad suffers from inherent structural problems, namely, difficulty in forming grooves extending in a circumferential direction in the polishing pad and difficulty in ensuring a sufficient dimensional accuracy of the grooves.

More specifically described, the annular grooves may be formed on the polishing surface of the polishing pad by embossing with a die, or alternatively may be formed by milling with a saw blade on a mill. In the former case, each of the formed annular grooves is prone to have a dull shape, especially at its open-end edge portions, so that the width of the groove varies in its depth direction. This causes undesirable variation of the groove width, especially when the polishing surface of the polishing pad is worn or is conditioned by the dressing process, resulting in unstable polishing conditions. In the latter case, since the annular grooves are formed by milling of the saw blade on the mill, the formed annular grooves is likely to extend straightly to some extent, making it difficult to form a groove having a small width and a small radius of curvature. This makes it impossible to form a desired polishing pad in which annular grooves having a relatively small width are formed on a radially inner portion of its polishing surface as well as a radially intermediate and a radially outer portion of its polishing surface. In view of a recent tendency of employing a large-diameter wafer, e.g., a wafer having a diameter within a range of 200 mm–300 mm or more, the presence of useless area in the radially inner portion of the polishing surface of the polishing pad undesirably causes an enlargement in size of the polishing pad. Therefore, the problem of the radially inner useless area of the polishing pad becomes very significant.

Alternatively, the annular grooves may possibly be formed by turning with a turning tool. However, since the polishing pad is formed of a specific material having somewhat elasticity, e.g., a foamed rigid-resin material, it is significantly difficult to cut an annular groove having a relatively small width and having a relatively small radius of curvature into the polishing pad, with high dimensional accuracy. In the light of the physical property of the polishing pad, conventionally available tool for cutting a work piece made of metal or a rigid-resin material, are not suitable to cut the polishing pad. For instance, the tools for cutting the metallic or rigid-resin working piece are likely to interfere with the walls of each groove, thereby possibly producing burrs or other defects in the walls of the grooves. Thus, the conventionally available tools are incapable of cutting the small-width and small-radius grooves into the surface of the polishing pad having the somewhat elasticity, like the foamed rigid-resin members.

Moreover, the conventionally employed polishing pad disclosed in the above-mentioned U.S. Patents has the generally concentric annular grooves that have a relatively large width and are uniformly spaced at the relatively large pitch. Further, the disclosed polishing pad includes a backside pad made of a compressed felt fibers leached with urethane, which has an elasticity larger than that of the polishing pad and which is fixed the backside of the urethane pad. Thus, the disclosed polishing pad is mounted on a platen of an optional CMP system via the backside pad. This type of conventional polishing pad has been developed to be applied to planarization of a substrate having multilevel interconnections in which metallic interconnect has a width of 0.25 μm, that is a most advanced technology at the time when applications for the above-mentioned U.S. Patents were filed (i.e., 1997–1998). Namely, the type of polishing pad has been developed to provide the substrate surface having a planarity at a level of 0.3 μm. In the light of the fact that the substrates having multilevel interconnections whose metallic interconnect has a width approximately of 0.18 μm, 0.15 μm and 0.1 μm dominate the recent market, it is apparent that the CMP is now required very sophisticated techniques, i.e., to provide the substrate surface having a high planarity at a level of 0.25 μm or lower. Thus, the conventional polishing pad disclosed in the above U.S. Patents is insufficient for ensuring currently required polishing accuracy and polishing efficiency, and accordingly is unsuitable to be used for CMP for a planarization of a currently developed substrate of multilevel interconnection, which includes interconnect metal layers made of a soft cupper or gold.

In the conventional polishing pad disclosed in the above-indicated U.S. Patents, the grooves having a relatively large width and the backside pad cooperate to allow a deformation of the polishing surface, whereby the polishing surface of the polishing pad is likely to be deformed according to peaks and valleys in a surface of a substrate to be polished, i.e., along with topography of upper most surface of the substrate. However, this surface deformation mechanism of the conventional polishing pad is insufficient to keep pace with the currently required level of polishing accuracy. In addition, the use of the backside pad, which is formed differently from the polishing pad, evidently has pushed up a manufacturing cost of the polishing pad.

SUMMARY OF THE INVENTION

It is therefore a first object of the invention to provide a novel turning tool for cutting circumferential grooves, e.g., a multiplicity of generally concentric annular grooves into a surface of a polishing pad formed of a resin material and utilized for polishing semiconductor devices. The turning tool is capable of forming the fine circumferential grooves with a sufficiently small width and with high dimensional accuracy and high stability. The turning tool enables to form the small-width circumferential grooves in the radially inner portion of the polishing surface of the polishing pad, with ease.

It is a second object of the invention to provide a novel method of producing a polishing pad formed of a resin material and usable for polishing semiconductor devices, by utilizing a special turning tool constructed according to the present invention. The method enables to form circumferential grooves, e.g., a multiplicity of generally concentric annular grooves on a surface of the polishing pad with a sufficiently small width and with high dimensional accuracy and high stability, over a sufficiently wide area of the surface of the polishing pad including a radially inner portion of the surface of the polishing pad.

It is a third object of the invention to provide a polishing pad formed of a resin material and usable for polishing semiconductor devices, which is novel in construction, which is suitably produced by using a special turning tool specific working tool constructed according to the present invention, and which is effectively usable for chemical mechanical polishing of a substrate of multilevel interconnection structure in which a width of a metallic interconnection is set to about 0.1 μm.

It is a fourth object of the invention to provide a machine for forming grooves on a polishing pad, which is novel in construction, which utilizes a special turning tool constructed according to the present invention, and which is capable of easily cutting circumferential grooves e.g., a multiplicity of circumferential annular grooves into a surface of the polishing pad such that the grooves have a relatively small width and spaced apart from each other with a relatively small radial pitch.

The above and/or other objects may be attained according to at least one of the following aspects of the invention. The following preferred forms of the respective aspects of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the disclosure in the whole specification and drawings.

The above-indicated first object of the invention may be achieved according to a first aspect of the invention which provides a turning tool for cutting circumferential grooves into a surface of a polishing pad formed of a resin material and utilized for polishing semiconductor devices, the turning tool comprising: a cutting part arranged to have a tooth width within a range of 0.005–1.0 mm, a wedge angle within a range of 15–35 degrees, and a front clearance angle within a range of 65–45 degrees.

The turning tool of the invention comes into fruition as a result of a large number of experiments and extensive studies on grooving of a polishing pad made of a resin material, which were conducted by the inventor of the present invention. In particular, the turning tool of the invention has been developed as a special turning tool capable of cutting desired fine grooves with high dimensional accuracy into the polishing pad made of the resin material in both of a solid state and a foamed state. One of the significant technical features of the turning tool of the present invention is that the wedge angle which is made significantly shape in comparison with general turning tools adapted to cut metallic work pieces, and the front clearance angle is made sufficiently larger than that of the general turning tools. Although such a general turning tool adapted to cut metallic work piece may be used for cutting work pieces made of rigid synthetic resin materials, such as engine plastics, polyamide resin, and the like, the general turning tool is not able to process with sufficient dimensional accuracy the polishing pad made of the resin material whose hardness is smaller than those of the rigid-synthetic resin materials. This clearly shows significant difficulty or specialty in cutting the circumferential grooves into the polishing pad made of the resin material. In particular, the present turning tool enables to cut fine circumferential grooves with high dimensional accuracy into such a polishing pad made of a foamed rigid-resin material, e.g., a foamed urethane pad, and a polishing pad made of a solid resin material whose hardness is generally similar to that of the polishing pad formed of the foamed rigid-resin material.

The turning tool constructed according to the present invention is capable of cutting into the polishing pad made of the resin material the circumferential grooves having a width of 1.0 mm or smaller, with high dimensional accuracy and without occurrence of burrs in the walls of the grooves. Namely, the turning tool of the present invention makes it possible to stably cut the circumferential grooves into the surface of the polishing pad with a slight infeed rate, and to accurately form the desired grooves in the very inner circumferential portion of the circular work piece. It should be appreciated that the term "circumferential grooves" should be interpreted to mean grooves extending in a circumferential direction of the polishing pad, e.g., a multiplicity of generally annular generally concentric grooves, and a spiral groove or grooves. Preferably, the tooth width is held within a range of 0.1–1.0 mm.

The turning tool constructed according to the present invention may be made of known materials such as hard metal, high speed steel, carbon steel, ceramics, cermet, and diamonds. In the turning tool of the present invention, actual values of the wedge angle and the front clearance angle may be suitably determined within the above-indicated range, taking into account a hardness or other specific physical properties of the work piece, i.e., the polishing pad made of the resin material. It is noted that, if the wedge angle of the turning tool is set to 15 degrees or smaller, the life of the turning tool is shorten, although the cutting ability of the tool is improved. If the wedge angle of the turning tool is set to 35 degrees or larger, the cutting ability of the tool is deteriorated, resulting in a high possibility of occurrence of defects, such as burrs, in the surface of the grooves. The turning tool of the present invention has the wedged angle arranged within a range of 15–35 degrees, thus making it possible to produce a fine cutting into the polishing pad formed of the solid resin material or the foamed rigid-resin material. Therefore, the turning tool of the present invention is capable of preventing occurrence of burrs on the surface of the grooves, while assuring high processing accuracy. It is also noted that if the front clearance angle of the turning tool is set to 45 degrees or smaller in the case where the cutting grooves have relatively small radius of curvatures, the side surfaces of the cutting part of the turning tool is likely to interface with the radially outer walls of the cutting grooves. This results in deterioration of a dimensional accuracy of the grooves, due to occurrence of burrs, recesses and/or protrusions in the surface of the groove walls, and dulled open-end edges of the grooves. Further, the front clearance angle of 65 degrees or larger may adversely effect on the life of the cutting parts of the turning tool.

According to a first preferred form of the turning tool of the invention, the cutting part of the turning tool has a rake angle within a range of 20–10 degrees. It is noted that if the rake angle is set to 20 degrees or larger, the cutting part of the turning tool is prone to cut undesirably into the inside of the polishing pad. On the other hand, if the rake angle is set to 10 degrees or smaller, the cutting ability of the turning tool is deteriorated.

According to a second preferred form of the turning tool of the invention, the cutting part has a side clearance angle with respect to a radially outer wall of each of said grooves, which is held within a range of 0–3 degrees. This arrangement enables to prevent or avoid interface between the radially outer wall of each groove and the cutting part of the turning tool with high stability, thus making it possible to form the grooves with high dimensional accuracy of its radially outer wall portion, even if a radius of curvature of the groove is relatively small. An actual values of the side clearance angle may be suitably determined within the above-indicated range, taking into account a hardness or other specific physical properties of the work piece, i.e., the polishing pad made of the resin material, and the value of the front clearance angle of the tool, so that the cutting part of the turning tool is less likely to interface or cut into the radially outer wall of the each groove. If the side clearance angle exceeds 3 degrees, durability or processability of the cutting part of the tool may be deteriorated, so that the side clearance is preferably set to 2 degrees or smaller. On the other hand, the side clearance angle of the cutting part with respect to a radially inner wall of each of the grooves can be set at around 0 degrees, since an interfere between the cutting part of the turning tool and the radially inner wall of the each groove is less likely to occur.

According to a third preferred form of the turning tool of the invention, the turning tool includes a plurality of cutting parts which are arranged in a predetermined direction with a pitch within a range of 0.2–2.0 mm. The turning tool according to this preferred form makes it possible to cut a plurality of generally concentric grooves with a width within a range of 0.005–1.0 mm and with a radial pitch of 0.2–2.0 mm with high efficiency. Preferably, the cutting parts are arranged in a predetermined direction with a generally constant pitch. According to the actual experiment conducted by the inventor of the present invention, a tool having a single cutting part according to the present invention needs one hour or more for cutting an optional number of generally concentric annular grooves into an optional base for the polishing pad, while a multi edged tool having a plurality of cutting parts constructed according to this preferred form of the turning tool of the invention can do the same work in minuets. It should be appreciated that such a multi-edged tool may be provided by utilizing a toll tip or a plurality of tool tips each having a plurality of cutting parts integrally formed thereon, or alternatively by utilizing a plurality of cutting-part chips each having a single cutting part, which are fixed together. Specific preferred form of the multi-edged tool will be described hereinafter.

A first advantageous form of the multi-edged tool includes a plate-like shaped tool tip having a plurality of cutting parts integrally formed at one of edge portions thereof so as to protrude outwardly from the one of the edge portions. Preferably, a plurality of the tool tips are fixedly arranged with each other so as to align in a width direction thereof so that the cutting parts of the tool tips cooperate to form a multiplicity of cutting parts. Yet preferably, the turning tool of the invention further comprises a predetermined tool-tip holder to which the plurality of the plate-like shaped tool tips are detachably fixed, so that the tool-tip holder and the plurality of tool tips cooperate to constitute a tool unit.

A second advantageous form of the multi-edged tool includes a plurality of cutting tips each having one cutting part, and the plurality of cutting tips are detachably fixed to each other so that cutting parts of the plurality of cutting tips cooperate to form a plurality of cutting parts. Preferably, the plurality of cutting tips are superposed on and integrally fixed to one another with spacers interposed adjacent ones of the cutting tips so that the spacers function to keep a pitch of the plurality of cutting tips. Preferably, the turning tool of the invention further comprises a cutting-tip holder to which the plurality of cutting tips are detachably fixed, so that the cutting-tip holder and the cutting tips cooperate to constitute a unit tool.

According to a fourth preferred form of the turning tool of the invention, the cutting part has a tip portion arcuately curved in a width direction thereof so that the tip portion has two end parts opposed in the width direction, wherein the two end parts of the tip portion protrudes outwardly from an intermediate part of the tip portion in a direction perpendicular to the width direction.

In the turning tool according to the fourth preferred form, the two end parts of the tip portion of the cutting part are initially brought into contact with the polishing pad as the working piece, upon a start of the cutting process. This arrangement permits an excellent and smooth engagement of the cutting part of the turning tool with the surface of the polishing pad, even in the case where the polishing pad is formed of a constrictive member, e.g., a solid resin member and a foamed rigid-resin member, thus preventing undesirable dulling of the edge in the open end portion of the formed groove, in other words, undesirable increase of the width of the groove at the open end portion of the groove. Therefore, a polishing pad having grooves formed by using the cutting tool according to this preferred form of the first aspect of the invention, is capable of ensuring a desirable distribution of slurry, and does not suffer from undesirable distribution of the slurry due to the presence of the dulled edges in the open-end edge portions of the grooves. Further, the smooth engagement of the cutting part of the turning tool of this preferred from effectively prevent that a local portion of the polishing pad is excessively compressed by the cutting part of the cutting tool which is forcedly pressed thereon, in an attempt to ensure the engagement of the cutting part with the surface of the polishing pad, and is then damaged at a limiting point.

According to a fifth preferred form of the turning tool of the invention, the cutting part has a tip portion being serrated. Like the arcuately curved cutting part as described above, the cutting part of this preferred form permits an excellent and smooth engagement thereof with the surface of the polishing pad. In the turning tool of this preferred form, it is desirable that a face, a front clearance face and a tooth surface may be provided with a fine polishing traces extending in one direction e.g., a turning direction, or may be polished extremely smoothly, for thereby facilitating flows of the cutting chips along these surfaces. Preferably, the side surfaces of the cutting part of this turning tool may be serrated.

The above-indicated second object of the invention may be achieved according to a second aspect of the invention, which provides a method of producing a polishing pad made of a resin material, comprising the steps of: (a) positioning a turning tool constructed according to the first aspect of the invention, relative to a base for the polishing pad made of the resin material; (b) rotating the cutting part of the turning tool and the base for the polishing pad relative to each other about an axis of the base for the polishing pad, so as to cut circumferential grooves into a surface of the base, such that radially inner most one of the circumferential grooves has a radius of curvature of 10 mm or smaller.

This method of the present invention makes it possible to form by turning fine circumferential grooves having a relatively small width into the base for the polishing pad made of a specific material such as a solid resin material or a foamed rigid-resin material, with high dimensional accuracy and ease. Moreover, the present method enables to form such fine accurate grooves in a very radially inner portion of the base for the polishing pad.

According to a first preferred form of the method of the present invention, the turning tool is selected from the group of consisting of the turning tools of the above-described third preferred form of the first aspect of the invention, the first advantageous form of the third preferred form of the first aspect of the invention, and the second advantageous form of the third preferred form of the first aspect of the invention, and the circumferential grooves comprises a multiplicity of generally concentric annular grooves, wherein the method further comprises the steps of: (c) simultaneously cutting the multiplicity of generally concentric annular grooves into the surface of the base of the polishing pad such that the radially inner most one of said multiplicity of generally concentric annular grooves has a radius of curvature of 10 mm or smaller.

In this preferred form of the method of the invention, the use of the specific multi-edged turning tools constructed according to the present invention enables to form the multiplicity of fine generally concentric annular grooves into the surface of the base for the polishing pad with an accurate dimensioned pitch and with high processing efficiency.

According to a second preferred form of the method of the invention, the turning tool is adapted to cut the circumferential grooves into the surface of the base for the polishing pad at a feed per revolution of 0.005–0.05 mm/rev in a depth direction of the base. This arrangement establish an excellent turning condition for cutting the grooves by the present turning tool into the base for the polishing pad which is made of a resin material in a solid state or a foamed state, e.g., a foamed urethane pad. Since the cutting of the grooves is performed at the above-indicated slight feed per revolution, it is possible to sequentially cut the surface of the base for the polishing pad without pressing the surface of the base for the polishing pad. Further, this method permits a smooth cutting of the fine circumferential grooves into the base for the polishing pad with high stability, without any defects such as undesirable cutting of the turning tool into the base and occurrence of burrs in the surface of the formed grooves. Preferably, the cutting parts and the base are rotated relative to each other at a speed of 50–300 rev/min. It is noted that the speed in the turning or cutting method according to the present invention may be desirably determined, taking into account physical properties of the base, quality of the cutting part and/or radius of curvatures of grooves to be formed.

According to a third preferred form of the method of the invention, the method further includes the step of blowing ionic fluid toward a vicinity of the cutting parts to neutralize the base for the polishing pad and chips which are electrically charged due to execution of the step of cutting by the turning tool the circumferential grooves into the surface of the base for the polishing pad.

Upon cutting the base for the polishing pad made of the resin material by the present turning tool, the base and the tool are brought in frictional contact with each other, thus generating static electricity having higher voltage. This may cause that the chips are electrically charged and tend to adhere to the surface of the base and cutting part or parts of the turning tool. To eliminate this drawback, the ionic fluid is blown to the vicinity of the cutting part(s), thus neutralizing the electrically charged chips. This arrangement is effective to avoid undesirable damages of the surface of the grooves due to the presence of the cutting chips adhered to the surface of the grooves or cutting parts of the tool. The blowing of the ionic fluid may be executed continuously or discontinuously, or may be executed as needed. Preferably, the ionic fluid is blown together with the compressed air, so that the charged chips are neutralized and blown away from the surface of the base for the polishing pad, simultaneously.

The above-indicated third object of the invention may be achieved according to a third aspect of the invention, which provides a polishing pad, which is effectively formed by using the turning tool constructed according to a first aspect of the invention, the polishing pad comprising: (a) a base made of a resin material; and (b) circumferential grooves open in a surface of the base, wherein the grooves have a width within a range of 0.005–1.0 mm, a depth of 0.2–2.0 mm, and a pitch of 0.2–2.0 mm, and wherein radially inner most one of the circumferential grooves has a radius of curvature of not larger than 10 mm.

In the polishing pad constructed according to the present invention, the circumferential grooves have a relatively small width and a sufficiently small pitch, in comparison with the known polishing pads as disclosed in the above-indicated U.S. Patent Publication Nos. U.S. Pat. Nos. 5,921,855 and 5,984,769. This specific structure of the polishing pad of the present invention, which is distinguishable from that of the conventional polishing pads, enables that the surface of the polishing pad is deformed along a surface of a semiconductor device, e.g., a wafer with improved accuracy, thus ensuring an excellent surface polishing with high accuracy. Described more specifically, the conventional polishing pad requires an elastic backside pad fixed to the backside of a base for the conventional polishing pad so as to absorb or compensate a relatively large local deformation in the front surface of the base caused by bending of grooved portions of the base. Namely, the wall thickness of the base for the conventional polishing pad is decreased at the grooved portion. Since the grooves have a relatively large width, the grooved portion is likely to be bent, resulting in the large local deformation of the front surface of the base. Therefore, the conventional polishing pad needs the elastic backside pad to be deformed along the surface of the wafer with desired accuracy. On the other hand, the polishing pad according to the present invention is effectively arranged to sufficiently decrease a width of partitions interposed between adjacent ones of the grooves and a width of each groove, thereby minimizing an amount of local deformation in the surface of the polishing pad due to bending of the grooved portions, while allowing elastic deformation of the partitions so as to expand toward the respective grooves disposed opposite sides of the partitions (i.e., expand in its radially opposite directions). This makes it possible that the surface of the polishing pad is deformed along the surface of the wafer with high accuracy, owing to the elastic deformations of the partitions, thus ensuring a significantly high accurate polishing of the semiconductor devices, that is never achieved by the conventional polishing pad. The polishing pad of the present invention is capable of suitably polishing semiconductor devices having interconnects made of soft metallic materials and arranged with a slight spacing therebetween. For instance, the polishing pad of the present invention enables for the first time to polish and planarize a substrate having multilevel interconnections whose interconnect line has a width of 0.18 µm, 0.15 µm and/or 0.1 µm, with a high planarity level of 0.25 µm or lower.

Further, the polishing pad constructed according to the present invention can eliminate the need for the backside pad that is essentially required in the conventional polishing pad, making it possible to simplify the structure of the polishing pad and to manufacture the polishing pad with high efficiency. Therefore, the polishing pad can be directly fixed to a platen of a polishing device for polishing semiconductor devices, without needing an elastic layer, such as the elastic backside pad interposed therebetween. This is because the present polishing pad permits an accurate surface deformation along the surface of the wafer on the basis of the elastic deformation of the partitions, whereas the conventional polishing pad utilizes an elastic backside pad to cause its surface to be deformed along the surface of the wafer.

Preferably, the width of the each groove is arranged within a range of 0.1–0.3 µm so that the polishing pad can be deformed along the surface of the wafer with further improved accuracy, owing to the elastic deformation of the partitions interposed between adjacent ones of the grooves. More preferably, the depth of the each grooves is arranged within a range of 0.1–0.4 µm, thereby improving durability of the polishing pad and minimizing an amount of change of properties of the polishing pad due to a dressing process or the like.

As is understood from the aforementioned description, the present polishing pad is different from the conventional polishing pad in the mechanism for ensuring the desired surface deformation of the polishing pad along with the surface of the wafer. This distinguishably advantageous structure of the present invention permits that the polishing pad and the surface of the wafer to be polished are pressed against with each other with a reduced pressing force, thereby further facilitating flows of the slurry interposed between the polishing pad and the surface of the wafer, and assuring substantially even distribution of the pressing force over an entire area of the surface of the wafer to be polished. Accordingly, the polishing pad constructed according to the present invention permits an excellent polishing and planarization of the surface of the semiconductor devices with extremely high accuracy.

Preferably, the circumferential grooves comprises a multiplicity of generally concentric annular grooves which are formed over a sufficiently large area of the front surface of the polishing pad including a very radially inner portion. Namely, the radially inner most groove of the polishing pad has the radius of curvature of 1.0 mm or smaller. This arrangement makes it possible to effectively increase a region of the polishing pad serving for polishing, without increasing the diameter of the polishing pad. This arrangement is also effective to keep pace with recent tendency of enlargement of wafer, with ease. It should be appreciated that the use of the turning tool constructed according to the first aspect of the invention enables to form such an annular groove having a relatively small radius of curvature.

It is noted that if the groove width is smaller than 0.005 mm, it becomes difficult to form such a fine groove by turning and to control the distribution of the slurry desirably. If the groove width is larger than 1 mm, the polishing pad is likely to be excessively bent at its grooved portions, resulting in deterioration of polishing accuracy. Preferably, the groove width is set within a range of 0.1–1.0 mm. Further, if the generally concentric grooves are formed with a pitch of smaller than 0.2 mm, the polishing pad is likely to suffer from a hydroplane phenomenon depending upon a viscosity of the slurry. If the generally concentric grooves are formed with a pitch of larger than 2.0 mm, the polishing pad is less likely to deform accurately along with the surface of the wafer, resulting in deterioration of polishing accuracy. The pitch of the grooves may be desirably determined, taking into account a required polishing accuracy, a kind of material of interconnects of the semiconductor device, or the like. Generally, the pitch of the grooves is determined within a range of 1.0–2.0 mm.

Preferably, the radially outer most one of the grooves has a radius of curvature of not less than 100 mm.

Yet preferably, the radially inner most one of the grooves has a radius of curvature of not larger than 10 mm, and the polishing pad has a diameter which is made smaller than that of the working piece. This polishing pad constructed according to this preferred form is effectively used for polishing a significantly large sized wafer, e.g., a wafer having a diameter of not smaller than 200 mm. Since the radially inner useless area of the polishing pad is effectively minimized, the polishing pad of this preferred form makes it possible to polish such a large-sized wafer without increasing a diameter thereof.

It may be possible to vary the pitch of the grooves in the radial direction of the polishing pad. For instance, the grooved portion of the surface of the polishing pad may be divided into three regions, namely, an inner circumferential region, an intermediate region, and an outer circumferential region. The pitch of the grooves may desirably vary among the three regions so that the polishing pad may polish evenly the surface of the semiconductor device.

It may also be possible that the circumferential grooves are spaced apart from each other in the radial direction of the polishing pad with a constant pitch. This arrangement facilitates a manufacture of the polishing pad, and stabilizes a desirable deformation of the surface of the polishing pad following the surface of the wafer on the basis of the elastic deformation of the partitions interposed between adjacent ones of the grooves.

According to another preferred form of the polishing pad of the present invention, the base for the polishing pad is made of a rigid urethane foam and the circumferential grooves are formed with a width of 0.20–0.30 mm, a depth of 0.1–1.0 mm, more preferably 0.1–0.4 mm and a pitch of 1.0–2.0 mm. In this form of the polishing pad, kinds of the rigid urethane foam are not particularly limited. Preferably, the base is formed of a rigid urethane foam having a density at around 700 $kg/m^3$ and a tensile strength of 50 $kg/cm^3$ or more. More preferably, the rigid-urethane foam includes cells having a diameter at around 0.02 mm at the volume ratio of 30%. In this respect, a rigid urethane foam used as packing material, generally has a density at around 100 $kg/m^3$ and a tensile strength at around 15 $kg/cm^3$. It should be appreciated that a solid resin member may also form the base.

The above-indicated fourth object of the invention may be achieved according to a fourth aspect of the invention, which provides a machine equipped with a turning tool constructed according to the first aspect of the invention and adapted to form a polishing pad constructed according to a third aspect of the present invention. The machine for grooving a base for a polishing pad made of a resin material, comprises (a) a bed; (b) a platen including a hollow shaft member supported by the bed via bearing so that the hollow shaft member is rotatably about a C-axis which is perpendicular to the bed, a suction plate fixed to one of opposite axial end portion of the hollow shaft member remote from the bed and formed with a plurality of through holes arranged evenly over an entire area thereof for attracting the base for the polishing pad to be placed on the suction plate; (c) drive mechanism for rotating the platen about the C-axis and for positioning the platen at a suitable angular position; (e) a gate-shaped column having two legs which are opposed to each other with a spacing therebetween and a cross rail extending between and being perpendicular to the two legs, the gate-shaped column being movable in a direction of X-axis with the cross rail extending across the platen; (f) at least one saddle mounted on the cross rail so as to be movable in a direction of Y-axis extending along with the cross rail; (g) a tool rest mounted on the saddle so as to be independently reciprocally movable in a direction of a Z-axis, the tool rest adapted to detachably hold a fixed tool comprising the turning tool constructed according to the first aspect of the invention; (h) drive motors for moving and positioning the platen, the column and the saddle and the tool rest; and (i) a numerical control apparatus totally control an operation of the drive motor, wherein the hollow shaft member of the platen is connectable to an external air suction device so as to attract the base for the polishing pad on the suction plate by a suction force applied from said air suction device to said base for said polishing pad, and wherein the machine is operable to cut by the turning tool circumferential grooves into a surface of the base of the polishing pad with the base for the polishing pad being attracted on the suction plate.

The machine constructed according to the fourth object of the present invention, makes it possible to form by turning the circumferential grooves on the surface of the base for a thin polishing pad, which is made of a resin material in a solid state or a foamed state, e.g., a rigid urethane foam, by using a specific turning tool constructed according to the first aspect of the present invention. The circumferential grooves can be formed with high accuracy and high stability over a substantially entire area of the surface of the base for the polishing pad. Therefore, the machine is able to effectively form the polishing pad constructed according to the third aspect of the present invention.

In this respect, there are known various kinds of conventional general-purpose turning machines, such as lathes and machining centers. These known turning machines are provided for mainly processing a metallic work piece, and are equipped with a rotative platen adapted to fix the metallic working piece thereon by holding a periphery of the work piece, a tool rest holding a cutter (fixed tool), a drive mechanism for positioning the cutter relative to the working piece and for rotating the cutter and the work piece relative to each other, and a controller for controlling operation of the driving mechanism, for example. That is, the known turning machines may possibly be operable to cut the circumferential grooves with a desired pitch into a work piece fixed to the rotative platen. However, since the base for the polishing pad as the work piece is made of the resin material and has a relatively small thickness, it is therefore difficult to stably fix such a special working piece, i.e., the base for the polishing pad on the platen by only holding the peripheral portion of the base. For the above reasons, the conventional turning machine is incapable of controlling a depth of cut of the turning tool by a slight amount, which is required for cutting the desired circumferential grooves into the surface of the base for the polishing pad. Thus, the conventional turning machine is never utilized for forming the polishing pad constructed according to the third aspect of the present invention.

Moreover, the polishing pad to be processed by the machine of the present invention has a large variety of required properties, needing a change of the turning tool depending upon properties of the desired polishing pad. However, the conventional turning machine suffers from a small degree of freedom in choosing turning tools, and accordingly is not able to meet such requirements in the grooving process of the polishing pad.

In addition, the conventional turning machine has an excessively large rigidity for processing the base for the polishing pad, thus making the grooving process complicated and time-consummative. Namely, in the conventional turning machine, each of the moving components has a relatively large mass and a resultant large inertia, making it difficult to ensure a faster operation of the components of the machine.

In the grooving machine for producing the polishing pad according to the present invention, the base for the polishing pad as the work piece is suctioned on and firmly fixed to the circular platen. This arrangement eliminates or reduces a possible distortion of the base generated upon rotating the circular platen. Further, the circular platen is arranged to substantially evenly apply the suction force over an entire area of a rear surface of the base for the polishing pad, making it possible to form by turning the groves into the surface of the base with improved processing accuracy and high stability.

In the grooving machine of the present invention, the gate-shaped column is disposed on the bed with the circular platen interposed between its legs, while a saddle is formed on the cross rail of the gate-shaped column adapted to support tools. This arrangement ensures a high stable and accurate positioning of the tools relative to the working pieces in comparison with the case where the tools are supported by a single arm, while assuring an increased working area of the tools.

According to a first preferred form of the machine of the invention, the machine further comprises: (j) an ion blowing device for neutralizing the static electricity charged in the polishing pad and chips, for separating the chips from the fixed tool and the polishing pad, said ion blowing device including: an ion generating device for generating ion, an ion extruding nozzle for extruding the ion toward the cutting part of the fixed tool, an air blowing device for blowing air together with the ion.

According to a second preferred form of the machine of the invention, the tool rest detachably support a rotative tool consisting of a milling cutter unit and/or a drilling unit. In this preferred form of the machine of the present invention, the tool rest is adapted to selectively support a milling cutter unit including a milling cutter for grooving and a drill unit having a drilling cutter, as well as the turning tool for grooving constructed according to the first aspect of the invention. Therefore, the machine of this preferred form is operable to execute not only the grooving process but also milling cutting and drilling processes.

In one advantageous form of the second preferred form of the machine of the invention, the milling cutter unit includes at least one milling cutter fixedly supported by a tool shaft extending along a center axis thereof, wherein the at least one cutter includes a disk-shaped body member and a plurality of cutting edges disposed at an outer peripheral portion of said body member at regular angular intervals, and each having a wedge angle within a range of 20–40 degrees, and a front clearance angle within a range of 30–40 degrees, a tooth width within a range of 0.3–2.0 mm, and a side cutting edge angle of 0–2 degree. The use of the milling cutter having a special construction as described above enables the machine to process the base for the polishing pad with increased degree of freedom. For instance, the use of this special milling cutter permits the present machine to form with ease grooves arranged in a grid pattern, a spiral pattern, a spoke-wise pattern and other formable patterns.

Preferably, the machine comprises a plurality of the milling cutters which are fixedly disposed onto the tool shaft such that the tool shaft extend through center axes of the plurality of the milling cutters and the plurality of milling cutters are spaced apart from each other in an axial direction of the tool shaft with a uniform pitch of 0.1 mm or more.

This arrangement makes it possible to cut a plurality of grooves into the surface of the base for the polishing pad, simultaneously.

In another advantageous form of the second preferred form of the machine of the invention, the drill unit comprises a single-spindle type or a multiple-spindle type drill unit, the drill unit including a drill having a drill diameter of 0.5–1.5 mm, a drill length of 20–30 mm two cutting edges of helix angle of 1–10 degrees, wherein the drill is a straight drill having no back-tapered portion at cutting edges thereof and having a shape edge that has a conical angle with no chisel portion of 55–65 degrees. The use of this drilling unit permits the present machine to cut holes into or through the base for the polishing pad, resulting in an increased degree of freedom in processing the base for the polishing pad. In particular, the drill of the drilling unit is specifically arranged as described above, in other words, the drill has the sharp edge in the conical shape so as to facilitate entrance of the drill into the base, and the cutting edges arranged at its body portion with a relatively dull helical angle so as to perform cutting of the base with a slight amount of feed per revolution. This arrangement minimizes a possibility that the end of the drill damages the base. Thus, the machine equipped with the drilling unit can form a hole at a desired diameter with high accuracy.

According to a third preferred form of the machine of the invention, the machine further comprises a sequential control system adapted to control operation of the drive motor in place of or in addition to the numerical control apparatus. The use of the sequential control system may slightly restrict operation speed and command accuracy in comparison with the numerical control apparatus. However, the use of the sequential control system may sometimes be advantageous in terms of cost depending upon kinds of applications, thus extending a field of application of the present machine.

According to a fourth preferred form of the machine of the invention, the machine includes two of the saddles, wherein at least one of the tool holders of the two saddles is adapted to detachably support the fixed tool comprising the turning tool comprising a cutting part arranged to have a tooth width within a range of 0.005–1.0 mm, a wedge angle within a range of 15–35 degrees, and a front clearance angle within a range of 65–45 degrees, and an other one of the tool holders of the two saddles is adapted to detachably support the rotative tool selected from a group consisting of the milling cutter unit and the drilling unit. In this arrangement the machine is equipped with both of the turning tool and the rotative tool with high efficiency, whereby the machine is able to execute various kinds of processing with improved operation efficiency.

According to a fifth preferred form of the machine of the invention, the machine includes only one of the saddle, wherein the tool holder of the saddle is adapted to interchangeably support the fixed tool comprising the turning tool constructed according to the first aspect of the invention or the rotative tool selected from a group consisting of the milling cutter unit or the drilling unit. In this arrangement, the grooving machine is made compact in size and simple in construction, while enabling selective use of the fixed tool and the rotative tool.

BRIEF DESCRIPTION OF THE DRAWINGS

The forgoing and/or other objects features and advantages of the invention will become more apparent from the following description of preferred embodiments with reference to the accompanying drawings, in which like numerals are used to represent like elements and wherein:

FIG. 1B is an plane view of the grooving machine of FIG. 1A, while

FIG. 4A is a plane view of a platen of the grooving machine of FIG. 1, and FIG. 4B is a cross sectional view of the platen of FIG. 4A taken along line B—B of FIG. 4A;

FIG. 5A is a plane view of a suction plate of the grooving machine of FIG. 1, FIG. 5B is an axial cross sectional view of the suction plate, FIG. 5C is a fragmentally enlarged view of the suction plate, FIG. 5D is an enlarged view of a X portion of FIG. 5C, and FIG. 5E is an enlarged cross sectional view taken along line E—E of FIG. 5D;

FIGS. 6A and 6B are a front and a side views of the grooving machine of FIG. 1A, which are depicted for explaining a primary part of the grooving machine of FIG. 1A;

FIG. 10 is a fragmentally side elevational view of the grooving machine of FIG. 1A, which shows one operating state of the grooving machine in which a milling tool is attached to the tool holder;

FIG. 14 is a block diagram schematically illustrating an essential structure of a sequence control device employed for controlling operation of the grooving machine of FIG. 1A;

FIGS. 27A and 27B show one example of a polishing pad of foamed urethane having a plurality of generally concentric grooves formed by cutting process executed by the grooving machine of FIG. 1, wherein FIG. 27A is a fragmentally enlarged plane view of the polishing pad, and FIG. 27B is a fragmentally enlarged view in cross section of the polishing pad;

FIGS. 28A and 28B show another example of polishing pad of foamed urethane having a plurality of grooves arranged at grid pattern formed by milling process executed by the grooving machine of FIG. 1, wherein FIG. 28A is a fragmentally enlarged plane view of the polishing pad, and FIG. 28B is a fragmentally enlarged view in cross section of the polishing pad;

DETAILED DESCRIPTION OF PREFERRED EMBODIMENTS

Figure 1A:
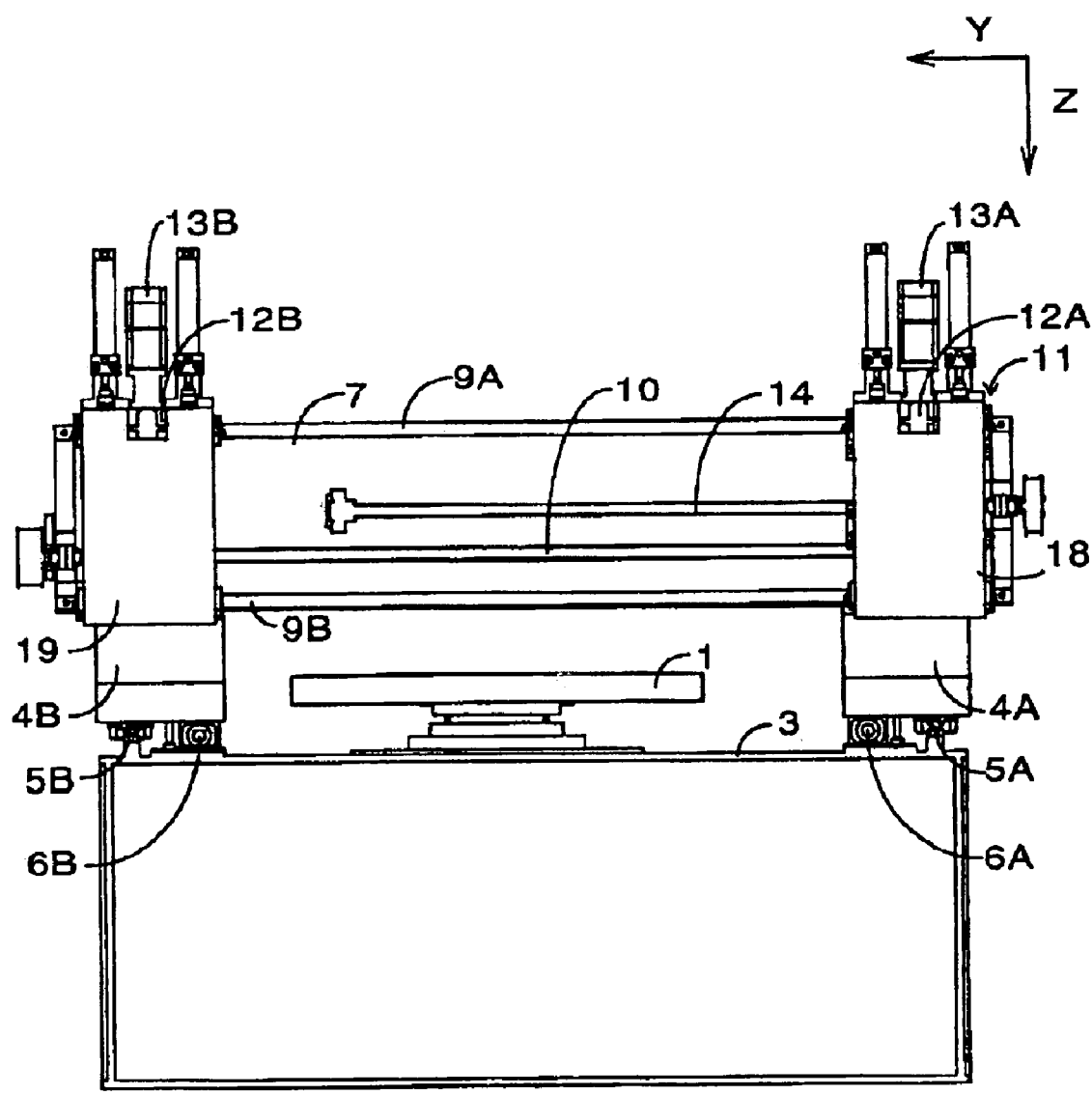
FIG. 1A is an front elevational view of a grooving machine constructed according to one preferred embodiment of the present invention.
Figure 1B:
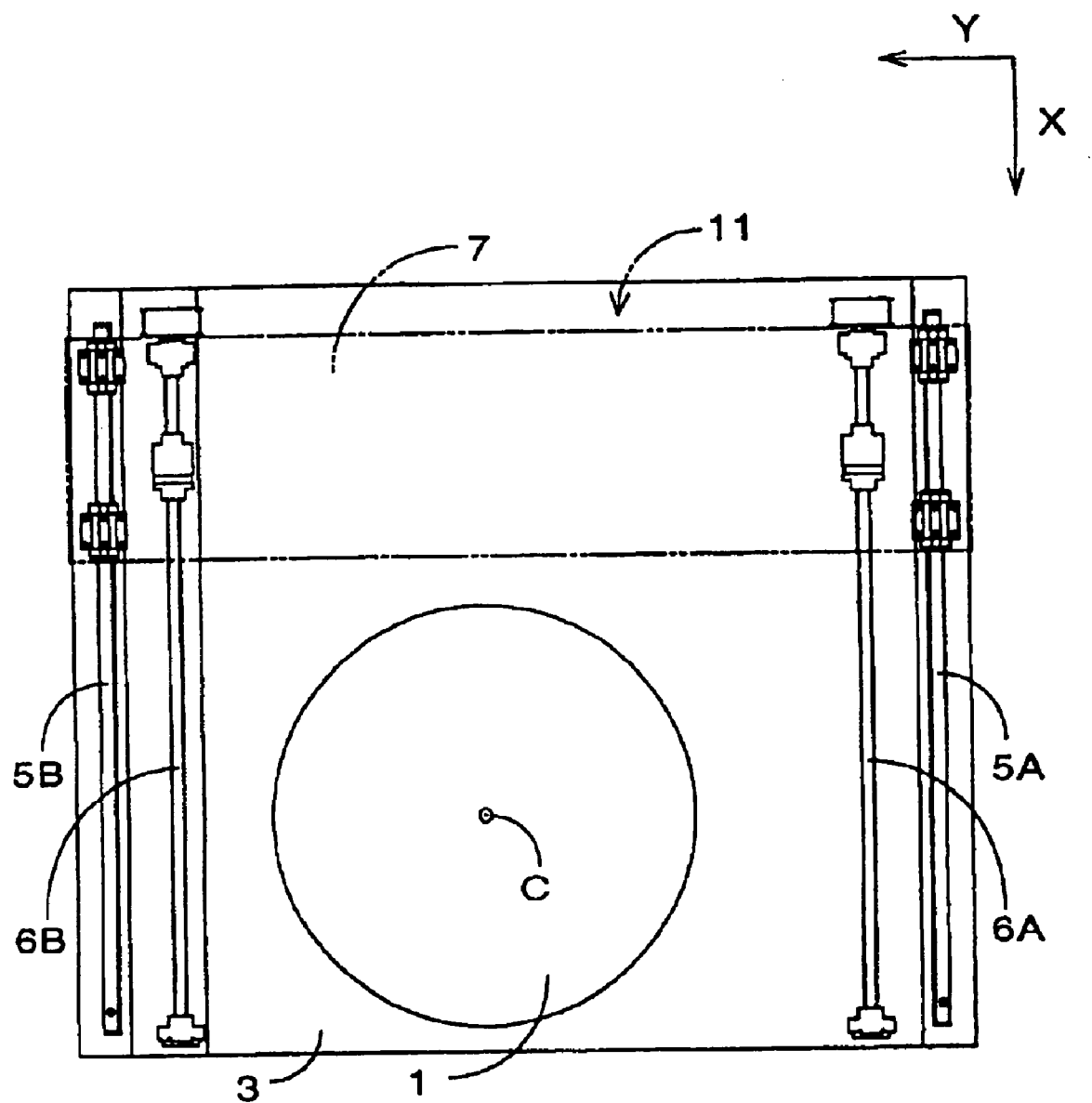
Figure 1C:
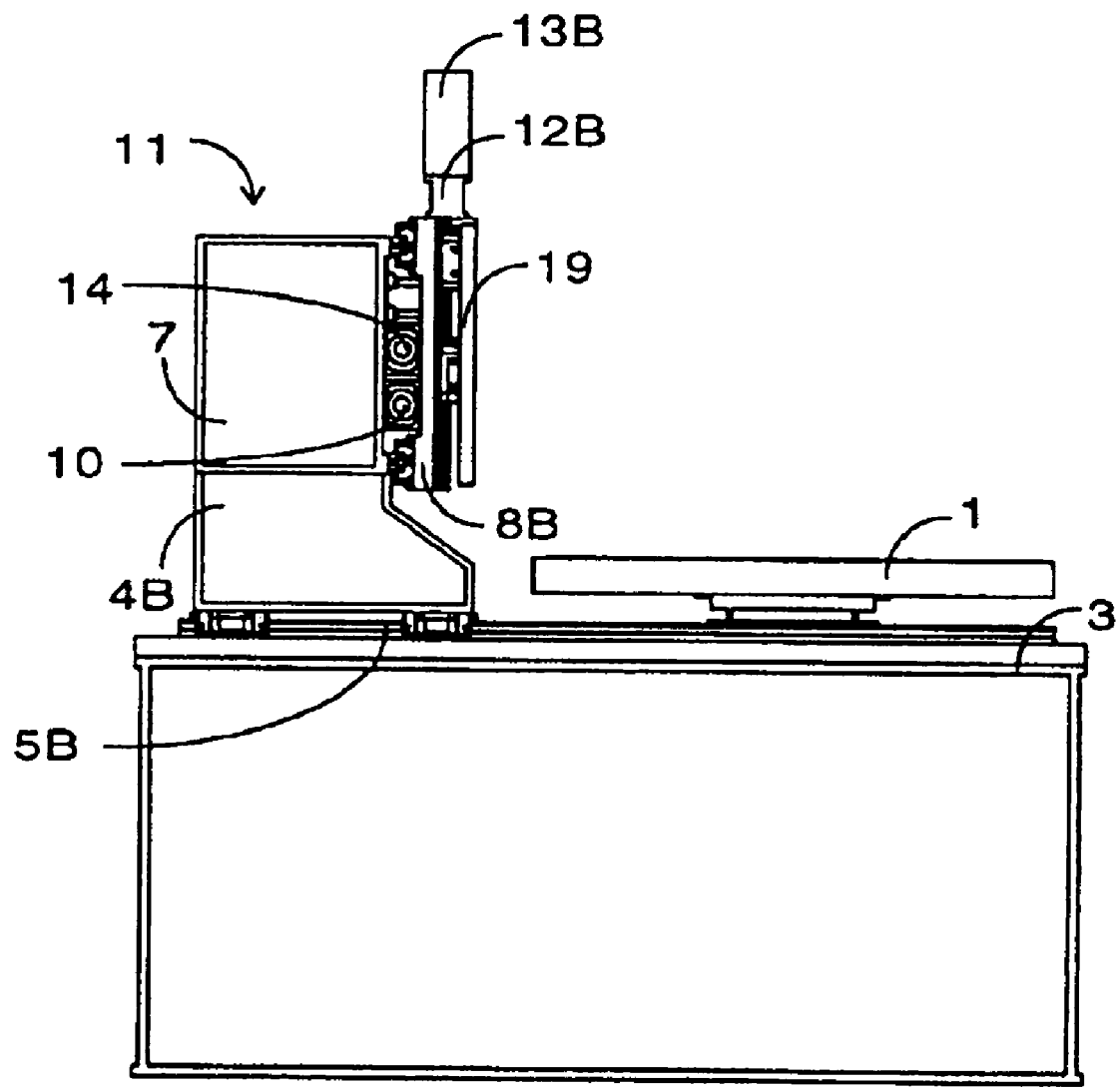
FIG. 1C is a side elevational view of the grooving machine of FIG. 1A.

Referring first to FIGS. 1A–1C, there is shown a schematic construction of a grooving machine according to one preferred embodiment of the present invention. The grooving machine is equipped with a turning tool for cutting grooves, which is constructed according to one preferred embodiment of the invention. The grooving machine is used for producing a polishing pad according to one preferred embodiment of the invention in accordance with a method according to one preferred embodiment of the invention.

The grooving machine constructed according to the present embodiment is operable to produce by cutting circumferential grooves, e.g., a multiplicity of generally concentric annular grooves in the present embodiment, on a surface of a base for the polishing pad made of a resin material, e.g., a foamed urethane pad 15. The grooving machine comprises the following components:

(a) a circular platen 1 rotatable under control about C-axis extending in a vertical direction as seen in FIG. 1A;
(b) a gate-shaped column 11 reciprocatory movable under control in a direction of X-axis;
(c) two saddles 8A, 8B mounted on a cross rail 7 and reciprocatory movable along a screw-thread 10 (Y1-axis) and a screw-thread 14 (Y2-axis);
(d) two tool holders 18, 19 mounted on the two saddles 8A, 8B; respectively, and reciprocatory movable along a screw-thread 12A (Z1-axis) and a screw-thread 12B (Z2-axis);
(e) a numerical control device 102 (see FIGS. 13, 14) adapted to control operation of motor and a control axis;
(f) an ion blower 114 as an ion blowing device (see FIG. 15) for neutralizing charged components;
(g) a fixed tool 69 as a turning tool in the form of a single cutting edge tool 58 and a multiple cutting edges tool 74 (see FIG. 12) for cutting grooves;
(h) a cutting device (see FIG. 24); and
(i) a rotative tool 57 in the form of a milling tool 59 and a drill unit 65 (see FIGS. 10, 11).

There will be described in detail a general construction of the grooving machine and specific construction of the respective components listed above, with reference to the accompanying drawings, sequentially.

FIGS. 1A–1C shows an entire construction of the grooving machine according to the present embodiment. The circular platen 1 is fixedly mounted on a bed 3 so as to extend parallel to an upper surface of the bed 3. The circular platen 1 is rotatable about the C-axis extending perpendicular to the upper surface of the bed 3, i.e., extending in the vertical direction as seen in FIG. 1A. The bed 3 further supports a pair of first guide rails 5A, 5B horizontally mounted on opposite sides of its upper surface. The first guide rails 5A, 5B extend parallel to each other in a longitudinal direction of the bed 3 while being spaced apart from each other with the circular platen 1 interposed therebetween. The gate-shaped column 11 is mounted on the first guide rails 5A, 5B so that the gate-shaped column 11 is movable along the first guide rails 5A, 5B in the horizontal direction. The gate-shaped column 11 includes a pair of legs in the form of column portions 4A, 4B mounted on the first guide rails 5A, 5B, respectively, and a cross rail 7 extending between the column portions 4A, 4B so as to connect the column portions 4A, 4B to each other. The thus formed gate-shaped column 11 is driven by a pair of screw shaft 6A (first X axis) and 6B (second X axis) disposed on the bed 3 so as to extend along the guide rails 5A, 5B, respectively, in a direction of an X-axis as indicated by an arrow in FIG. 1B. The pair of screw shafts 6A, 6B are synchronously rotated by a drive motor 40 which will be described later with reference to FIG. 7B. The drive of the gate-shaped column 11 is controlled by a suitable control device that will be described later. A pair of second guide rails 9A, 9B are disposed on one of opposite side faces of the cross rail 7 so as to extend in a direction of a Y-axis as indicated by an arrow in FIGS. 1A and 1B, which is perpendicular to the X-axis. On the second guide rails 9A, 9B, the two saddles 8A, 8B are mounted so as to be movable along the guide rails 9A, 9B, i.e., in the direction of the Y-axis. The two saddles 8A, 8B are driven by respective screw shafts 10, 14 disposed on the side face of the cross rail 7 so as to extend along the guide rails 9A, 9B. The screw shafts 10, 14 are rotated by suitably electric drive motors (not shown) under control of the suitable control device. The two saddles 8A, 8B support tool rests 18, 19 mounted thereon, respectively, such that the tool rests 18, 19 are movable in a direction of a Z-axis extending in the vertical direction as seen in FIG. 1A (as indicated by an arrow). The tool rests 18, 19 are driven by respective ball-screws 12A, 12B disposed on the saddles 8A, 8B so as to extend along the Z-axis. The screw shafts 12A, 12B are rotated by respective electric motors 13A, 13B so that the tool rests 18, 19 are moved in the direction of the Z-axis independently of each other. The gate shaped column 11, the saddles 8A, 8B, and the tool rests 18, 19 may be formed by desired metallic materials, preferably rigid light metallic materials such as a hard aluminum alloy or the like.

(a) Circular Platen (C-Axis)

Figure 2:
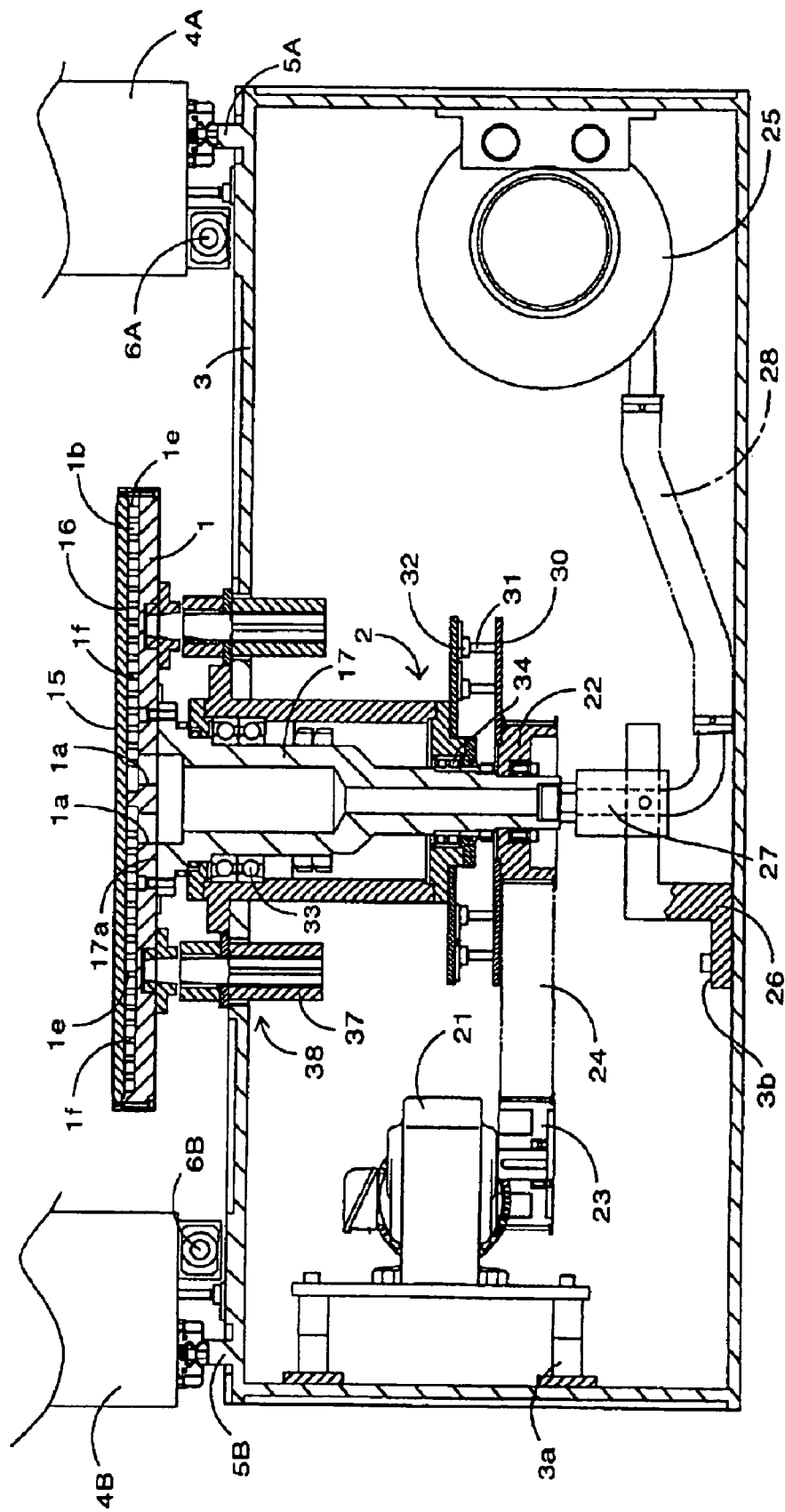
FIG. 2 is an elevational view in a vertical or a longitudinal cross section of the grooving machine of FIG. 1A.
Figure 3:
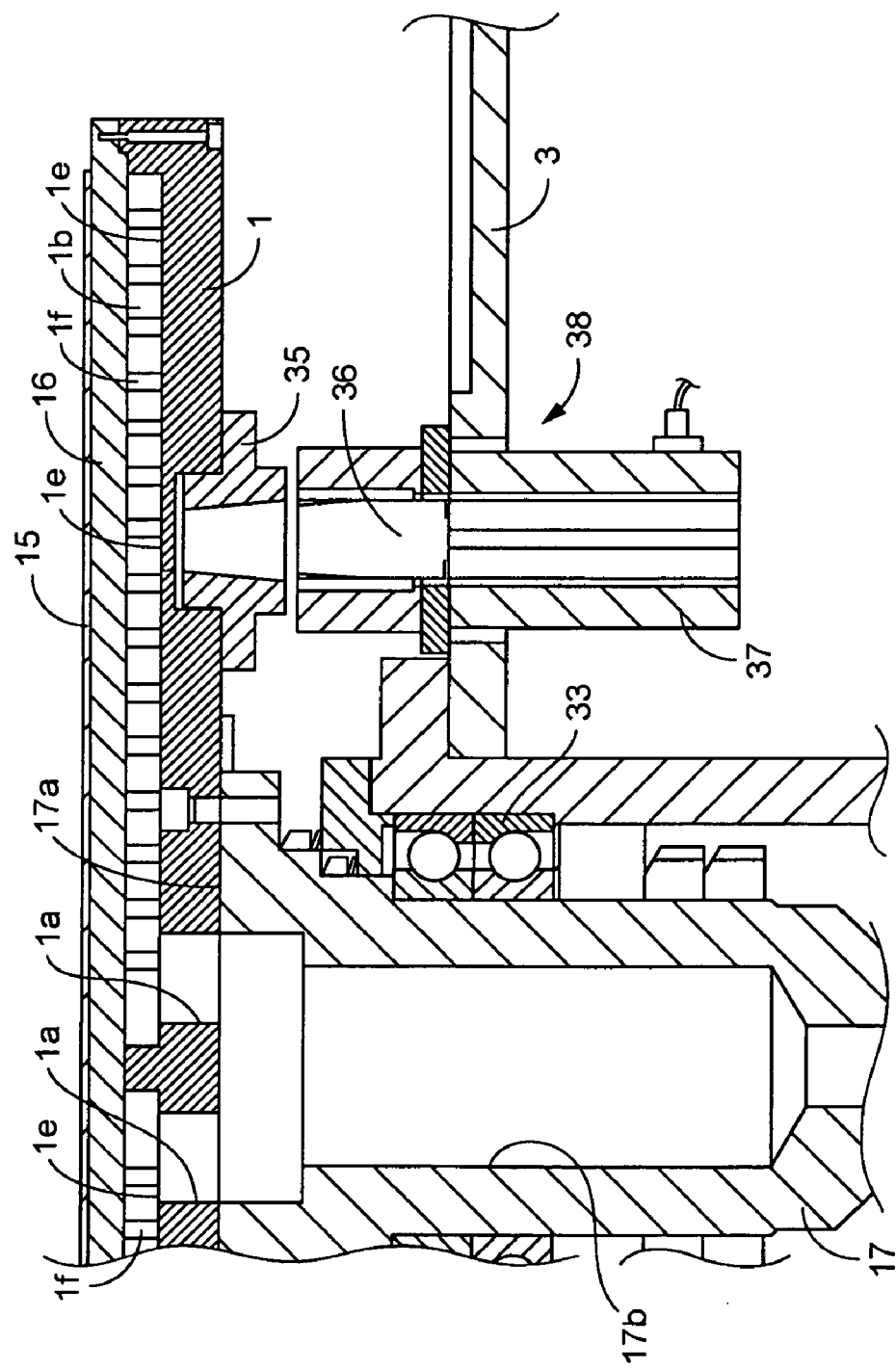
FIG. 3 is an fragmentally enlarged view of the grooving machine of FIG. 1A.

Referring next to FIG. 2, the circular platen 1 and a housing member of the circular platen 1 are both shown in their axial cross sections. FIG. 2 also shows a driving mechanism for rotating the circular platen 1 and an air suction device in the form of a suction blower 25 installed within the bed 3 so as to apply a vacuum to an upper surface of the circular platen 1 to thereby attract the base for a desired polishing pad for the CMP, in the form of the foamed urethane pad 15, on the upper surface of the circular platen 1. FIG. 3 shows an enlarged view in axial cross section of a position holding member 38 adapted to place the circular platen at its suitable angular position about the C-axis, which is determined based on the angular position of the circular platen 1 detected by controlling the rotation of the circular platen 1 about the C-axis. FIG. 4 shows a plane view and an axial cross sectional view of the circular platen 1 in which a plurality of air flow passages are evenly formed therethrough so that the vacuum delivered from the suction blower 25 is evenly applied to a rear surface of the foamed urethane pad 15. FIG. 5 shows a suction plate 16 assembled in the surface of the circular platen 1. The suction plate 16 has a plurality of tiny air holes 16*a* formed therethrough and tiny grooves 16*b*, 16*c* connecting the air holes 16*a* so that the vacuum is evenly applied to the rear surface of the foamed urethane pad 15, thus preventing deformation of the surface of the urethane pad due to stress concentrated at a local portion of the foamed urethane pad upon cutting grooves on the urethane pad.

As is understood from FIGS. 2 and 3, the circular platen 1 is supported by a hollow shaft member in the form of a hollow center shaft 17 that is disposed in and supported by the bed 3 via the housing 2, such that the hollow center shaft 17 is rotatable about a center axis thereof. Described in detail, the center shaft 17 has an outward flange portions 17*a* integrally formed at an axially upper end portion thereof. The circular platen 1 is placed on and fixed to an annular upper surface of the outward flange portion 17*a* so as to extend in a radial direction perpendicular to the center axis of the center shaft 17. The center shaft 17 is fixed at its axially upper and lower end portions to the housing 2 via upper and lower bearings 33, 34, respectively. The type, size and level of dimensional accuracy of the upper and lower bearings 33, 34 are suitably determined so that an amount of deflection occurred at an outer peripheral portion and the upper surface of the circular platen 1 is significantly reduced. The housing 2 is fixed to the bed, whereby the center shaft 17 is rotatably supported by the bed 3.

The axially lower end portion of the center shaft 17 protrudes axially downwardly from the housing 2. To the protruded end portion of the center shaft 17, an optional power transmittal member, e.g., a pulley 22 is fixed. On the other hand, a drive motor 21 operable for controlling the rotation of the circular platen 1 about the C-axis is fixed to a sheet portion 3*a* of the bed 3. The output power of the drive motor 21 is transmitted via pulleys 22, 23 and a belt 24 rounded about the pulleys 22, 23, thus generating a rotation of the center shaft 17 and the circular platen 1 fixed to the center shaft 17 about the C-axis. In this respect, power transmitting mechanism for transmitting the output power of the drive motor 21 to the center shaft 17 may otherwise be constituted by utilizing a combination of gears, or any other possible power transmittal members.

The hollow center shaft 17 has a bore 17*b* serving as an air passage. The bore 17*b* is held in fluid-tight communication at its upper end with a plurality of communication holes 1*a* formed through the central portion of the circular platen 1, and at its lower end with an air hose 28 of the suction blower 25 via a coupling 27 supported by a support 26 fixed to a seat portion 3*b* of the bed 3. In this condition, the vacuum generated in the suction blower 25 is applicable to the rear surface of the foamed urethane pad placed on the upper surface of the circular platen 1 through the bore 17*b* of the center shaft 17 and the communication holes 1*a* of the circular platen 1. Therefore, the vacuum application needed for holding the foamed urethane pad on the surface of the circular plate 1 can be executed during the rotation of the center shaft 17. In this respect, the upper open end of the communication holes 1*a* are closed by a suction plate 16 which is placed on the upper surface of the circular platen 1. As shown in FIG. 5, the suction plate 16 is formed with a plurality of suction holes in the form of air holes 16*a* and grooves 16*b*, so that the vacuum is evenly applied in the upper surface of the suction plate 16 through the communication holes 1*a* and the air holes 16*a* and the grooves 16*b*, thus assuring firmly holding of the foamed urethane pad 15 on the surface of the suction plate 16. As is understood from the aforementioned description, the position holding member 38, the drive motor 21 and the suitable power transmittal members cooperates to form a drive mechanism adapted to rotate the circular platen 1 and place the circular platen 1 at a suitable angular position, in the present embodiment.

Referring back to FIGS. 2 and 3, a disk plate 30 having a plurality of projections 31 is fixed to the protruding end portion of the center shaft 17, while plurality of sensors 32 are fixed to the lower end face of the housing 2 so as to be located above the projections 31 with a slight spacing therebetween in the vertical direction as seen in FIG. 2. The sensors 32 detect the projections 31 to thereby detect the angular position of the circular platen 1. This mechanism is used for detecting the angular position of the circular platen 1 rotating about the C-axis under control, and positioning the circular platen 1 at its desired angular position. When the grooving machine is operated to form a multiplicity of small-width straight grooves arranged in a grid pattern on the surface of the foamed urethane pad 15, by using the milling cutter, the positions of the sensors 32 and the projections 31 are changed so that the sensors 32 can detect angular positions of the circular platen 1 each time the circular platen 1 is rotated by 45 degree about the C-axis. In the grooving process, the circular platen 1 is fixed each time the circular platen is rotated by 90 degree about the C-axis, to thereby cutting the straight grooves on the surface of the urethane pad in the grid pattern. In the present embodiment, the position holding member 38 is constituted by a positioning bush 35 having a tapered hole, which is fixed to a predetermined angular position of the lower surface of the circular platen 1, and a piston member 37 having a shaft 36 whose upper end portion is tapered, which is disposed on a corresponding angular position of the bed 3. The piston member 37 may be of pneumatic type, hydraulic type or alternatively electromagnetic type. It should be appreciated that the structure of the position holding member 38 is not particular limited to the illustrated one. For instance, a Curvic coupling device (curvic: trademark) may be employed instead of the tapered shaft 36, for thereby permitting the detection of the angular position of the circular platen 1 at angular intervals of not larger than 45 degree.

FIG. 4A shows a plane view of the circular platen 1, while the FIG. 4B shows a cross sectional view of the circular platen 1 taken along line B—B of FIG. 4A. A material for producing the circular platen 1 may be preferably selected from light metals including aluminum alloy, titanium and the like, thereby lowing a moment of inertia of the circular platen 1, thus permitting a prompt startup or stop of the rotation of the circular platen. In particular, the material of the circular platen 1 is desired to be less likely to cause the secular change of the circular platen 1, like strain, to exhibit a heat resistance, and to have sufficient stiffness and strength. While the communication holes 1*a* is formed through the central portion of the circular platen 1 for introducing the suction force applied from the suction blower 25 into the upper surface of the circular platen 1 through, the circular platen 1 is also formed with a plurality of leading grooves 1*c*, 1*d* for leading the suction force into the outer circumferential portion of the circular platen 1. The circular platen 1 is further provided with a plurality of generally concentric grooves 1*e*, through which the plurality of leading grooves 1*c*, 1*d* extending in the radial directions are held in communication with each other. A plurality of circumferential walls 1f defined between adjacent ones of the annular grooves 1e serve as supports on which the suction plate 16 is placed.

Referring next to FIGS. 5A, 5B, 5C, there are shown a plane view, an axial cross sectional view, and a fragmentally enlarged view of the suction plate 16. In addition, FIG. 5D shows an enlarged view of an X part of FIG. 5C, and FIG. 5E shows a cross sectional view taken along line E—E of FIG. 5D. As shown in FIG. 5E, the suction plate 16 functions to support the foamed urethane pad 15 to be placed thereon. The suction plate 16 is provided with the multiplicity of tiny air holes 16a evenly dispersed over the entire surface of the suction plate 16, so that the foamed urethane pad 15 is fixed onto the surface of the suction plate 16 by the suction force evenly applied to the back surface thereof through the air holes 16a. Like the circular platen 1, the suction plate 16 is made of a material preferably selected from light metals including hard aluminum alloy, titanium, and the like, and ceramic materials.

In the light of flexibility of the foamed urethane pad 15, specific arrangement is needed for ensuring desired suction condition of the foamed urethane pad 15 on the suction plate 16. More specifically described, when the currently processed portion on the front surface of the foamed urethane pad is remote from suctioned portions on the rear surface of the foamed urethane pad 15 to which the suctioned force is applied, the processed foamed urethane pad 15 is prone to be deformed or displaced in the direction in which the cutting tool is forwarded, possibly causing deterioration of dimensional accuracy of the formed grooves. To cope with this problem, the suction plate 16 is required to be capable of evenly applying the suction force on the rear surface of the foamed urethane pad 16 placed thereon. Therefore, the air hole 16a are evenly dispersed over the entire area of the suction plate 16 with a substantially regular pitch. Each of the air holes 16a is dimensioned to have a suitable diameter, taken into account the thickness of the foamed urethane pad 16, so that the suction force applied through the air hole 16a to the corresponding portion of the rear surface of the urethane pad 16 does not cause deformation of the urethane pad 16. For instance, the air hole 16a is dimensioned to have a diameter of about 2 mm, when the foamed urethane pad 15 has a thickness of 1.4 mm. As shown in FIG. 5D, adjacent ones of the air holes 16a are held in communication with each other through communication grooves 16b, thus assuring further improved evenness of the suction force. The suction plate 16 is further provided with a plurality of annular generally concentric clearance grooves 16c, which are formed on predetermined radial portion of the front surface of the suction plate 16. In the case where the grooving machine is operated to perform a boring process with a boring unit in the form of a drill unit 65 (which will be described later with reference to FIGS. 11 and 16) attached thereto, the suction plate 16 is further provided with a clearance grooves (not shown) having a diameter slightly larger than the diameter of a drill of the drill unit 65 and formed through its predetermined portion.

(b) Gate-Shaped Column (X-Axis)

Figure 6B:
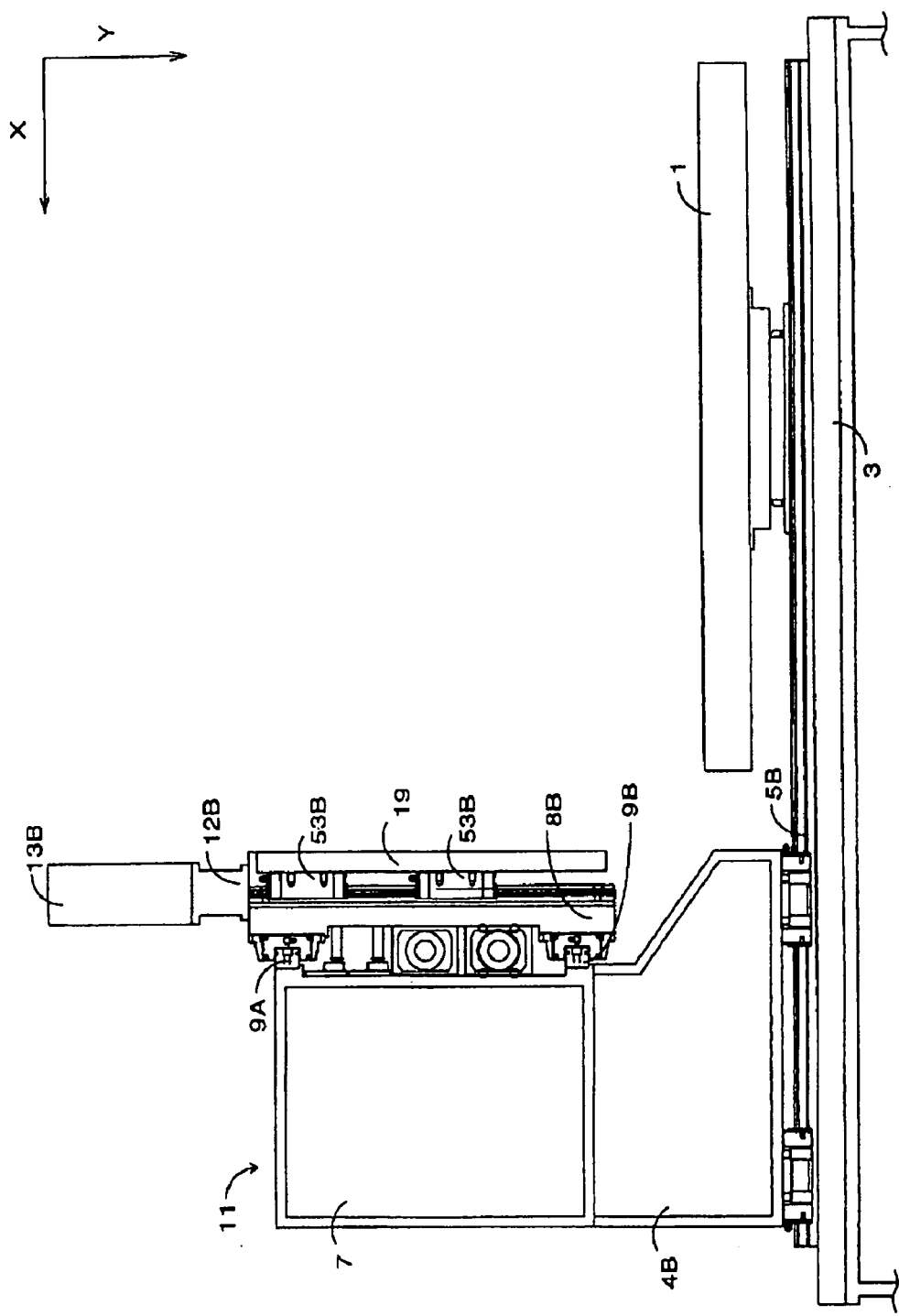
Figure 7A:
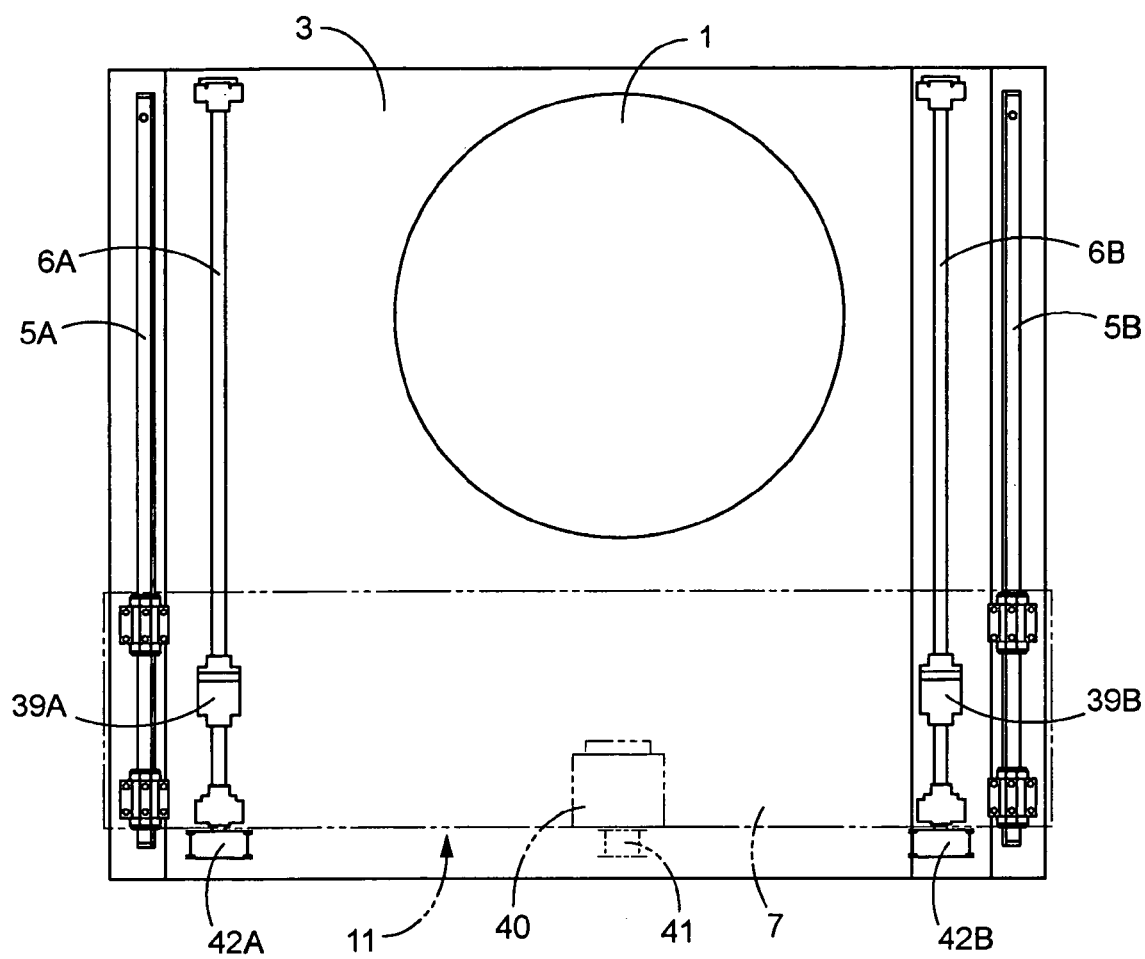
FIGS. 7A and 7B are a plane and a rear view of the grooving machine of FIG. 1A, which are depicted for explaining a primary part of the grooving machine of FIG. 1A.
Figure 7B:
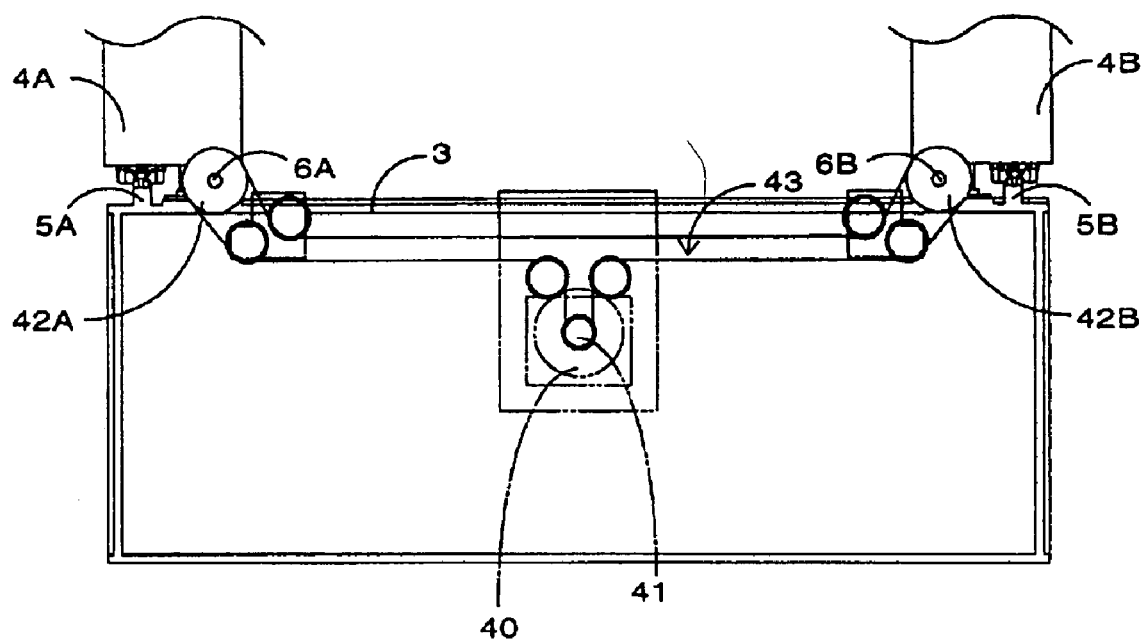

Referring next to FIGS. 6A and 6B, there are shown a plane view and a side view of the gate-shaped column 11 that is placed on the first guide rails 5A, 5B, which are disposed on the bed 3 with the circular platen 1 interposed therebetween. FIGS. 7A and 7B show drive mechanism for driving the gate-shaped column 11 in the direction of the X-axis as shown in FIG. 7A. Namely, FIG. 7A is a plane view of the bed 3 on which the pair of screw shafts 6A, 6B are disposed so as to extend along with the guide rails 5A, 5B, respectively. The motions of the screw shafts 6A, 6B in their axial direction i.e., in the direction of X-axis, are controllable. FIG. 7B shows a power transmitting system for controlling the rotation of the screw shaft 6A, 6B by using a single belt 43.

Described more specifically, the gate-shaped column 11 includes the pair of columns 4A, 4B and the cross rail 7 fixed at its both ends with the columns 4A, 4B, respectively, for thereby connecting the columns 4A, 4B. The pair of columns 4A, 4B are placed on the first guide rails 5A, 5B, respectively, so that the gate-shaped column 11 is movable in the direction of an X axis along the guide rails 5A, 5B, by the drive force generated by the screw shafts 6A, 6B. Alternatively, the gate-shaped column 11 may be formed as an integral form by welding or casting.

As shown in FIGS. 7A, 7B, the first pair of screw shaft 6A, 6B are disposed on the opposite side portions of the upper surface of the bed 3, so as to extend in the direction of the X-axis parallel to each other. A pair of ball nuts 39A, 39B are thread-engaged with the screw shafts 6A, 6B, respectively. To the ball nuts 39A, 39B, the columns 4A, 4B are fixed, respectively, whereby the gate-shaped column 11 is moved in the direction of the X-axis according to the axial motion of the ball nuts 39A, 39B along the screw shafts 6A, 6B. A drive motor 40 is disposed within the bed 3. The drive motor 40 has an output shaft equipped with a pulley 41. The rotation of the pulley 41 is transmitted to a pair of pulleys 42A, 42B, fixed to the respective screw shafts 6A, 6B, via a belt 43 wound around the pulleys 41, 42A, 42B, so that rotations of the pulleys 42A, 42B are synchronized with each other, thus moving the ball nut 39A, 39B simultaneously. The drive mechanism for driving the screw shafts 6A, 6B is not particularly limited to the illustrated one. For instance, the screw shafts 6A, 6B may be driven by respective drive motors directly connected thereto, which motors are controlled to provide synchronized operation with each other.

(c) Two Saddles 8A, 8B Mounted on a Cross Rail (Y1-Axis, Y2-Axis)

Figure 8A:
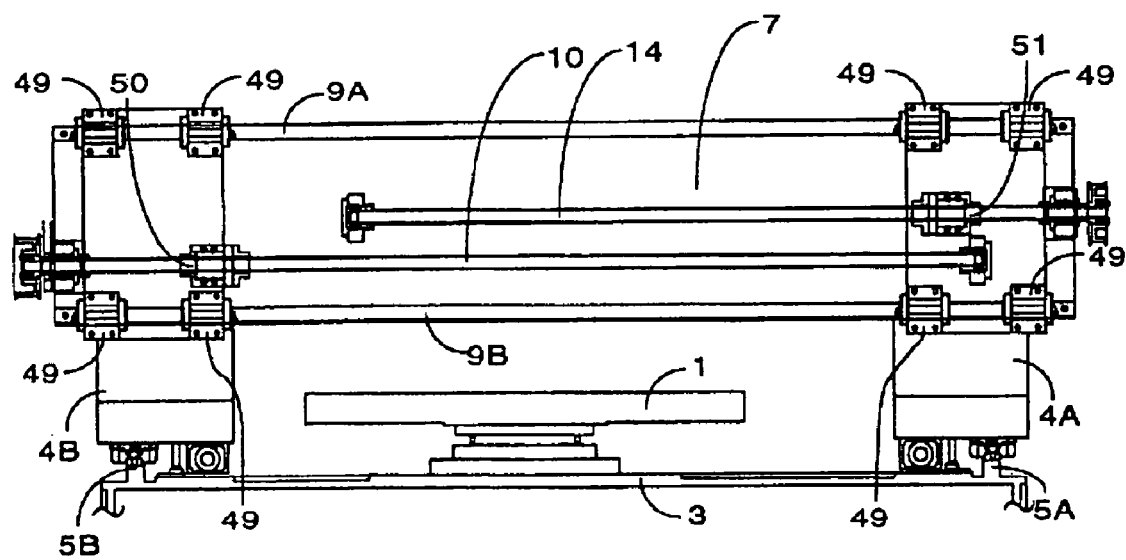
FIGS. 8A and 8B are a front and a cross sectional views of saddles of the grooving machine of FIG. 1, which are depicted for explaining a drive system of the saddles movable along a Y1 axis and a Y2 axis, respectively.
Figure 8B:
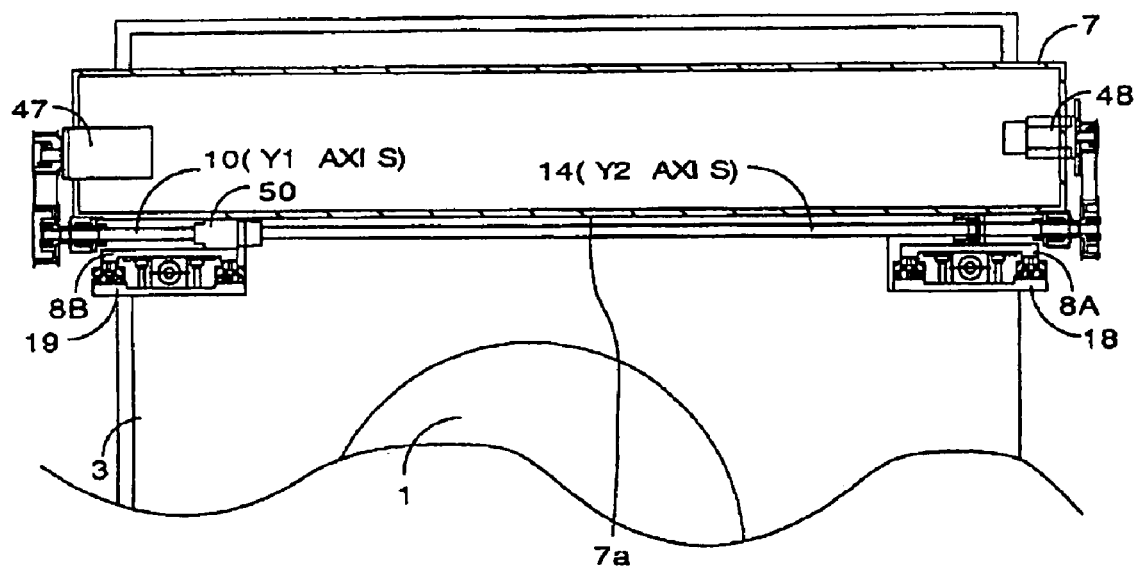

Referring back to FIG. 6A, there is shown a front view of two saddles 8A, 8B. Two saddles 8A, 8B are mounted on the second guide rails 9A, 9B disposed on the cross rail 7 so as to extend over the two symmetrical columns 4A, 4B in the direction of Y-axis perpendicular to the Z-axis and the X-axis, as shown by arrows in FIGS. 6A and 6B. Therefore, the two saddle systems 8A, 8B are movable in the direction of Y-axis along the second guide rails 9A, 9B. The two saddle systems 8A, 8B are driven by respective drive motors whose operation is controllable so as to place the saddles 8A, 8B at respective desired positions. FIG. 8A is a view corresponding to that of FIG. 6A, in which the two saddles 8A, 8B are removed from the second guide rails 9A, 9B. As is apparent from FIG. 8A, ball-screw shafts 10, 14 are disposed on the cross rail 7 so as to extend along with the second guide rails 9A, 9B, i.e., in the Y-axis direction. The screw shaft 10 is driven by an Y1-axis control motor 47, while the ball-screw shaft 14 is driven by an Y2-axis control motor 48. FIG. 8B shows power transmittal members constituting the motors 47, 48.

As is apparent from FIGS. 8A and 8B, the second guide rails 9A, 9B are disposed on the front side surface 7a of the cross rail 7 so as to extend parallel to each other. Each of the saddles 8A, 8B has four linear bearings 49 fixed on the rear surface thereof. The saddles 8A, 8B are mounted on the second guide rails 9A, 9B at their linear bearings, so that the saddles 8A, 8B are slidably movable along the second guide rails 9A, 9B in the Y-axis direction. Further, the ball-screw shafts 10, 14 are also disposed on the front side surface 7a of the cross rail 7 so as to extend parallel to the second guide rails 9A. 9B, which are driven by the motor 47 (Y1-axis) and the motor 48 (Y2-axis) to make a rotational motion. This rotational motion of the screw shafts 10, 14 are converted into longitudinal motions of nuts 50, 51 along the screw shafts 10, 14, respectively, which nuts 50, 51 are thread-engaged with the screw shafts 10, 14 and firmly fixed to the rear surfaces of the saddles 8A, 8B. Therefore, the saddles 8A, 8B are reciprocally moved in the Y-axis direction in accordance with the longitudinal motion of the nuts 50, 51 caused by the rotation of the screw shafts 10, 14. The motor 47 for rotating the screw shaft 10 is operable under control by a suitable control device so that the longitudinal motion of the nut 50, i.e., the displacement of the saddles 8A in the Y1-axis is suitably controlled. Likewise, the motor 48 for rotating the drive shaft 14 is operable under control by a suitable control device so that the longitudinal motion of the nut 51, i.e., the displacement of the saddles 8B in the Y2-axis is suitably controlled. In this respect, the saddles 8A, 8B share the same guide rails 9A, 9B, so that the motors 47, 48 are suitably controlled to prevent interference between the saddles 8A and 8B in the Y-axis direction.

The tool rests 18, 19 disposed on the saddles 8A, 8B may hold different kinds of cutting tools, for example. In this case, the saddles 8A, 8B are selectively driven. While the two saddles 8A, 8B are disposed on the same side, i.e., the front side of the cross rail 7 and utilize the same second rails 9A, 9B for their displacement in the Y-axis direction, the structure of the two saddles 8A, 8B are not partially limited, but may otherwise be modified or changed. For instance, the second guide rails 9A, 9B may be provided for each of the two saddles 8A, 8B. The saddles 8A, 8B may be disposed on the opposite sides, i.e., the front and rear sides of the cross rail 7, respectively, rather than the same side of the cross rail 7. In the case where the tool units attached to the tool rests 18, 19 may interfere with the other components or devices installed on the bed 3, it is effective to change arrangement of the saddles 8A, 8B on the gate-shaped column 11, thus avoiding or eliminating the undesirable interfere of the tool units and the other components.

(d) Tool Rests Disposed on the Two Saddles (Z1 Axis, Z2 Axis)

Figure 9A:
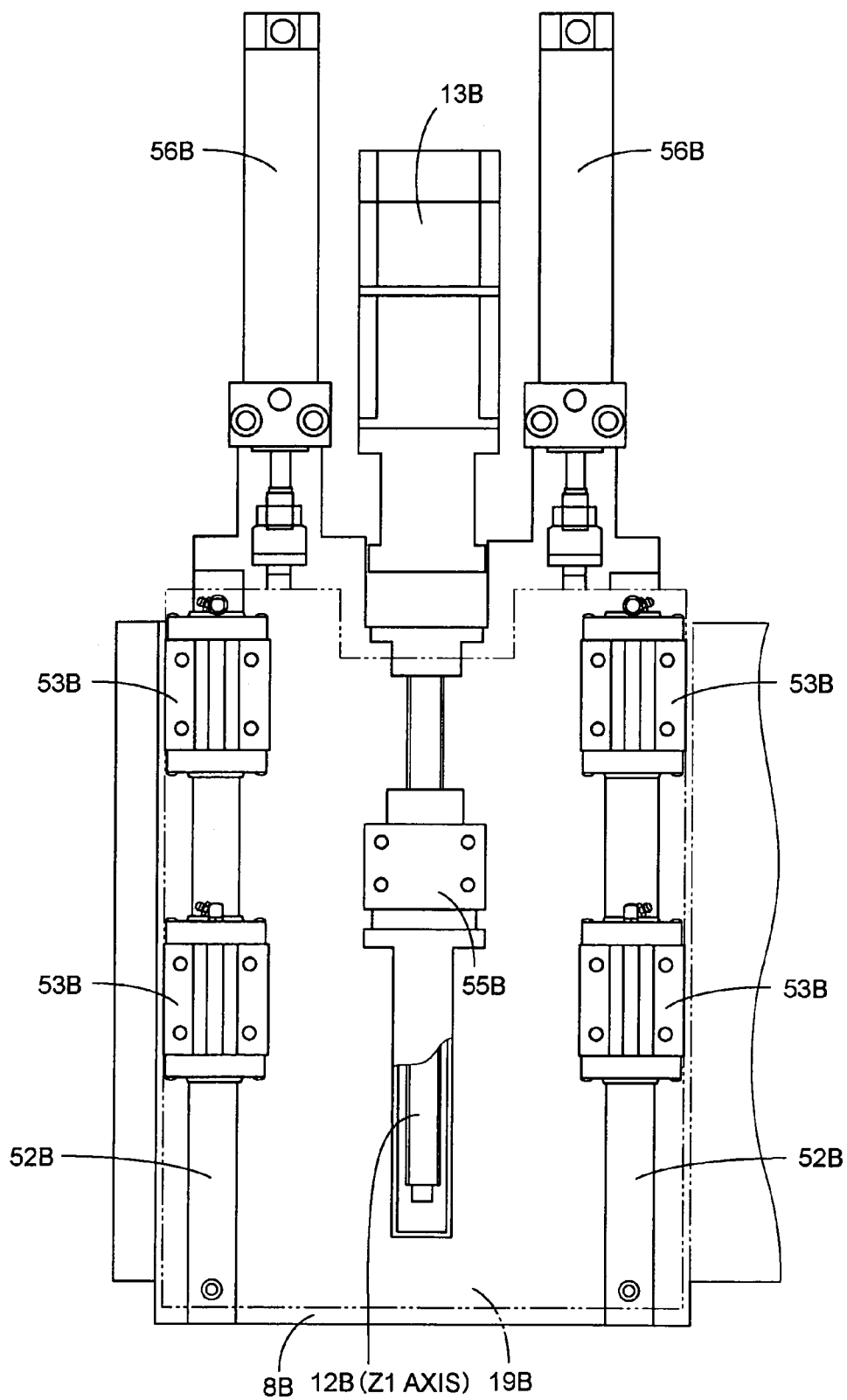
FIGS. 9A and 9B are a front and a side elevational view of an inside of the grooving machine of FIG. 1A, which are depicted for explaining a drive system of the tool holders movable along a Z1 axis and a Z2 axis, respectively.
Figure 9B:
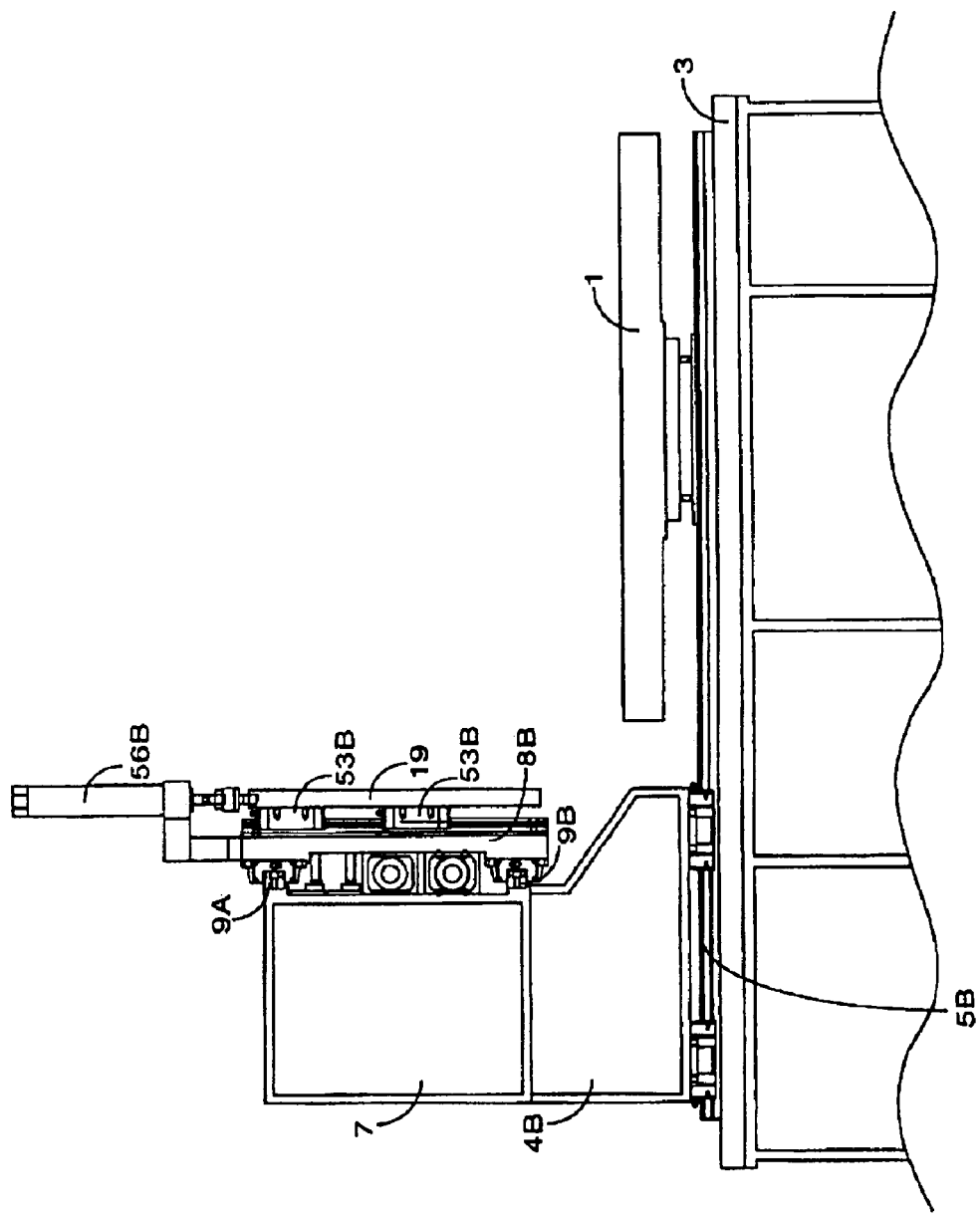
Figure 11:
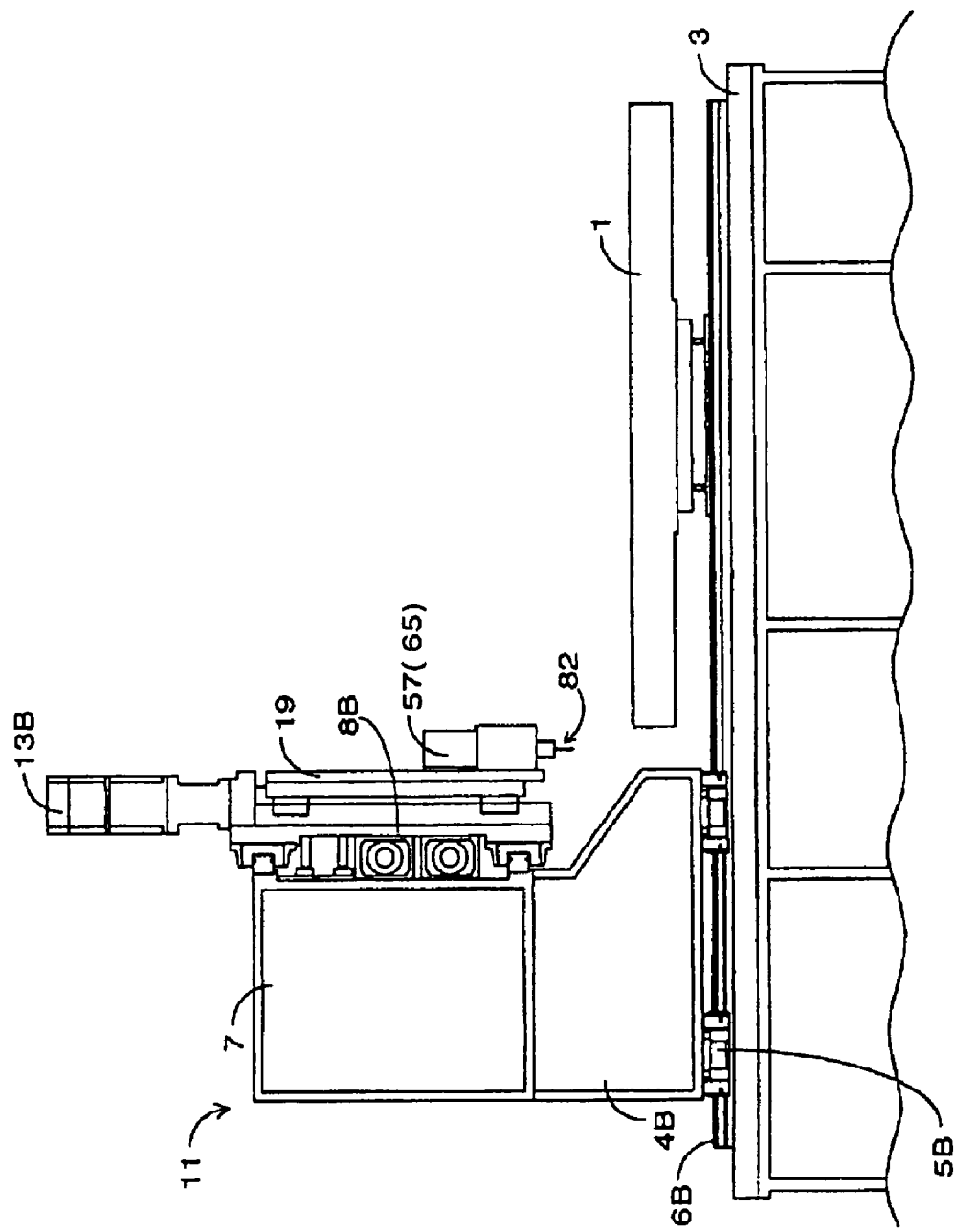
FIG. 11 is a view corresponding to FIG. 10, which shows another operating state of the grooving machine in which a drill tool is attached to the tool holder.
Figure 12:
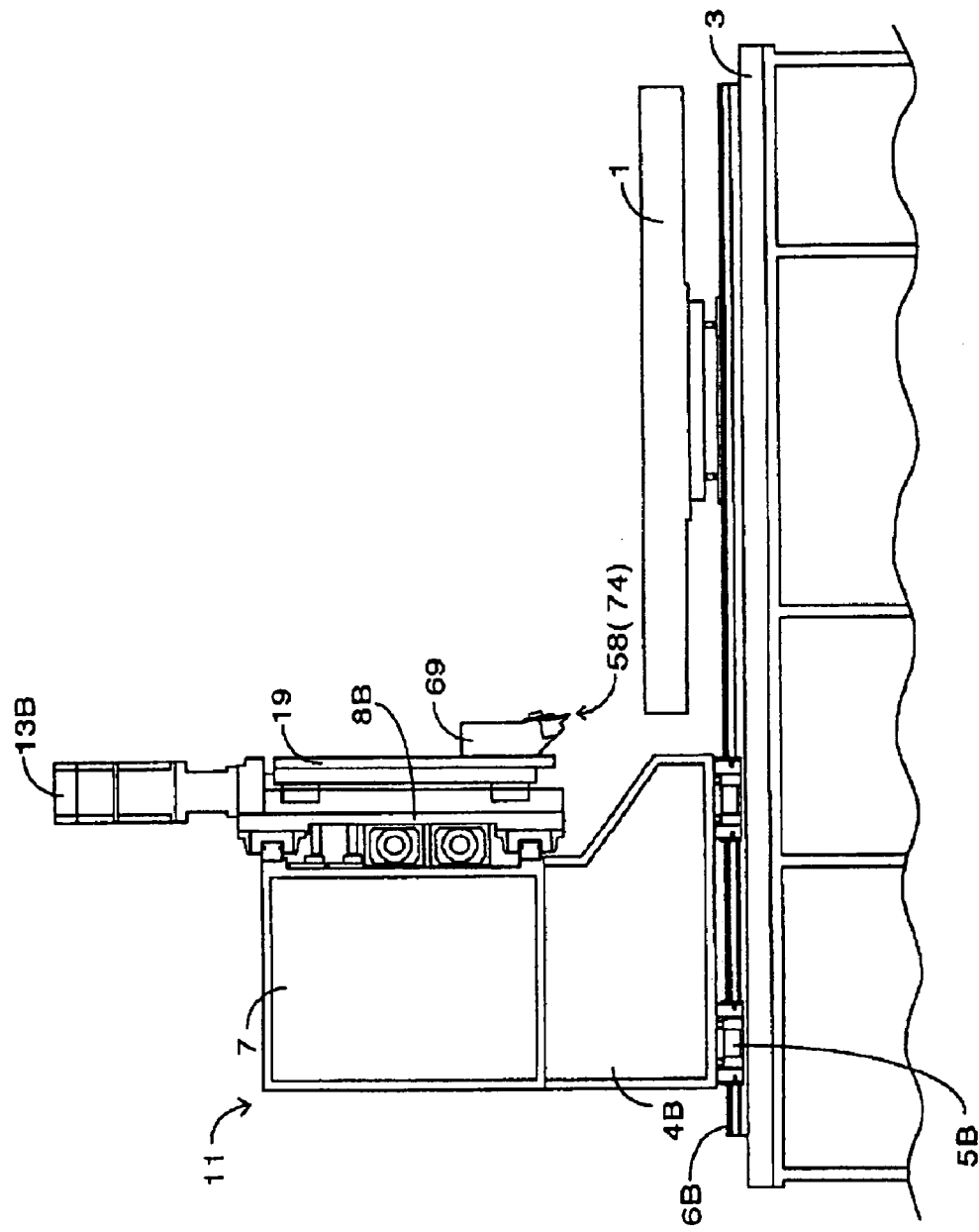
FIG. 12 is a view corresponding to FIG. 10, which shows yet another operating state of the grooving machine in which a fixed tool is attached to the tool holder.

FIG. 6A shows the tool rests 18, 19 mounted on the saddles 8A, 8B on the front side of the cross rail 7. FIGS. 9A, 9B show a front elevational view and a side elevational view of tool-rest support mechanism in which the tool rest 19 are indicated by a two-dot chain line. Further, FIG. 10 shows one example of the operating state of the tool rest 19 in which a milling cutter unit 59 as a rotative tool 57 is fixed to the tool rest 19. FIG. 11 shows another example of the operating state of the tool rest 19 in which a drill 82 as the rotative tool 57 is fixed to the tool rest 19. FIG. 12 shows yet another example of the operating state of the tool rest 19 in which a single edged tool 58 or a multi-edged tool 74 as a fixed tool 69 is fixed to the tool rest 19. It should be noted that both of the tool rests 18, 19 may be provided with various kinds of rotative tools and fixed tools in a possible variety of combinations. The tool rests 18, 19 may also be provided with the cutting device 77 which will be described later or various kinds of groove cutting tools. For instance, the tool rests 18, 19 may be provided with the rotative tool 57 and the fixed tool 69, respectively. The tool rests 18, 19 may otherwise be provided with different fixed tools, e.g., the single edged tool 58 and the multi edged tool 74, respectively. Alternatively, the tool rests 18, 19 may be provided with different rotative tools 57, namely, the tool rest 18 is provided with one of the milling cutter unit 59 and the drill unit 65, while the tool rest 19 is provided with the other.

As is apparent from FIG. 9A, a pair of third guide rails 52B are disposed on the front surface of the saddle 8B so as to extend in the Z-axis direction, while being parallel to each other. The tool rest 19 (indicated by the two-dot-chain line) is mounted on the third guide rails 52B via the four linear bearings 53B, whereby the tool rest 19 is movable along the third guide rails 52B in the Z-axis direction. A screw shaft 12B is also disposed on the front surface of the saddle 8B so as to extend in the Z-axis direction. A ball nut 55B is threaded engaged with the screw shaft 12B. On the upper end portion of the saddle 8B, there is disposed a motor 13B for driving the screw shaft 12B. The operation of the motor 13B is suitably controlled so as to regulate a feed per revolution (i.e., an amount of depth of cut) of a tool fixed to the tool rest 19. A pair of balancers 56B are also disposed on the upper end portion of the saddle 8B. The presence of the balancers 56B ensures a stable weight balance of the tool rest 19 in the Z-axis direction, thus ensuring smooth displacement of the tool rest 19 and accurate positioning control of the tool rest 19. As is understood from the foregoing description, the circular platen 1, the gate-shaped column 11, the saddles 8A, 8B and the tool rests 18, 19 are driven and positioned by suitably controlled operation of the motor 21 for the C-axis control, the motor 40 for the X-axis control, the motors 47, 48 for the Y1-axis and Y2-axis control, and the motor 13A, 13B for the Z1-axis and Z1-axis control, in the present embodiment. These drive motors 21, 40, 47, 48, 13A, 13B may be servomotors of a pneumatic type, a hydraulic type, an electromagnetic type or other possible types.

In the present embodiment, the gate-shaped column 11 is guided to move in the X-axis direction by the first guide rails 5A, 5B, and the saddles 8A, 8B are guided to move in the Y-axis direction by the second guide rails 9A, 9B, while the tool rests 18, 19 are guided to move in the z-axial direction by the third guide rails 52A, 52B, as described above. Therefore, the cutting edges of the tools fixed to the tool rests 18, 19 can be accurately positioned in the above-indicated X, Y and Z-axis directions by utilizing a numerical control device (hereinafter referred to as "NC" device) 102. Namely, the NC device controls the operations of the drive motors 21, 40, 47, 48, 13A, 13B so that the positions of the gate-shaped column 11, the saddles 8A, 8B and the tool rests 18, 19 are accurately controlled. Further, the milling cutter unit 59 and the drill unit 65 are selectively detachably fixed to the tool rest 19. FIG. 10 shows one operation state of the grooving machine 10 in which the rotative tool 57 consisting of the milling cutter unit 59 having a milling cutter 81 (see FIG. 25) is fixed to the tool rest 19. FIG. 11 shows another operation state of the grooving machine 10 in which drill unit 65 having a drill 82 (see FIG. 26) is fixed to the tool rest 19.

There will be described a manner of operation of the grooving machine of the present invention when the grooving machine is operated under control of the NC device 102 for producing the polishing pad multiplicity of straight grooves arranged in the grid pattern, by way of example. First, the milling cutter units 59 are fixed to the tool rest 18 (19). Subsequently, the motor 21 is operated under control of the NC device 102 for detecting the current angular position of the circular platen 1 and then fixing the circular platen 1 in a predetermined angular position. The motor 40 is also operated under control of the NC device 102 for driving the gate-shaped column 11 to a desired position in the X-axial direction, while the motor 47, 48 are operated under control of the NC device 102 for driving the saddles 8A, 8B in the Y-axial direction, while the motors 13A, 13B are operated under control of the NC device 102 for driving the tool rests 18, 19 to a desired position in the Z-axial direction. Thus, the milling cutting unit 59 is accurately positioned on a desired portion of the foamed urethane pad, which portion is to be processed. With the milling groove cutting unit 59 being positioned as described above, the grooving process is performed according to a suitable processing program stored in a storage device of the NC device 102. Namely, a desired amount of depth of cut of the milling cutter 81 in the Z-axial direction are provided by the operation of the motor 13A, 13B under control of the NC device 102, while a desired amount of displacement of feed per revolution of the saddles 8A, 8B in the Y-axial direction are provided by the operation of the motors 47, 48 under control of the NC device 102.

On the other hand, in the case where the grooving machine is operated under control of the NC device 102 for forming a through hole through the foamed urethane pad 15, the drill unit 65 are fixed to the tool rest 18 (19). Like the above case where the grooving machine is operate to cut the grid-patterned grooves into the surface of the foamed urethane pad 15, the circular platen 1 is placed in the initial position, while the drill unit 65 is positioned on a portion of the urethane pad 15 which portion is to be processed. According to a predetermined processing program stored in the storage device of the NC device 102, the amount of depth of cut of the drill unit 65 in the Z-axial direction is produced by the operation of the motors 13A, 13B under control of the NC device 102. The rotation speed of the rotative tool 57 is suitably regulated by controlling the speed of the motor by the NC device 102.

When the grooving machine is operated under control of the NC device 102 for producing a polishing pad having a multiplicity of generally concentric annular grooves, the fixed tool 69 comprises a selective one of the single edged tool 58 and the multi-edged tool 74 is fixed to the tool rest 18 or 19 (e.g., the tool rest 19 as shown in FIG. 12). In this respect, any one of the single edged tool 58 and the multi edged tool 74 may be selected in the light of processing condition, a required cost of manufacture, or the like. The NC device 102 controls displacements of the gate-shaped column 11 in the X-axis direction, the saddle 8B in the Y-axis direction, and the tool rest 19 in the Z-axis direction, so as to place the fixed tool 69 in its initial position. Subsequently, the circular platen 1 is rotated about the C-axis under control of the NC device according to the predetermined control program. The fixing tool 69 is displaced in the Z-axis direction by a predetermined feed per revolution. In order to process all grooves at a generally constant process speed, the rotating speed of the circular platen 1 is changed depending upon the position of the fixing tool 69 in the Y-axis direction.

While one of the tool rest 19 has been described in detail in the aforementioned description, it should be appreciated that the other tool rest 18 is substantially similar in construction to the tool rest 19. Thus, the same reference numerals as used with respect to elements of the tool rest 19 will be used to identify the elements which are the same as or similar to those in the tool rest 18, and no redundant description of elements will be provided, for the sake of simplification of the description. The grooving machine constructed according to the present embodiment, permits that the rotative tool 57 (e.g., milling cutter 81 or drill 82) is fixed to one of the tool rests 18, 19 and the fixed tool 69 (e.g., the single edged tool 58 and the multi-edged tool 74) is fixed to the other one of the tool rests 18, 19. Preferably, these tool units or other various kinds of tool units are easily detachably fixed to the tool rests 18, 19, thus facilitating interchange of the tools. This makes it possible to select and use a suitable tool depending upon a kind of material of the foamed urethane pad 15, and condition of the cutting, thus assuring a further improved dimensional or shape accuracy of the formed grooves. It should be understood that the motors 21, 40, 47, 48, 13A, 13B may be constituted by linear motors rather than the illustrated servomotors, for ensuring an high accuracy of positioning and an improved speed of response of the circular platen 1, the gate-shaped column 11, the saddles 8A, 8B, the tool rests 18, 19 which are moved by these motors in the X, Y1, Y2, Z1, Z2 axes.

(e) Numerical Control Device to Control Motor and Control Axis

Numerical control device 102 is adapted to control operation of the motors 13A, 13B, 21, 40, 47, 48, so that the circular platen 1, the gate-shaped column 11, the saddle 8A, 8B, the tool rests 18, 19 are accurately and smoothly positioned in the C, X, Y and X axes, respectively. The numerical control device 102 permits to control the motors 13A, 13B to regulate the feed per revolution of the tool rests 18, 19 at minute units. The numerical control device 102 enables an automatic synchronizing control operation of the plurality of motors, according to a suitable control program that is stored in its storage device in advance. In this storage device of the NC device 102, a plurality of grooving patterns to be reproduced on the surface of the foamed urethane pad 15 are stored in advance. A suitable grooving pattern is selected from the stored grooving patterns, then the operations of the processing program for the selected grooving patterns with respect to the respective control axes C, X, Y, Z are prepared. According to this predetermined processing program, the grooving machine of this embodiment is automatically operated so as to reproduce the selected grooving pattern on the surface of the polishing pat.

Figure 13:
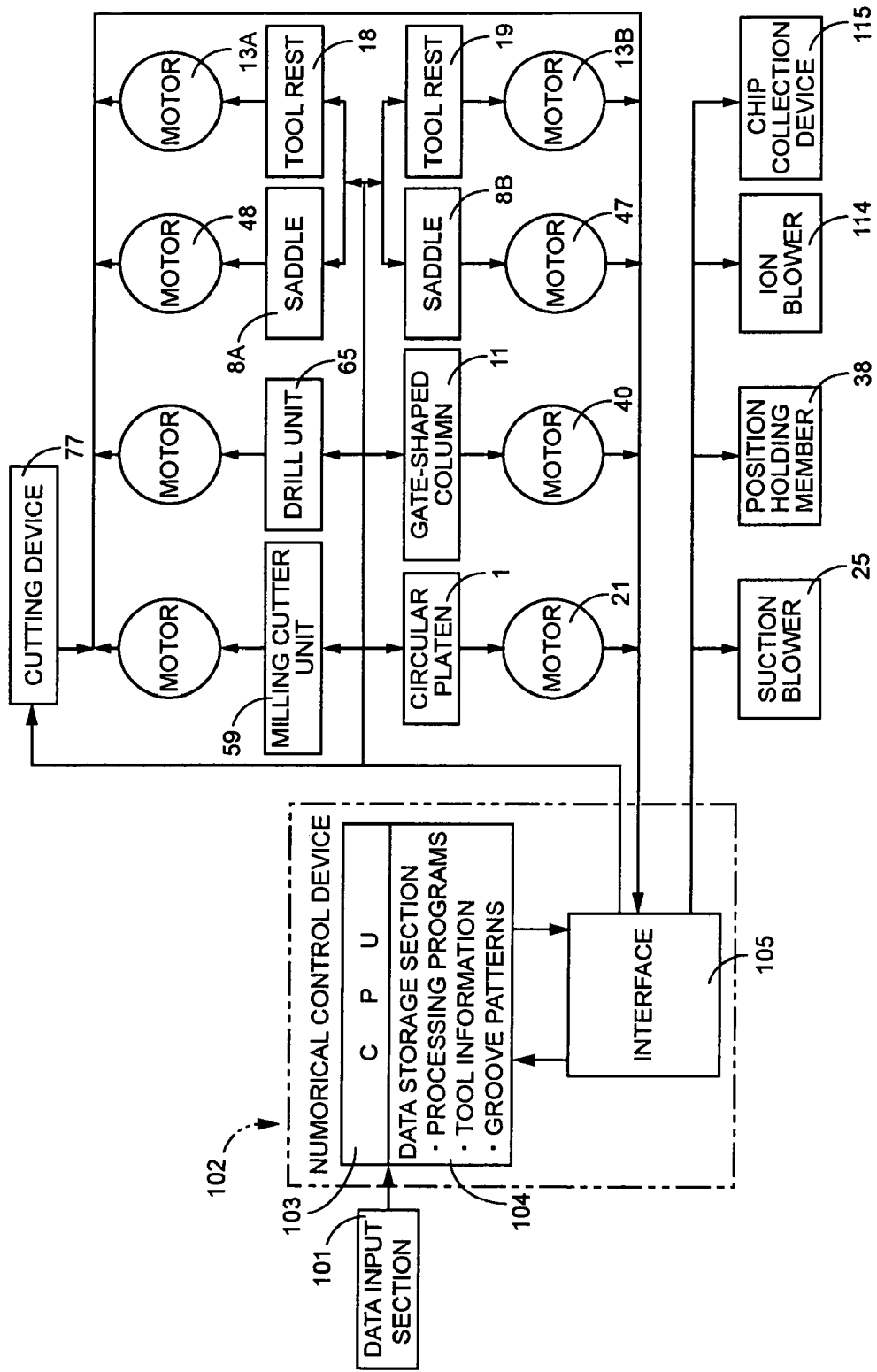
FIG. 13 is a block diagram schematically illustrating an essential structure of a numerical control device employed for controlling operation of the grooving machine of FIG. 1A.

Referring next to FIG. 13, there is shown a block diagram schematically showing a control system of the NC device 102 adapted to control operation of the grooving machine. Described in detail, the NC device 102 includes data input section 101, a central processing unit (CUP) 103, a data storage section 104 and an I/O interface. Upon starting the grooving process under control of the NC device 102, a tool command representing a kind of required tool, and dimensional information of the required tool is applied to the numerical control device 102 through the data input section 101. The required tool is suitably determined depending upon a desired groove pattern, e.g., a grid pattern or a generally concentric annular groove pattern. This tool command is stored in the data storage section 104 via the CPU 103. Once an operation command is applied from the input section 101, the CPU 103 controls operation of the respective motors 13A, 13B, 21, 40, 47, 48, and the cutting device 77 according to a suitable processing program with reference to data stored in the storage section 104, so that the operations of the circular platen 1, the gate-shaped column 11, the saddles 8A, 8B, the tool rests 18,19 and the milling cutter unit 59, the drill unit 65 are accurately controlled. Each motor is equipped with an encoder. An amount of rotation of the motor detected by the encoder is applied to the NC device so that the NC device controls the operation of the grooving machine in a feedback control fashion. The CPU 103 also controls operation of the suction blower 25, the position holding member 38 of the circular platen 1, the ion blower 114, and a chip collection device 115.

It should be appreciated that the operation of the grooving machine may be controllable by utilizing a sequential control device 110, instead of the NC device 102 as described above. The use of the sequential control device 110 instead of the numerical control device 102 enables to simplify the entire control system and reduce the cost of the device, although accuracy of control in positioning, feeding, and cutting are somewhat limited in comparison with that in the numerical control device. 102. Therefore, one of the numerical control device 102 and the sequential control device 110 may be optionally selected depending upon the use or processability of the foamed urethane pad 15.

Referring next to FIG. 14, there is shown a block diagram schematically showing a sequential control system of the sequential control device 110 adapted to control operation of the grooving machine. Described in detail, the sequencer device 110 includes an operation panel 121, a sequencer circuit section 122, a sequential action determining section 123, and a sequencer data output section 124. Upon starting the grooving process of the grooving machine under control of the sequencer device 110, various kinds of data including positional data of the control axes and process data with respect to feed per revolution, an amount of depth of cut, or the like, and a suitable sequential control program representing a predetermined sequence of processing steps, are applied to the sequencer circuit 122 via the operation panel 121. The sequencer circuit 122 outputs the data received from the operation panel 121 to the sequential action determining section 123 that comprises a sequencer unit and relay circuits. The sequential action determining section 123 outputs action data to the sequencer data output section 124. The sequencer data output section outputs an action command signal based on the action data to a positioning drive motor 125 operable for controlling positions feed rates, and or depths of cuts of the components arranged in the X, Y1, Y2, Z1, Z2 C axes, a drive motor 126 adapted to drive the rotative tool 69, and a drive motor 127 adapted to drive the cutting device 77, so that these drive motors 125, 126, 127 are operated according to the received action command signals. The sequencer data output section 124 is operable to generate next action command signals to the drive motors 125, 126, 127 each time the operations of these motors 125, 126, 127 according to the current command signals are terminated. That is, the sequencer device 110 controls the operation of these drive motors 125 126, 127 in an open-loop control fashion. In the present embodiment, the positioning motors 125, the drive motors 126, 127 may be constituted by utilizing pulse motors. Meanwhile, the grooving machine is provided with various kinds of associated equipments 128 including the ion blowing device 114, the suction blower 25, the position holding device 38, the chip collection device 115. The operation of the associated equipments 128 can be controlled directly through the operation panel 121.

(f) Ion Blowing Device

Figure 15A:
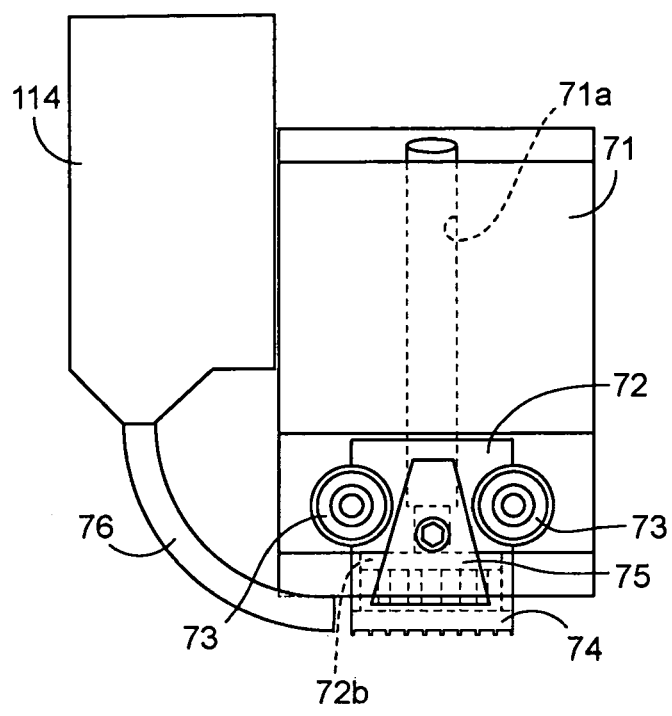
FIG. 15A is a front elevational view of an ion blowing device used in the grooving machine of FIG. 1 for neutralizing charged components of the grooving machine.
Figure 15B:
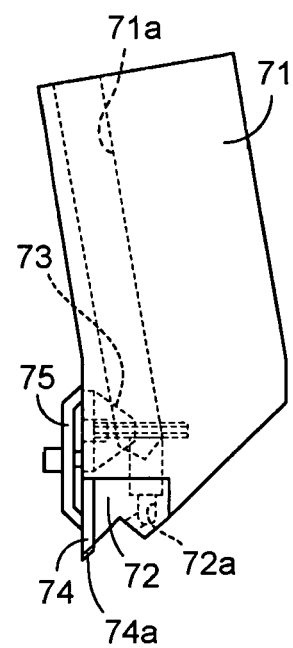
FIGS. 15B and 15C are a side and a bottom elevational view of the ion blowing device, respectively.

Referring next to FIGS. 15A, 15B, there is shown the ion-blowing device 114 adapted to generate and blow positive ions formed by corona discharge. The ion-blowing device 114 includes a compressed air generator (not shown) and a blower nozzle 76, so that the generated positive ions are discharged through the blower nozzle 76 together with the compressed air. Alternatively, the positive ions are discharged through holes 71(*a*), 72(*a*) which will be described later. This ion-blowing device 114 is disposed in a portion of the grooving machine such that a protruded open-end portion of the blower nozzle 76 is located in the vicinity of the attached cutting tool, e.g., the fixed tool 69 or the rotative tool 57 (the multi-edged tool 74 is attached in FIGS. 15A–15C by way of example). When the foamed urethane pad 15 is subjected to the grooving process, cut fragments or chips of the foamed urethane pad 15 are likely to be electrically charged due to friction between the cutting tools and the urethane pad 15, and stick to the surface of the urethane pad 15 and the cutting tools, resulting in difficulty in removing the charged chips from the surfaces of the cutting tool and the urethane pad. To cope with this problem, the ion blowing device 114 is operated to blow the positive ions on the chips stuck to the cutting tool and the foamed urethane pad 15, while the grooving process is executed for the foamed urethane pad 15, whereby the chips are effectively neutralized and removed from the cutting tool and the urethane pad 15. When the multi-edged tool 74 of the fixed tool is used for forming simultaneously a plurality of grooves on the foamed urethane pad 15, in which a plurality of cutting edges are juxtaposed to each other, it is required to evenly blow the positive ions on the respective cutting edges so that the positive ions forcedly come into collision with the charged chips. To meet this requirement, the protruded open-end portion of the nozzle 76 may be suitably arranged.

Figure 15C:
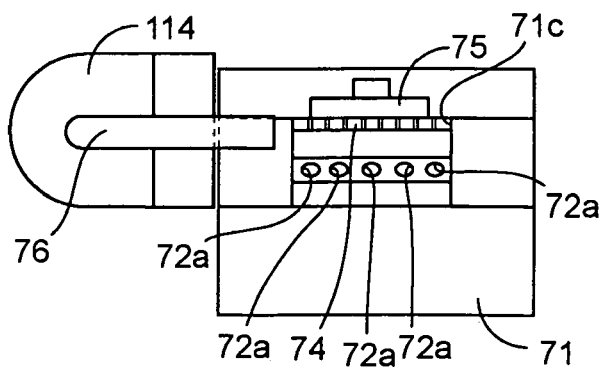

FIGS. 15A–15C show a front, a side and a bottom elevational view of the ion-blowing device 114 that is fixed to a tool holder 71. The tool holder 71 has a rectangular block shape and detachably fixed to the side face of the tool rest 18 (19) by means of suitable fastening means such as a bolt. The tool holder 71 has the above mentioned through hole 71*a* formed therethrough in the vertical direction as seen in FIG. 15A through which positive ions are discharged. To the bottom face of the tool holder 71, a rectangular block shaped tool cartridge is fixed such that the tool cartridge 72 is supported by tapered bush 73 so as to be positioned in the vertical direction as seen in FIG. 15A. The tool cartridge 72 has the above-indicated plurality of straight holes 72*a* extending therethrough in the vertical direction as seen in FIG. 15A. These straight holes 72*a* are held in communication with the through hole 71*a* of the tool holder 71, so that the lower end of the through holes 71*a* is exposed to the atmosphere through the straight holes 72*a*.

As shown in FIG. 15A, the multi edged tool 74 is fixed to the tool holder 71 by way of example. The multi edged tool 74 may be a tool detachably installable on the tool holder 71 with high accuracy. For instance, the multi edged tool 74 is fixed to the tool cartridge 72. The cartridge 72 is positioned relative to the tool holder 71 by means of tapered bushes 73, 73. The cartridge 72 is guided by the side walls of the tool holder 71, and is firmly fitted to the tool holder 71 by means of a pressing plate 75 that is bolted to the tool holder 71. The positive ions can be discharged from the side of the attached tool through the nozzle 76. In the case where the multi edged tool 74 is attached to the tool holder 71 as described above with the compressed air, the ion blowing device 114 may be arranged to blow the positive ion through the through hole 71*a* formed through the tool holder 71 and the straight holes 72*a* formed through the cartridge 72 instead of or in addition to the nozzle 76. In the ion-blowing device 114, the compressed air generator may be disposed within the nozzle 76, or the straight holes 72*a*, for example. Alternatively, the compressed air generator may be constituted by utilizing an external compressed air source that is held in fluid communication with the nozzle 76 or the like via an air conduit. It should be appreciated that the compressed air generator is interpreted to mean the overall structure thereof including the air conduit connecting between the external compressed air source and the nozzle 76 or the like.

Instead of the multi-edged tool 74, the single edged tool 58, and the rotative tool such as the milling cutter unit 59 and the drill unit 65 may be mounted on the tool holder 71, likewise. In this case, the blowout of the ion may be possibly executed through the nozzle 76. It should be understood that the construction of the blower passage of the ion blow device 114 is not limited to the above, but may otherwise be modified, as needed.

(g) Fixed Tool (Turning Tool/Cutting Tool)

(1) Turning Tool (Single Edged Tool and Multi Edged Tool)

Figure 16A:
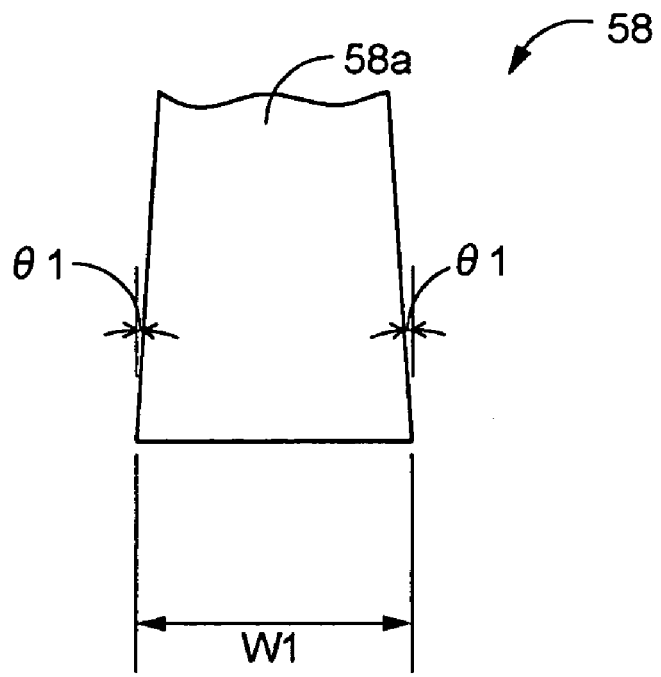
FIGS. 16A and 16B are a front and a side views of a turning tool having a single cutting part, which is usable in the grooving machine of FIG. 1.
Figure 16B:
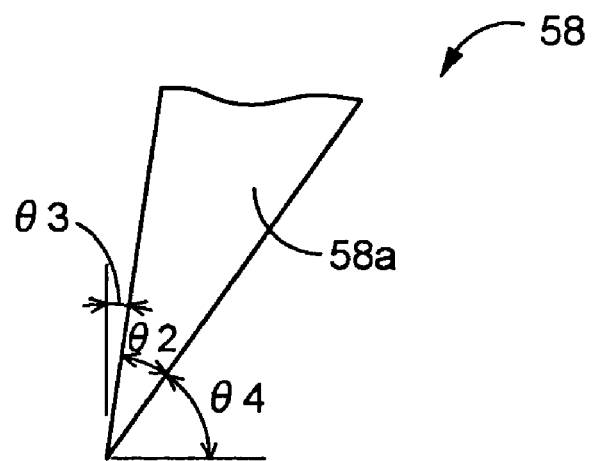
Figure 17A:
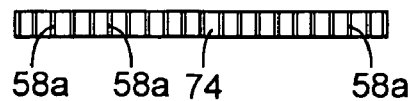
FIGS. 17A, 17B and 17C are bottom, side and front views of a turning tool having a plurality of cutting parts, which is usable in the grooving machine of FIG. 1.
Figure 17B:
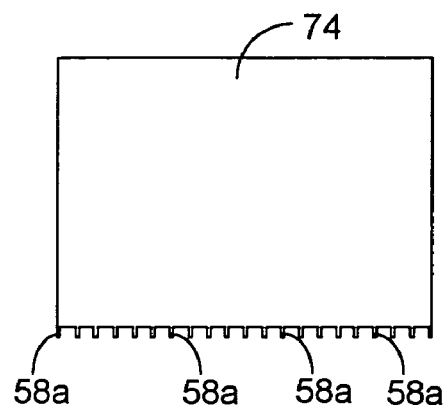
Figure 17C:
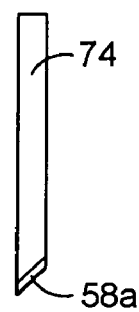

FIGS. 16A and 16B show a front and a side elevational view of the single edged tool 58 as one example of the fixed tool 69. FIGS. 17A–17C shows a bottom, a front and a side elevational view of the multi edged tool 74 as another example of the fixed turning tool 69. The single edge tool 58 and the multi edged tool 74 are suitably used for the grooving process in which the plurality of generally concentric annular grooves are formed on the surface of the foamed urethane pad 15.

The single edged tool 58 has a cutting part 58a that is arranged as follows so that the single edged tool 58 is suitable for cutting a working piece made of a resin material, e.g., a foamed urethane pad. Namely, the cutting part 58a of the single edged tool 58 has a tooth width: W1 within a range of 0.005–1.0mm, a side clearance angle: $\theta 1$ within a range of 0–3 degrees, as shown in FIG. 16A. Further, the cutting tooth of the single edged tool 58 has a wedge angle: $\theta 2$ within a range of 15 –35 degrees, a rake angle: $\theta 3$ within a range of 10–20, and a front clearance angle $\theta 4$ within a range of 45–65 degrees, as shown in FIG. 16B. These angles of respective parts of the cutting part 58a of the single edged part 58a are determined taking into account a problem of interface between the cutting part 58a and walls of the foamed grooves and a required strength of the cutting part 58a. Preferably, the single edged part 58a is made of a rigid material, such as hard metal, high speed steel, carbon steel, ceramics, cermet, and diamonds.

As shown in FIGS. 17A–17C, the multi-edged tool 74 has a thin rectangular plate-like shape and includes a plurality of cutting parts 58a integrally formed on and protruding from its bottom end as seen in FIG. 17A, such that the plurality of cutting parts 58a are arranged in a longitudinal direction of the multi-edged tool 74 at regular intervals within a range of 0.2–2.0 mm, over a substantially entire area of the bottom end of the multi-edged tool 74. It is noted that each of the plurality of cutting parts 58a of the multi-edged tool 74 is dimensioned identically with the cutting part 58a of the single edged tool 58. That is, the multi-edged tool 74 serves as a tool tip having a plurality of cutting parts 58a integrally formed in the end portion thereof.

Figure 18:
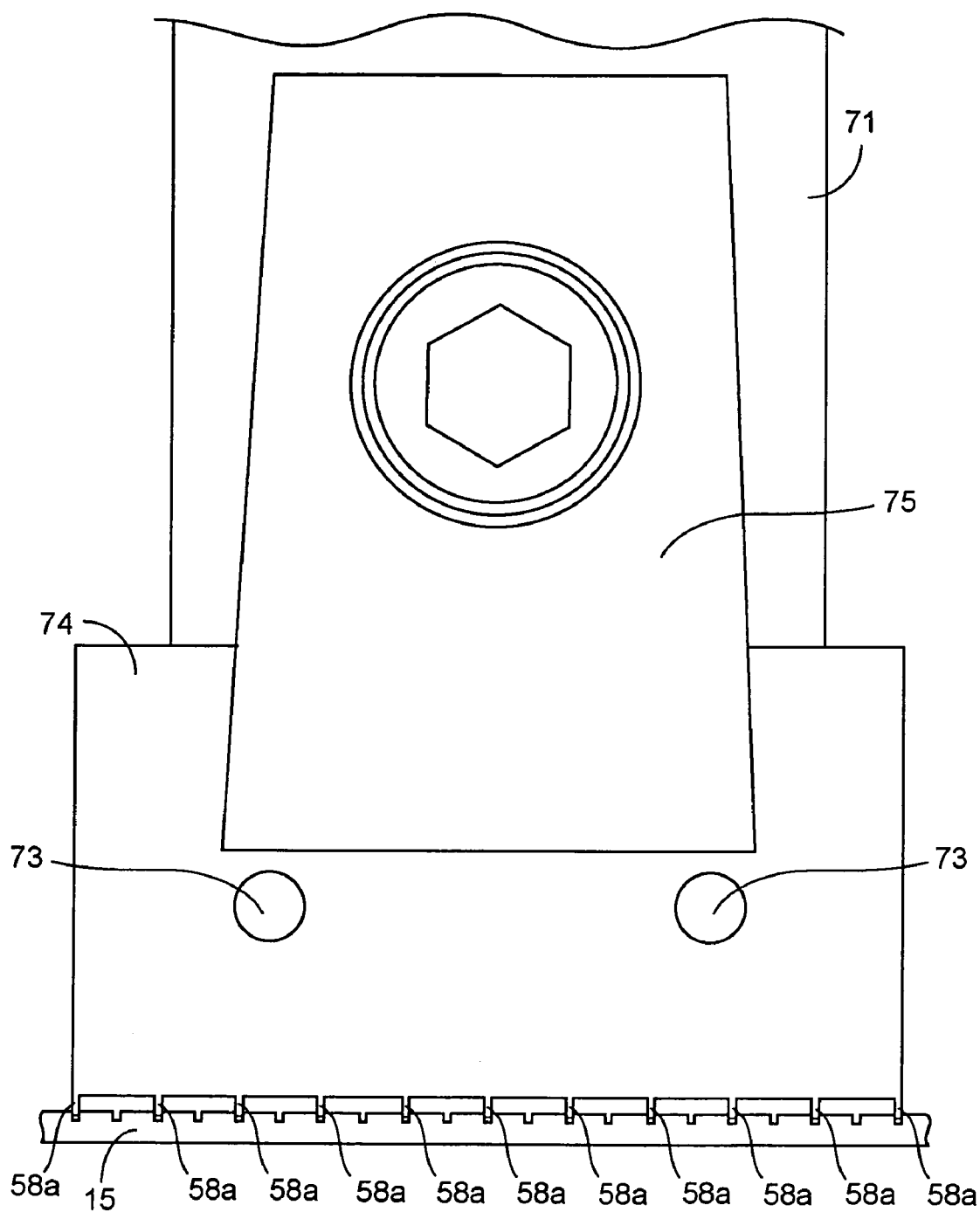
FIG. 18 is an enlarged front elevational view of one example of a tool tip.
Figure 19A:
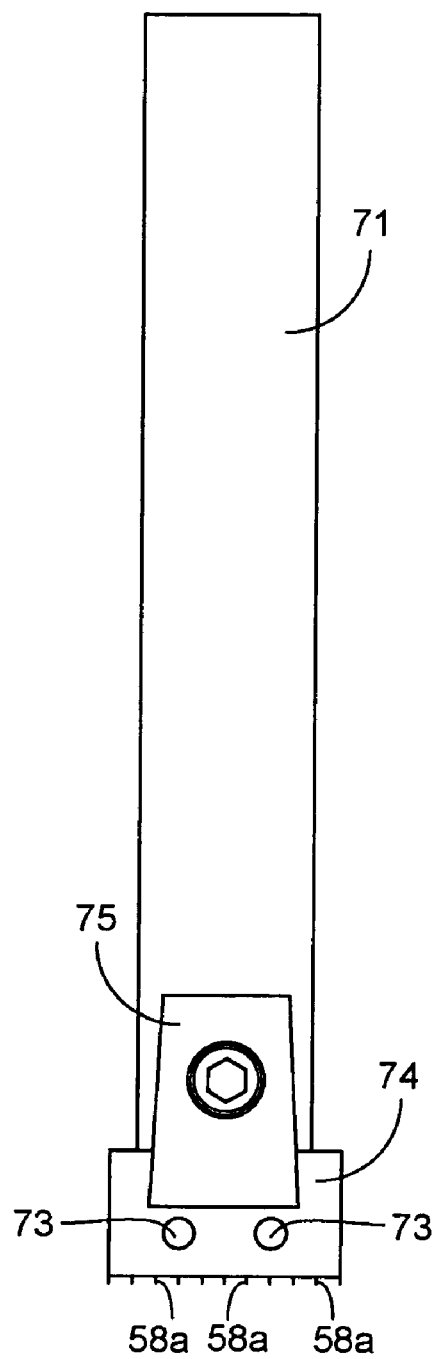
FIGS. 19A and 19B are a front and a side view of a tool holder to which the tool chip of FIG. 18 is attached.
Figure 19B:
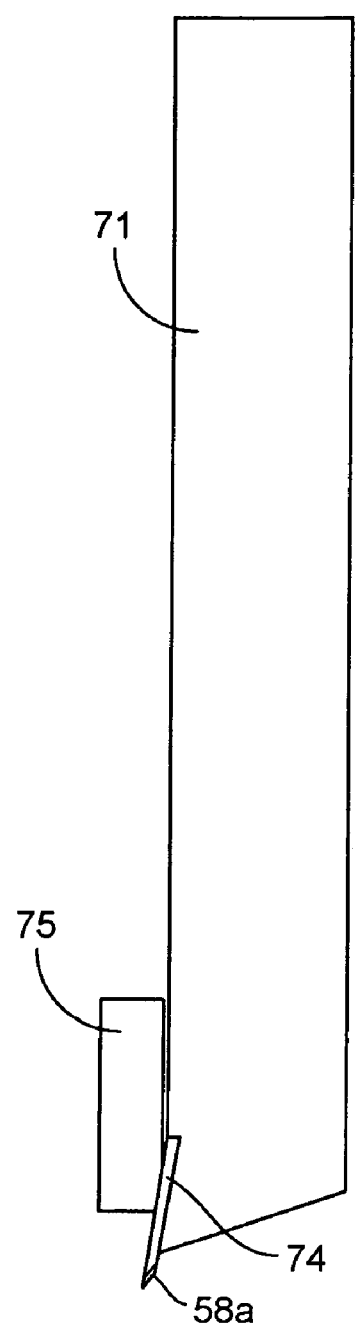
Figure 20:
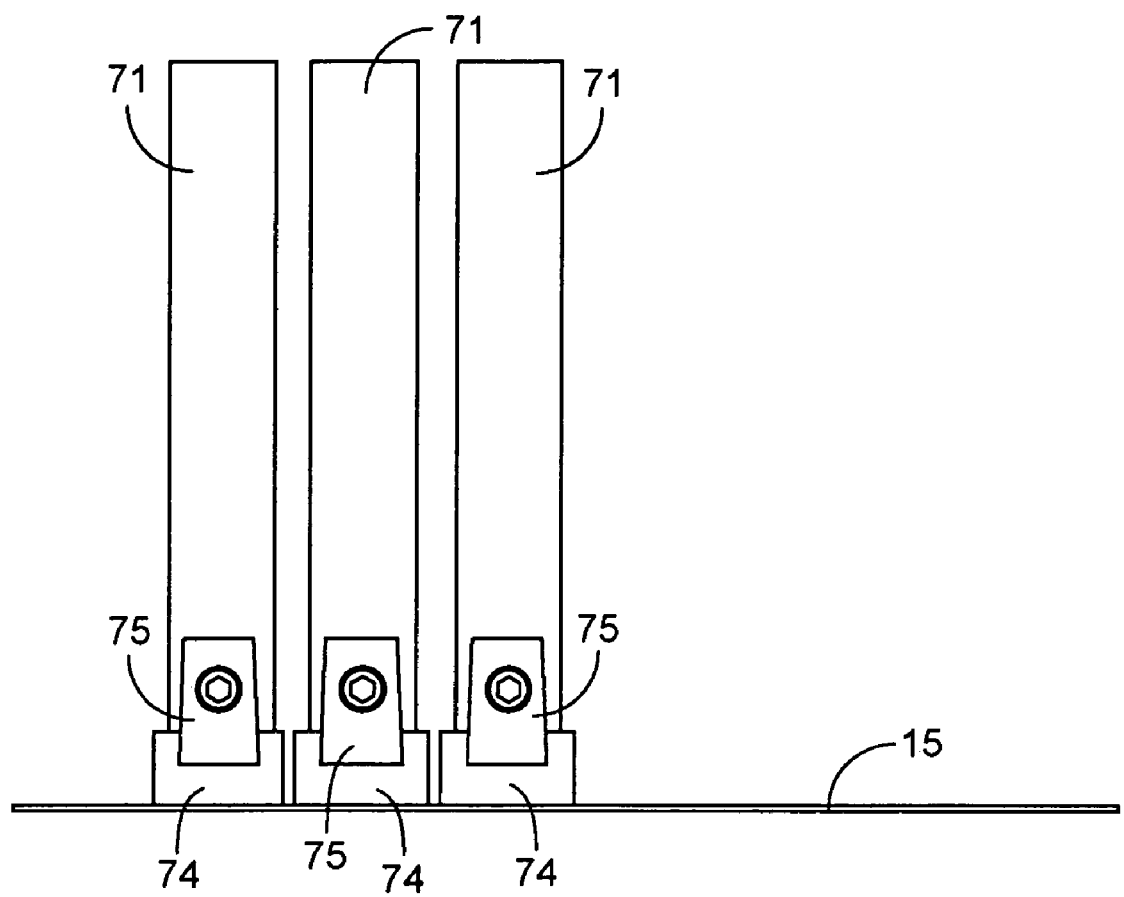
FIG. 20 is an explanatory view showing one example of operation state of the grooving machine of FIG. 1, in which a plurality of tool chips attached to the tool holder are arranged in one direction.
Figure 21:
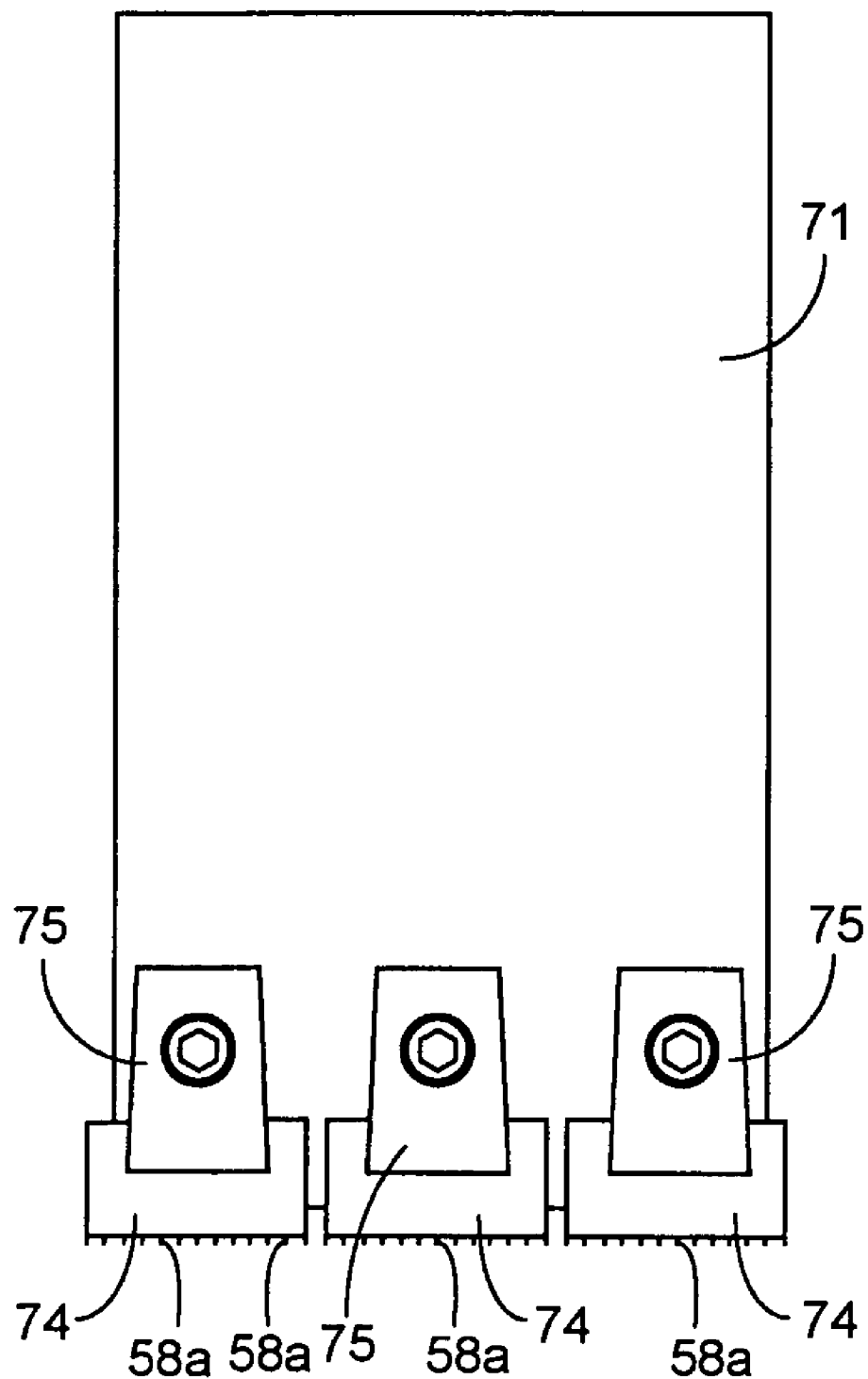
FIG. 21 is an explanatory view showing one example of operation state of the grooving machine of FIG. 1, in which a plurality of tool chips of FIG. 18 are fixed to the tool holder.

Referring next to FIGS. 18 and 19, there is shown by way of example the multi-edged tool 74 in the form of the tool tip, which is fixed to the bottom end portion of the tool holder 71, such that the multi-edged tool 74 is gripped by and between the tool holder 71 and the pressing plate 75. Positioning pins 73 fitted to the multi-edged tool 74 is used for positioning the multi-edged tool 74 relative to the tool holder 71. The tool holder 71 equipped with the multi-edged tool 74 as shown in FIG. 19, may be solely fixed to the tool holder 18 (19). Alternatively, a plurality of tool holders 71 each equipped with the multi-edged tool 74 may be fixed to the tool holder 18 (19), as shown FIG. 20. In this case, the cutting parts 58a of the plurality of multi-edged tools 74 may be arranged at regular intervals, thus permitting high efficiency in cutting a plurality of grooves on the foamed urethane pad 15. As is apparent from FIG. 21, it may be possible to fixed a plurality of multi-edged tools 74 to the tool holder 71 such that the cutting parts 58a are arranged at regular intervals. This arrangement facilitates the formation of the plurality of grooves on the foamed urethane pad 15, likewise.

Figure 22A:
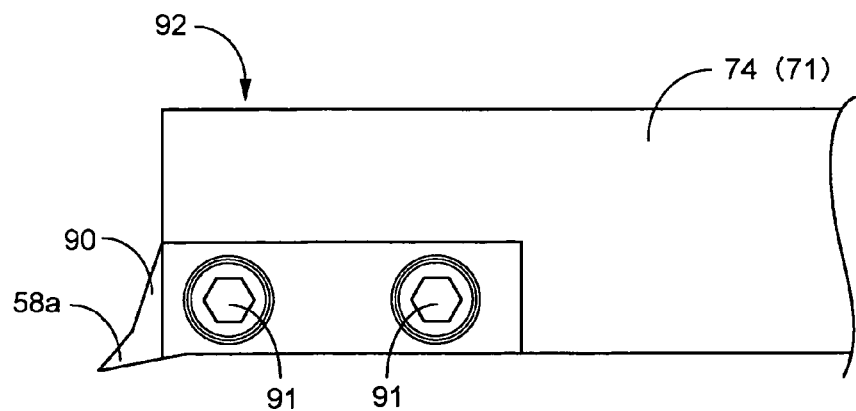
FIG. 22A is an enlarged side view of one example of a multi-edged tool tip in which a plurality of cutting parts are laminated one another.
Figure 22B:
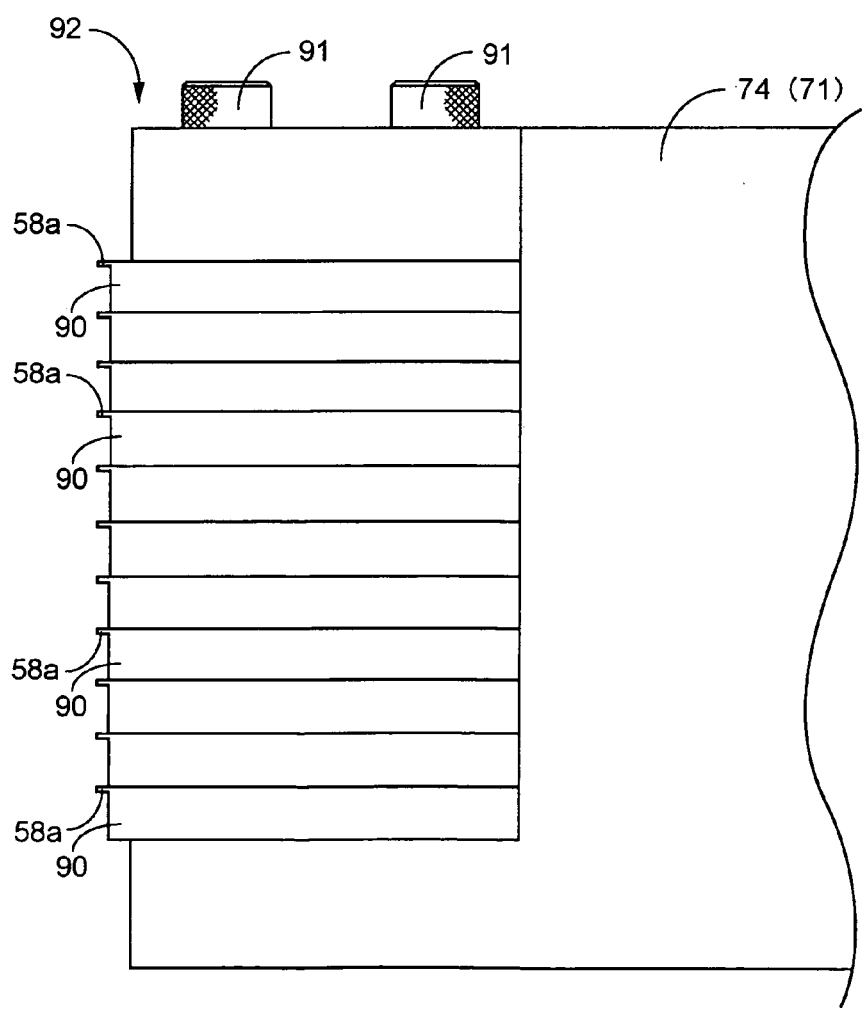
FIG. 22B is an enlarged front elevational view of the multi-edged tool of FIG. 22A.
Figure 23A:
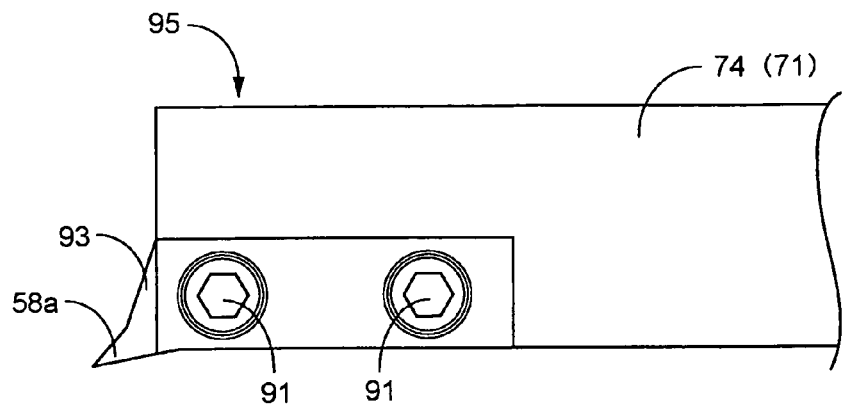
FIG. 23A is an enlarged side view of another example of a multi-edged tool tip in which a plurality of cutting edges are laminated one another.
Figure 23B:
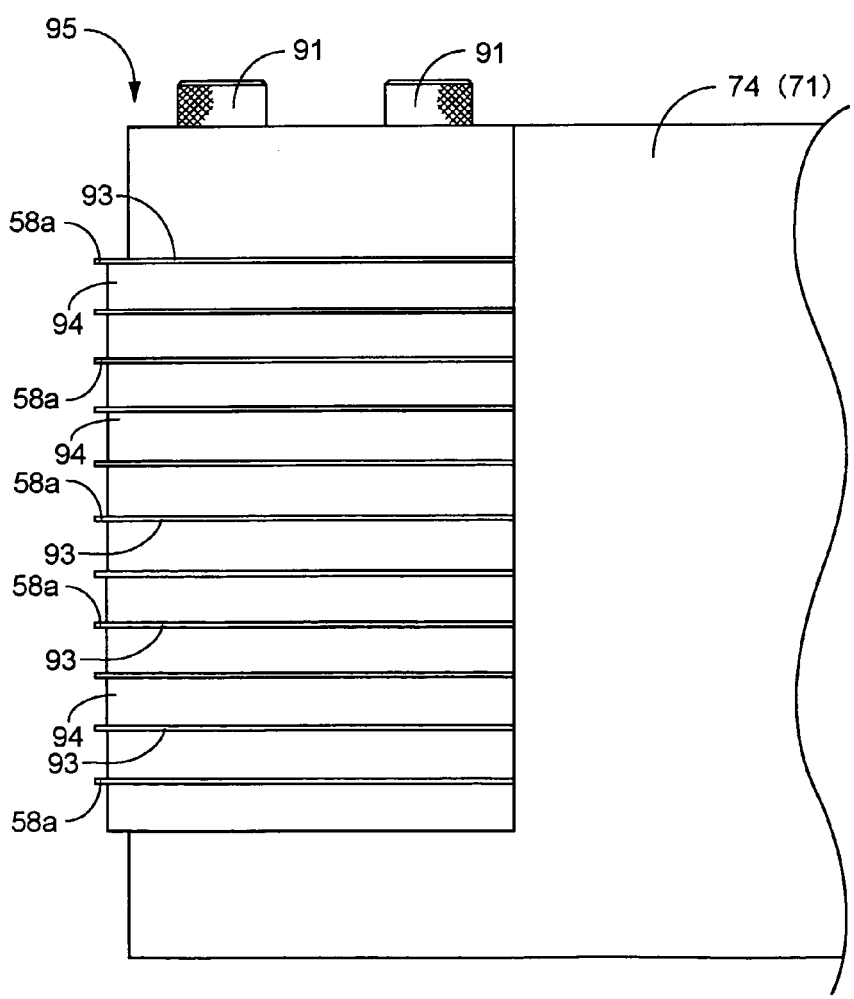
FIG. 23B is an enlarged front elevational view of the tool tip of FIG. 23A.

Referring next to FIGS. 22, 23, there are schematically shown another type of multi-edged tools 92, 95 according to the present invention by way of example. As is apparent from FIG. 22, the multi-edged tool 92 includes a plurality of cutting tips 90 each having a single cutting part 58a. The plurality of cutting tips 90 are superposed on each other and are detachably fixed together and fixed to the lower end portion of the tool holder 71 by means of bolts 91 such that the cutting tips 90 are spaced apart from each other with regular intervals in the width direction of the tool holder 71. As is apparent from FIG. 23, the multi-edged tool 95 includes a plurality of cutting tips 93 each having a single cutting part 58a. Unlike the multi-edged tool 92, the cutting tooth tips 93 are superposed on each other with spacers 94 interposed between adjacent ones of the cutting tooth tips 93. The presence of the spacers 94 makes it easy to keep the spacing between adjacent ones of the cutting tooth chips 93 constant. The lamination consists of the plurality of cutting tooth tips 93 and the spacers 94 interposed between adjacent ones of the cutting tips 93 are detachably fixed together and fixed to the lower end portion of the tool holder 71 by means of bolts 91. The thus constructed multi-edged tools 92, 95 permit an effective muss-production of the tools, an improved flexibility for a change of the pitch and an ease replacement of the cutting parts 58.

(2) Cutting Tool

Figure 24C:
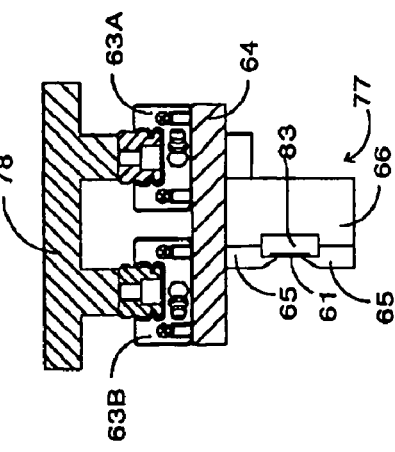
FIG. 24C is a cross sectional view of the cutting device, taken along line C—C of FIG. 24B.
Figure 24A:
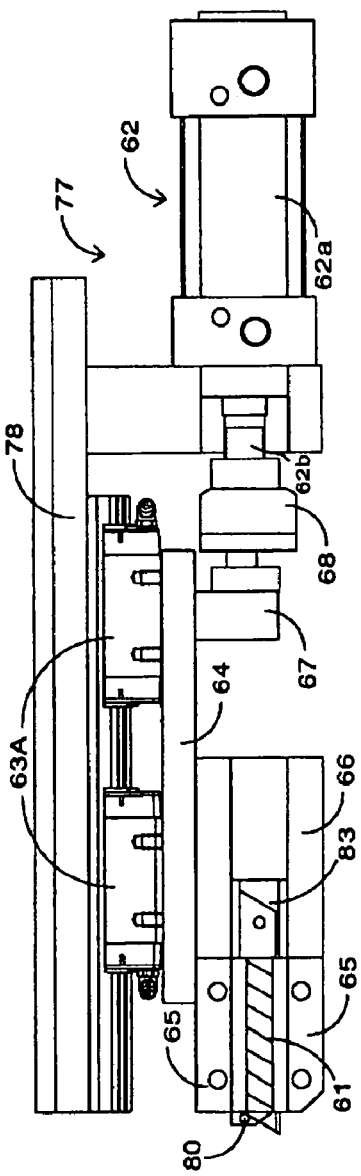
FIG. 24A is a side view of one example of a cutting device usable in the grooving machine of FIG. 1.
Figure 24B:
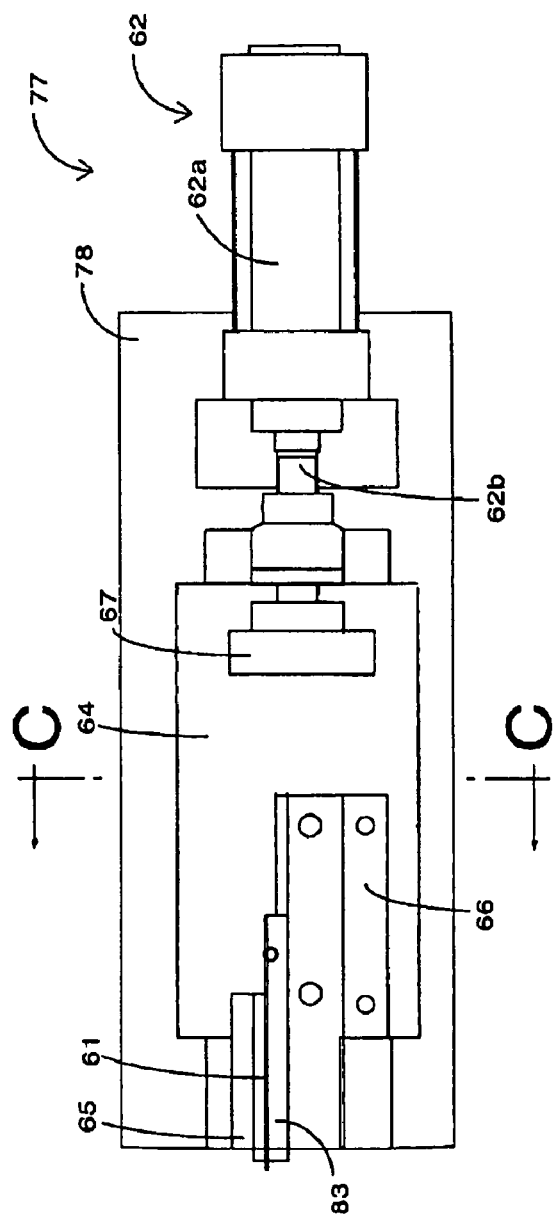
FIG. 24B is a front elevational view of the cutting device.

Referring next to FIGS. 24A–24C, there are respectively shown a side elevational view, a front elevational view and a cross sectional view taken along line C—C of FIG. 24B of the cutting device 77 which is adapted to be mounted on the tool rest 18 (19) disposed on the saddle 8A (8B) of the cutting machine constructed according to the present embodiment. The cutting device 77 is operable to cut primary peripheral portion of the foamed urethane pad 15 to shape the external form of the foamed urethane pad 15 desirably. More specifically described, the cutting device 77 includes: a base 78; a fourth guide rails 63A, 63B disposed on the base 78 so as to extend parallel to each other in the Z-axis direction; a tool rest 64 disposed on the base 78 via the pair of fourth guide rails 63A. 63B so as to be movable in the Z-axis direction; a cutting tool holder 66 mounted on the tool rest 64; and a power source 62 disposed on the base 78 so as to generate a drive power by which the tool rest 64 is moved in the Z-axis direction. A cutting tool 61 is fixed to the cutting tool holder 66 such that a base portion of the cutting tool 61 is fitted into a cutting tool base 83 formed in the cutting tool holder 66, while being supported by the a pair of tool supports 65 with its protruding end portion supported by a stopper pin 80. An output member of the power source 62 is connected to a support member 67 disposed on the tool rest 64 via a connecting metal member 68, thus transmitting output power of the power source 62 to the tool rest 64. Thus, the cutting tool 61 is driven in the Z-axis direction. It should be understood that the power source 62 may comprises a piston-cylinder mechanism of pneumatics type or hydraulic type, or a solenoid-type actuator. It should be further understood that the cutting tool 61 may otherwise be constituted by a suitable turning tool for assuring further improved cutting ability of the cutting device 77.

(h) Rotative Tool (Milling Cutter and Drill)
(1) Milling Cutter

Figure 25A:
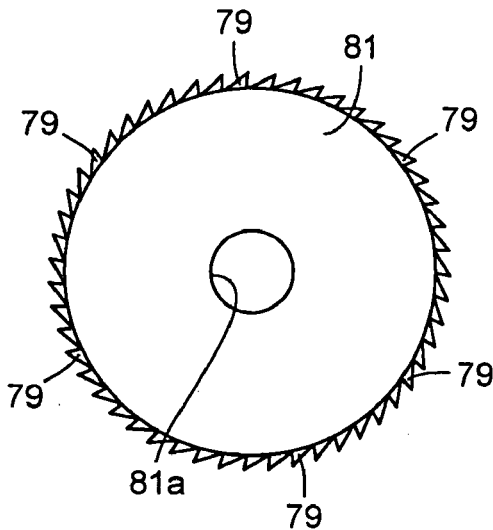
FIG. 25A is a plane view of one example of a milling cutter attachable to the milling tool of FIG. 10.
Figure 25B:
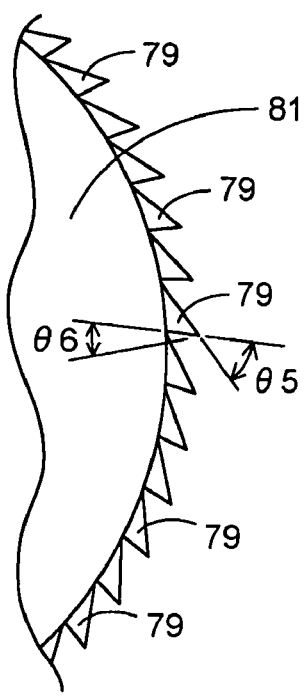
FIG. 25B is a fragmentally enlarged view of the milling cutter of FIG. 25A.

FIG. 25A shows a front view of one example of a milling cutter 81 for forming a fine groove, which is fixed to the grooving milling cutter unit 59. FIG. 25B shows an enlarged view of cutting parts 79 of the milling cutter 81 of FIG. 25A. The milling cutter 81 is a thin circular disk member, which has a center hole 81a formed therethrough and a plurality of cutting part 79 integrally formed in its outer peripheral portion such that the plurality of cutting part 79 are arranged in a circumferential direction of the grooving milling cutter 81 with a uniform pitch. Each of the cutting parts 79 is dimensioned to have a wedge angle: $\theta5$ within a range of 20–45 degrees, since the wedge angle: $\theta5$ smaller than 20 degrees may cause undesirable shortening of the life of the grooving milling cutter 81, while the wedge angle: $\theta5$ larger than 45 degrees may cause deterioration of cutting capability of the cutting tooth 79. Further, the each cutting parts 79 is dimensioned to have a rake angle: $\theta6$ within a range of 30–40 degrees, more preferably at around 30 degrees, since the rake angle: $\theta6$ smaller than 30 degrees may cause deteriorated stability of the milling cutter 81, while the rake angle: $\theta6$ larger than 40 degrees may cause deterioration of cutting capability of the cutting tooth 79. Yet further, the each cutting tooth 79 is dimensioned to have a side cutting edge angle within a range of 0–2 degrees and a tooth width within a range of 0.3 mm–2.0 mm. The thus formed milling cutter 81 is disposed radially outwardly on a tool shaft formed on the lower portion of the grooving milling cutter unit 59 and rotated in a predetermined circumferential direction by the drive motor 126. The number of the milling cutter 81 fixed to the tool shaft is not particularly limited. For instance, a plurality of grooving milling cutters 81 may be fixed to the tool shaft with constant intervals within a range of 0.1 mm or more, so that a plurality of grooves arranged in a grid pattern are formed on the foamed urethane pad 15 with improved efficiency.

(2) Drill

Figure 26A:
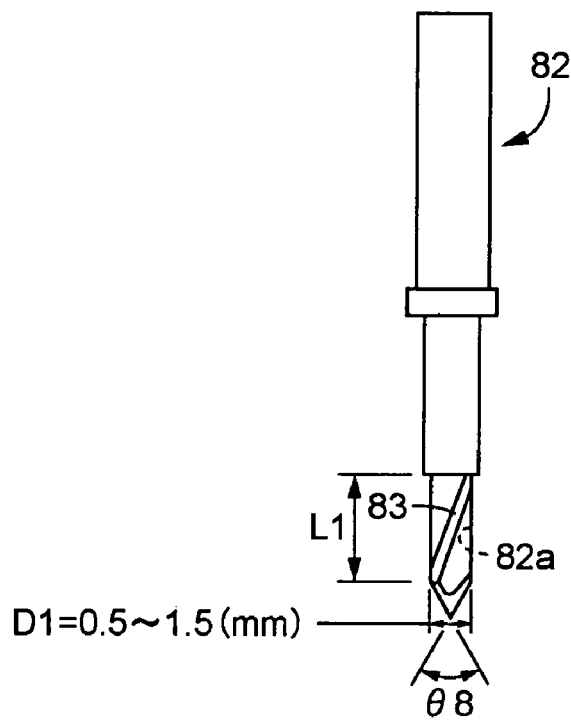
FIG. 26A is a plane view of one example of a drill attached to a drill unit of FIG. 11.
Figure 26B:
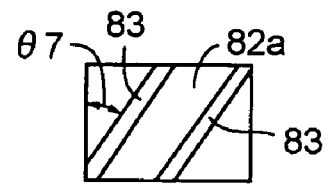
FIG. 26B is an exploded view of a major cutting edge portion of the drill of FIG. 26A.

FIG. 26A shows a front elevational view of one example of a drill 82 to be fixed to the drill unit 65, and FIG. 26B shows an exploded view of a cutting part 82a of the drill 82. As shown in FIG. 26A, the drill 82 has a diameter: D1 within a range of 0.5 mm–1.5 mm and a length: L1 within a range of 20–30 mm. As shown in FIG. 26B, the cutting part 82a of the drill 81 includes two cutting edges 83, 83. The end edge portion of the drill 82 has a cone angle $\theta8$ within a range of 55–65 degrees, more preferably at around 60 degrees, thus assuring a smooth inserting of the drill 81 into the work piece. A helix angle: $\theta7$ of the two cutting edges 83, 83 is arranged to be held within a range of 1–10 degrees, preferably at about 5 degrees. This arrangement makes it possible to gradually cut a part of the foamed urethane pad 15 located around the edge of the drill 82, thereby forming a desired hole having a predetermined diameter. The number of the drill 82 fixed to the drill unit 65 is not particularly limited. For instance, a plurality of drill 82 may be fixed to the drill unit 65 to form a multi-shaft type drill unit, so that a plurality of holes are formed into the foamed urethane pad 15 with improved efficiency.

There will be described a method of producing a multiplicity of grooves on the surface of the foamed urethane pad 15 by using the grooving machine constructed according to the present invention by way of example.

(i) Concentric Fine Grooves

Referring next to FIGS. 27A, 27B, there is shown a polishing pad fabricated according to one preferred embodiment of the invention by way of example. The polishing pad is formed by cutting a multiplicity of generally concentric grooves into the surface of the foamed urethane pad 15 having a thickness: T1 within a range of 1.0 mm–2.0 mm. The generally concentric grooves have a width: W1 within a range of 0.005–1.0 mm, a depth: D1 within a range of 0.2–2.0 mm, and a pitch: L2 within a range of 0.2–2.0 mm. For producing the polishing pad of the present invention, initially, the single-edged cutting tool 58 or the multi-edged cutting tool 74 is fixed to the tool rest 18 (19), while a base for desired polishing pad, e.g., the foamed urethane pad 15 is placed on the suction plate 16 of the circular platen 1. Preferably, the foamed urethane pad 15 is shaped to have a circular-disk shape identical in size with the circular platen 1 in advance, by cutting. The cutting of the foamed urethane pad 15 may be executed by means of cutting device 77 fixed to the tool rest 18 (19). In the case where the foamed urethane pad 15 has a diameter smaller than the suction plate 16, an annular covering member may be placed on the outer peripheral portion of the suction plate 16 located radially outward of the foamed urethane pad 16, so that the air holes 16a open in the outer peripheral portion of the suction plate 16 is effectively closed by the annular covering member. The suction plate 16 may be modified so that only a portion of the suction plate 16 serving for suctioning the urethane pad 15 is provided with the air holes 16a. Alternatively, the communication grooves 16b formed in the suction plate 16 may be partially closed so that distribution of the suction force on the suction plate 16 is divided into local sections.

With the base for the foamed urethane pad 15 placed on the circular platen 1 as described above, the suction blower 25 is operated, whereby the base for the foamed urethane pad 15 is firmly fixed on the circular platen 1 by the suction force applied on the rear surface thereof. A predetermined revolution speed of the circular platen 1 about the C-axis during the grooving operation is set in advance to a suitable control device such as the NC device 102 and the sequential control device 110 so that every groove is cut at the same turning speed. The gate-shaped column 11, the saddle 8A (8B) and the tool rest 18 (19) are moved to be placed in their initial positions in the X-axis, Y-axis and Z-axis directions, respectively, under control of the suitable control device. In addition, radial positions of the respective generally concentric annular grooves are determined in the Y-axis direction depending upon the number of grooves cut into the surface of the foamed urethane pad 15 according to control program of the control device. A predetermined amount of displacement of the tool rest 18 in the Z-axis direction is set to the control device in advance so as to control an amount of depth of cut of the single edged tool 58. Thus, the cutting device is on standby. Upon starting cutting, the rotation of the circular plate 1 about the C-axis is started at the predetermined revolution speed. The cutting by tool 58 is started at the predetermined amount of depth of cut. Namely, the tool 58 executes a predetermined number of cuttings by the slight amount of depth of the cut, thereby cutting one fine annular groove into the surface of the base for the foamed urethane pad 15.

The tool rest 18 and the saddle 8A is subsequently displaced in the Y-axis direction so as to subsequently form the multiplicity of grooves. When the formed urethane pad has a relatively large area and a great number of grooves are required to be formed, the multi-edged tool 74 is preferably employed. The multi-edged tool 74 may consist of 10–30 single-edged tools juxtaposed to each other, for example. The use of the multi-edged tool 74 makes it possible to form a great number of grooves with high efficiency.

Meanwhile, the cutting of the grooves into the formed urethane pad 15 causes a problem of chips. Namely, the kind or shape of the cutting chip may vary depending upon materials of the base of the polishing pad pieces. For instance, the chips may be a powder form or a ribbon form. In particular, the cutting chip is likely to be electrically charged, and accordingly to be adhered to the urethane pad 15, the cutting tool, e.g., the single edged tool 58 or the like. This makes it difficult to assure a complete removal of the cutting chip by only executing air blowing. To cope with this problem, the grooving machine of the present embodiment is equipped with the ion blower. The ion blower is operated to discharge positive ions, which are charged enough to neutralize the chips, through the nozzle open in the vicinity of the cutting part of the tool 58, thus neutralizing the electrically charged chips by the positive ions, resulting in an desired removal of the cutting chips from the urethane pad 15 and the single-edged tool 58. Preferably, a nozzle of a suitable vacuum system is disposed in the vicinity of a cutting portion of the urethane pad so as to vacuum the cutting chips from the cutting portion, to thereby prevent undesirable disperse of the cutting chips. This arrangement is effective to execute the grooving process with high accuracy. The synchronization of the motions of the single cutting tool 58 in the Z-axis direction, the saddle 8A (8B) in the Y1 (Y2)-axis direction and the circular platen 1 about the C-axis enables to form a swirl groove on the foamed urethane pad 15. After the grooving process is terminated, the cutting device 71 may be usable to cut the circular urethane pad 15.

(j) Grid Patterned Fine Grooves

Referring next to FIG. 28, there is shown one example of a polishing pad having a plurality of grooves arranged in the grid pattern. This polishing pad is formed by cutting a multiplicity of straight grooves arranged in the grid pattern into the base for the polishing pad, e.g., the foamed urethane pad 15 having a thickness of 1.4 mm. Each of the straight grooves has a width of 0.8 mm, a depth of 0.5 mm and a pitch of 6.35 mm. For producing this grid grooved polishing pad, initially, the rotative tool unit 57 equipped with the milling cutter 81 is fixed to the tool rest 19 disposed on the saddle 8B, while the urethane pad 15 as a working piece is placed on the circular platen 1. Subsequently, the angular position of the circular platen 1 about the C-axis is detected, and then the circular platen 1 is held in its initial angular position, under control of suitable control device, e.g., the NC device 102 or the sequencer 110. For forming the grooves in the grid pattern, the circular platen 1 placed in its initial angular position is then rotated about the X-axis by 90 degrees to be held in its first processing angular position. The gate-shaped column 11, the saddle 8B and the tool rest 19 are moved to be placed in their initial positions in the X-axis, Y-axis and Z-axis directions, respectively, under control of the control device. A predetermined pitch of displacement of the gate-shaped column in the X-axis in the grid pattern is set in advance, thus eliminating a need for a surplus displacement of the tool rest 19 in the Y-axis direction.

With the circular platen 1 being held in its first processing angular position, and with the tool rest 19 held in its initial position, the process for cutting the grid-patterned grooves is initiated. The gate-shaped column 11 is subsequently moved in the X-axis direction by the predetermined pitch of displacement corresponding to the pitch of the grid-patterned grooves, each time one straight groove is formed, whereby a multiplicity of straight grooves extending parallel to each other are formed on the urethane pad 15. After a desired number of straight grooves is formed on the surface of the foamed urethane pad 15 positioned in the first processing angular position of the circular platen 1, the circular platen 1 is then rotated about the C-axis by 90 degrees so as to be placed and held in its second processing angular position. Then, a predetermined number of grooves are formed on the surface of the urethane pad 15 so as to extend parallel to each other and cross the previously formed grooves at right angles. Thus, the desired grid grooves polishing pad is obtained. Upon cutting the grooves on the foamed urethane pad 15 by using the milling cutter 81, the chips in the form of powder are produced and dispersed around the cutting part of the urethane pad 15 and are likely to be adhere to the urethane pad 15 and the milling cutter 81. Therefore, the above-described ion-blowing device 114 should be employed.

(k) Radial Grooves

The grooving machine constructed according to the present invention may form radially arranged grooves on the base for the polishing pad, e.g., the foamed urethane pad 15. Described more specifically, the circular platen 1 on which the foamed urethane pad 15 as the work piece is fixedly placed, is held in a processing angular position, and then the milling cutter 81 fixed to the tool rest 19 is moved by a predetermined amount in the Y-axis direction so as to form a single straight groove extending in a radial direction of the urethane pad 15. After the single radial groove is formed, the circular platen 1 is rotated by a predetermined angle so as to be held in a next processing angular position thereof. The grooving milling cutter 81 is moved again by the predetermined amount in the Y-axis direction so as to form another single straight grooves extending in a radial direction of the urethane pad 15. The above described reciprocating motion of the grooving milling cutter 81 in the Y-axis direction and the rotation of the circular platen 1 about the C-axis are repeated until a desired number of grooves are formed on the urethane pad 15. Thus, the polishing pad having the radial grooves is obtained. In this case, the use of the ion blower is preferable.

Figure 29:
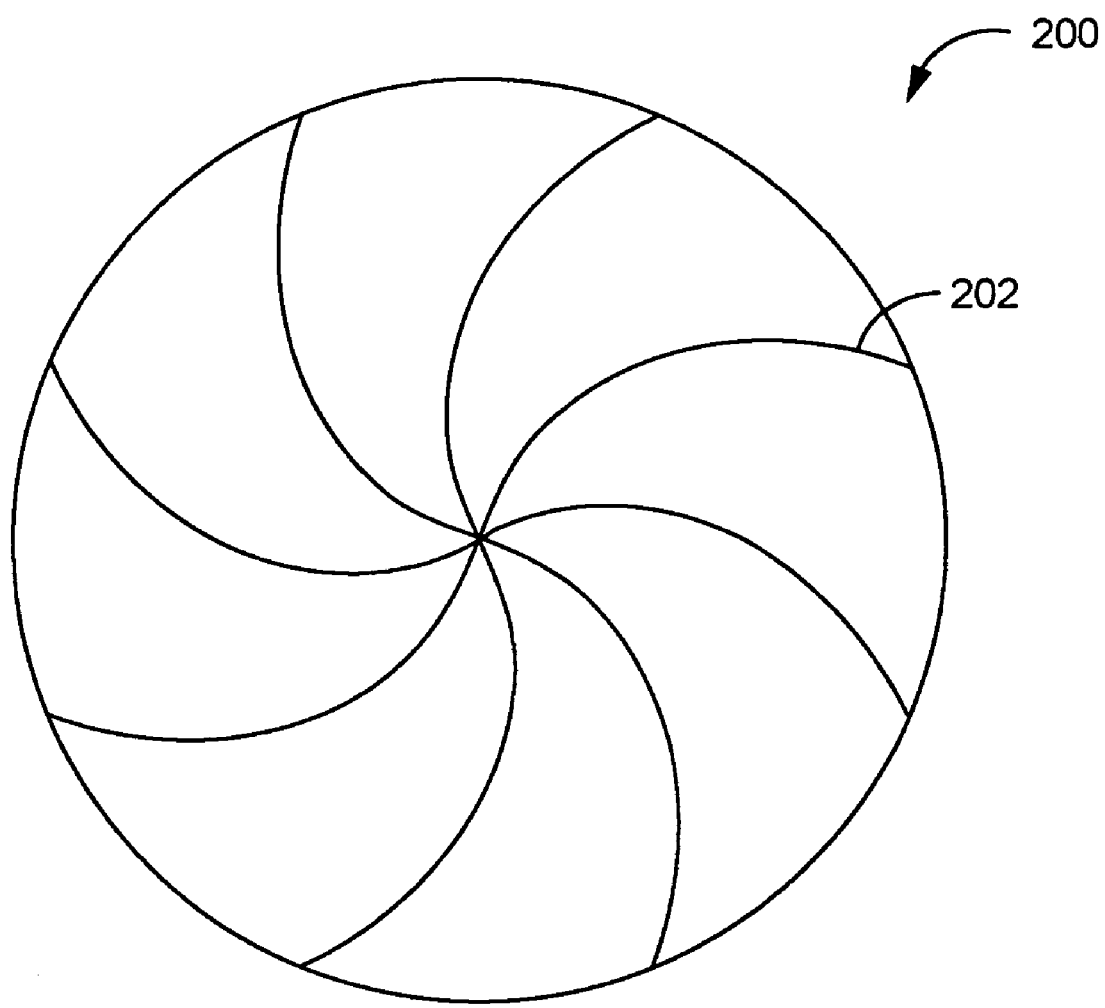
FIG. 29 is yet another example of polishing pad of foamed urethane having a plurality of grooves arranged in a radial pattern formed by milling process executed by the grooving machine of FIG. 1.

The above described radial grooves may be formed on the foamed urethane pad 15 which has a multiplicity of generally concentric annular grooves. Further the above-described radial grooves may be modified so as to form a polishing pad 200 constructed according to another embodiment of the invention, as shown in FIG. 29. The polishing pad 200 has curved radial grooves 202. To form this polishing pad, an known endmill (not shown) is fixed to the drill unit 65. The circular platen 1 is controlled to be rotated about the C-axis at a predetermined revolution speed and by a predetermined amount of angle, while being synchronized with the feed of the tool rest 19 in the Y-axis direction. Thus, the desired polishing pad 200 having curved radial grooves 202 is obtained.

(m) Drilling

The obtained polishing pads as described above, may be subjected to a drilling process as needed. The drilling process makes it possible to form a plurality of fine holes through the polishing pads. The drilling process may be performed on a working piece that is not subjected to any grooving process. In order to perform the drilling process, a special drill 82 is fixed to the drill unit 65 mounted on the tool rest 19, initially, Subsequently, the circular platen 1 is positioned about the C-axis, and the gate-shaped column 11, the saddle 8B and the tool rest 19 are respectively positioned in the X-axis, Y-axis and Z-axis directions. Then, the tool rest 19 is moved downwardly in the Z-axis direction by a predetermined amount of feed, assuring a predetermined amount of depth of cut of the drill 82. Thus, a desired hole is formed through the grooved urethane pad or the work piece.

The grooving machine may be operated under control of the suitable control device to form automatically the plurality of holes on the base for the polishing pad on the basis of coordinate values in the X, Y, and Z axes each representing a portion of the hole to be formed on the surface of the base for the polishing pad, which are stored in the memory of the control device in advance. Since the end of the drill 82 has a conical shape and has no cutting edge, the drill 81 is initially compresses the base for the polishing pad by the conical shaped edge, and then gradually cut the compressed part of the polishing pad by the cutting edge 58a formed in a body portion of the drill 81, whereby the drill 81 is able to be smoothly inserted into the inside of the base for the polishing pad. Thus, the drill 82 is able to form a desired hole even when the base for the polishing pad is made of a soft material, such as a foamed urethane. In the light of the fact that the working piece for forming the polishing pad has a relatively small thickness, the suction plate 16 may be formed with recesses at portions corresponding to the portions of the base for the polishing pad in which the holes is formed by drilling. The diameter of the recess is made larger than the diameter of the drill 81. This arrangement makes it possible to effectively guide the conical shaped edge of the drill 81, and to facilitate forming the through holes by drilling on the base for the polishing pad such as the foamed urethane pad. In the drilling process, the use of the ion blower is preferable for facilitating removal of the chips.

While the presently preferred embodiments of this invention has been described above by reference to the accompanying drawings, for illustrative purpose only, it is to be understood that the present invention is not limited to the details of the illustrated embodiments, but may be otherwise embodied.

For instance, single edged tool may be arrange to have a cutting part which is curved arcuately in its width direction. The opposite end portions of the curved cutting part may be protrude outward of an intermediate portions interposed between the opposite end portions in the width direction. The single edged tool may be otherwise arranged to have a tip portion being serrated, namely to have a saw-toothed cutting part. The side surfaces of the cutting part may be serrated, as needed.

While the grid patterned grooves are formed on the surface of the base for the polishing pad by using a milling cutter 81 in the grooving machine of the illustrated embodiment, the grid patterned grooves may be formed more efficiently by utilizing a single edged tool or a multi edged tool that is fixed to the tool rest 18 (19) that is reciprocally movable in the Y-axis direction at a relatively high speed, e.g., 50–180 m per minute. More specifically described, the grooving machine is modified such that the saddles 8A, 8B are reciprocally moved in the Y-axis direction by means of linear motors disposed so as to extend along the guide rails 9A, 9B, in stead of the ball-screw shafts 10, 14. The use of the linear motors enables the above-indicated high-speed reciprocal motion of the saddles 8A, 8B and the tool rest 18, 19 in the Y-axis direction, in comparison with the ball-screw shafts 10, 14 which permits the reciprocal movement of the saddles 8A, 8B at 10 m per minute at most. Thus, the modified grooving machine, which has the linear motors as a drive power source of the saddles 8A, 8B in the Y-axis direction, is capable of cutting the grid patterned grooves into the base for the polishing pad with significantly improved efficiency. In addition, the modified grooving machine utilizes the single or multi edged tool rather than the milling cutter 81. This arrangement is effective to prevent undesirable melt of the base of the polishing pad due to heat caused by frictional contact of the milling cutter 81 with the base for the polishing pad, depending upon kinds of materials of the base for the polishing pad.

It is also to be understood that the present invention may be embodied with various other changes, modification and improvements, which may occur to those skilled in the art, without departing from the spirit and scope of the invention defined in the following claims.

EXAMPLES

To further illustrate the present invention, there will be described some examples of the invention. It is to be understood that the invention is not limited to the details of these examples, but may be embodied with various changes, modifications and improvements, which may occur to those skilled in the art, without departing from the spirit and scope of the invention defined in the appended claims.

Figure 30:
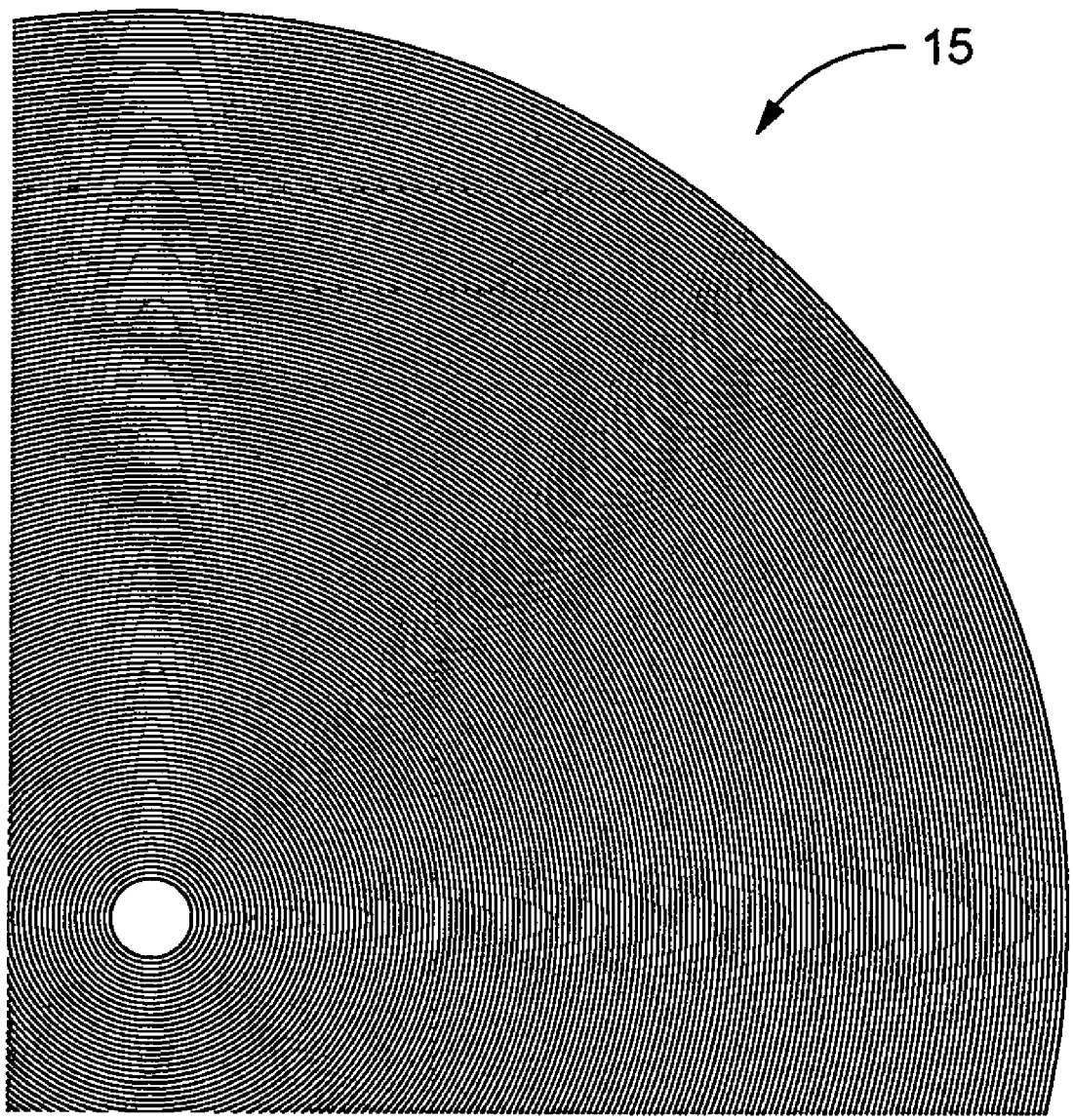
FIG. 30 is still another example of polishing pad of foamed urethane according to examples 1 and 2 by using the grooving machine of FIG. 1 equipped with the turning tool of FIG. 17.
Figure 31:
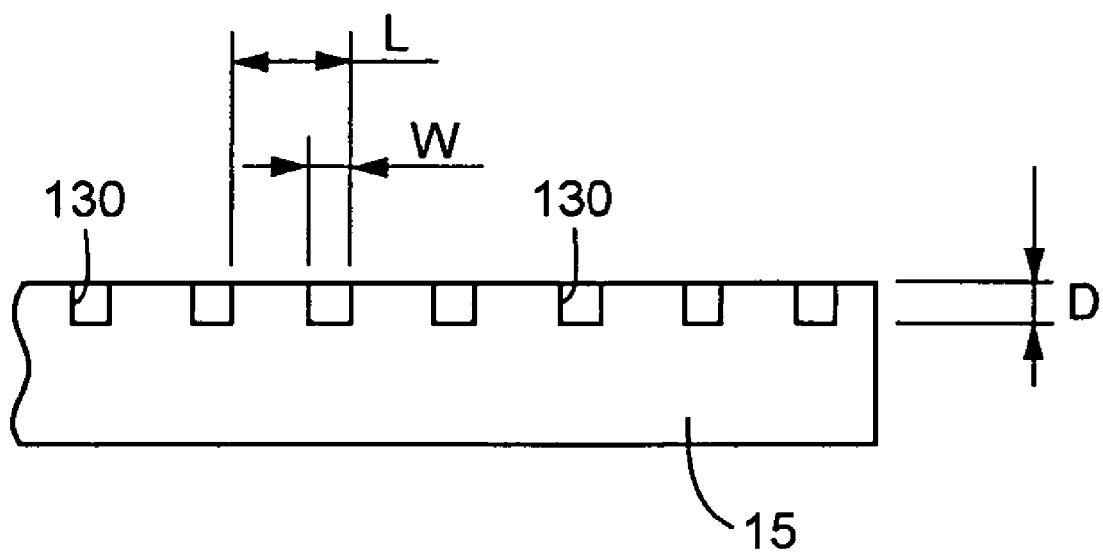
FIG. 31 is a fragmentally enlarged view in axial cross section of the polishing pad of FIG. 30.

There were prepared two specimens of the polishing pad according to Examples 1 and 2 of the present invention as shown in FIGS. 30, 31 by cutting multiplicity of generally concentric annular grooves 130 into surfaces of respective foamed urethane pads 15 by using respective multi-edged tools 74 each constructed according to the present invention as indicated in the following Table 1. Described in detail, each of the specimens of Examples 1 and 2 is formed by using the grooving machine of the present invention. The foamed urethane pad 15 attracted on the suction plate 16 of the circular platen 1 is rotated about the C-axis at a speed of 150 revolutions per minute, and the multi-edged tool 74 fixed to the tool rest 18 is cut into the foamed urethane pad 15 at a feed per revolution of 0.01 mm/rev. The prepared specimens of the polishing pad of the Examples 1 and 2 had grooves 130 whose dimension were held within a range of the invention, as indicated in Table 1.

On the other hand, specimens of the polishing pads constructed according to comparative examples 1 and 2 were prepared by using an optional multi-edged tool having a plurality of cutting parts whose shape does not meet the requirements of the present invention as indicated in Table 1. Each specimens of the polishing pad of the comparative examples 1 and 2 were formed in the same processing condition as described above with respect to the specimens of the Examples 1 and 2. Dimensions of the grooves 130 of the obtained specimens of the comparative examples 1 and 2 were also indicated in Table 1.

Figure 32A:
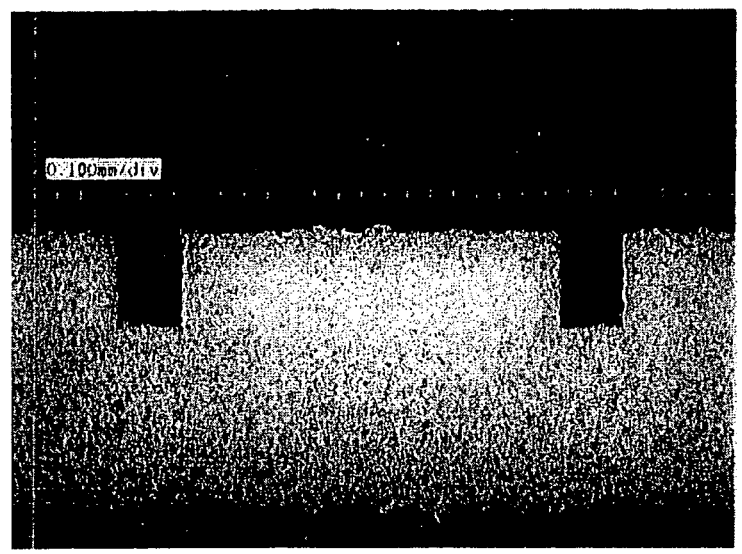
FIG. 32A is a microscopic photographic view of 30 times magnification and FIG. 32B is a microscopic photographic view of 100 times magnification, which shows a cross sectional shape of grooves of one example of a polishing pad of the present invention, which grooves are formed by using the turning tool of the present invention.
Figure 32B:
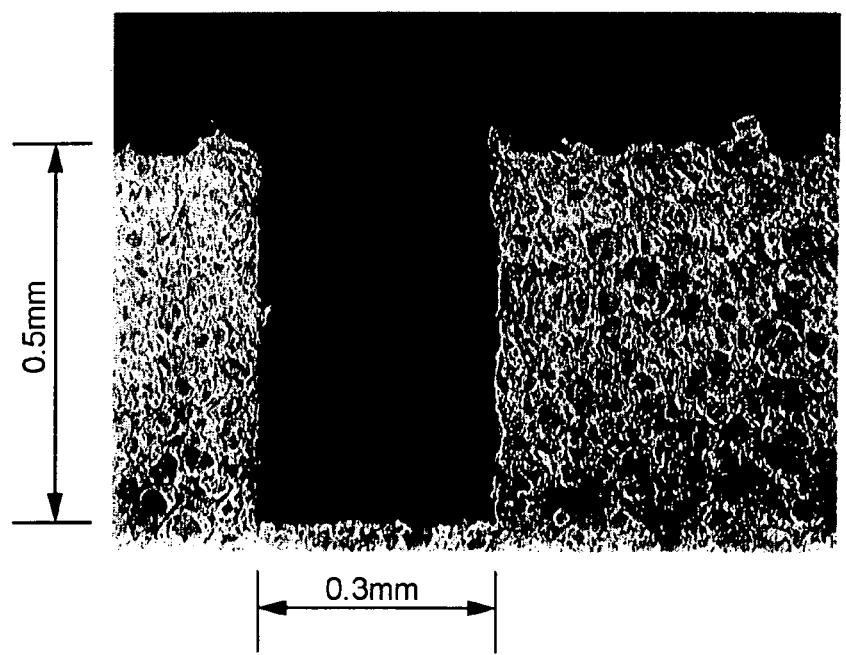
Figure 33A:
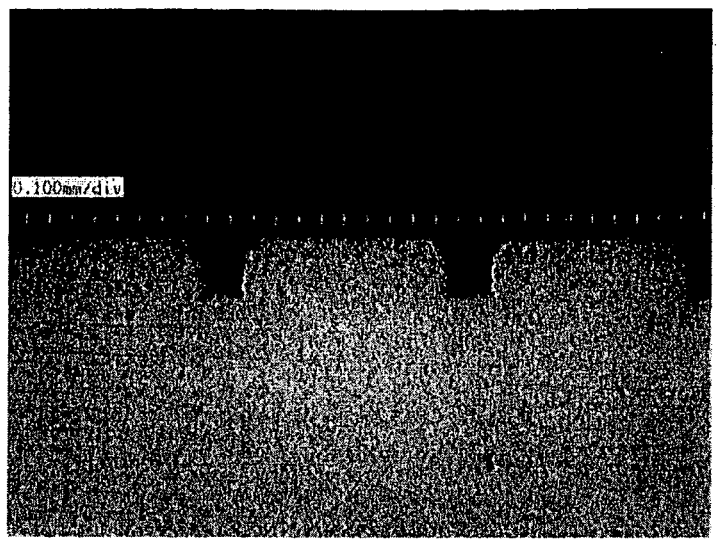
FIG. 33A is a microscopic photographic view of 30 times magnification and FIG. 33B is a microscopic photographic view of 100 times magnification, which shows a cross sectional shape of grooves of a comparative example of a polishing pad.
Figure 33B:
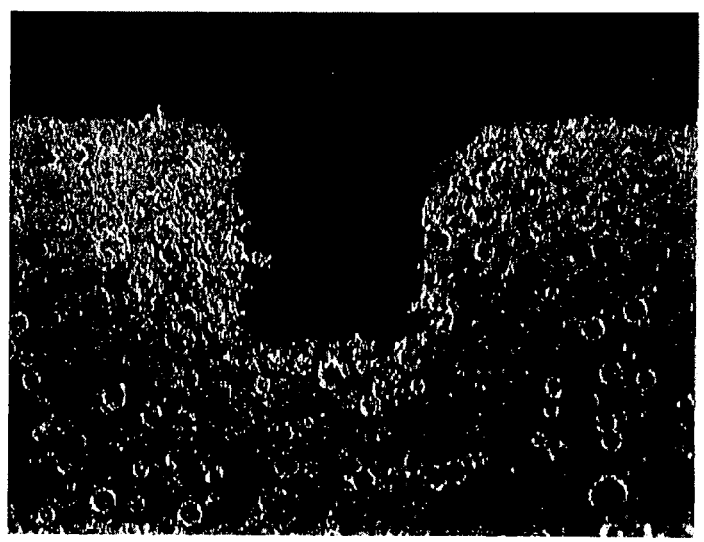
Figure 34:
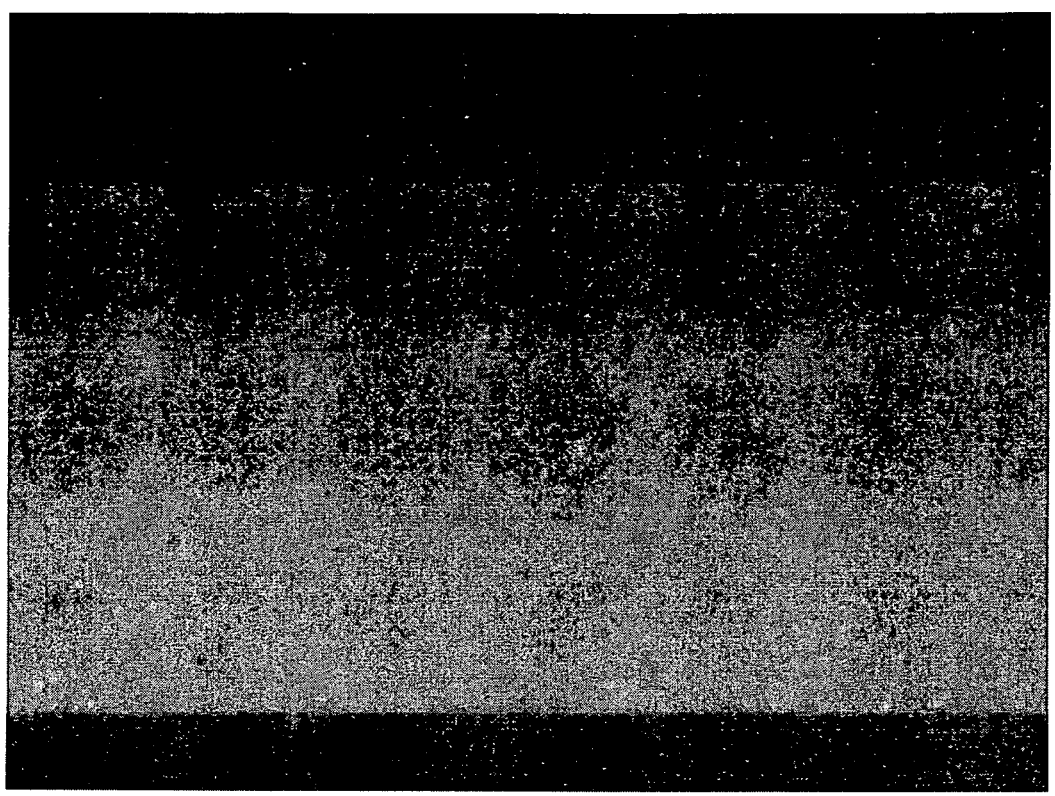
FIG. 34 is a microscopic photographic view of 120 times magnification showing a cross sectional shape of grooves of another example of a polishing pad of the invention.
Figure 35:
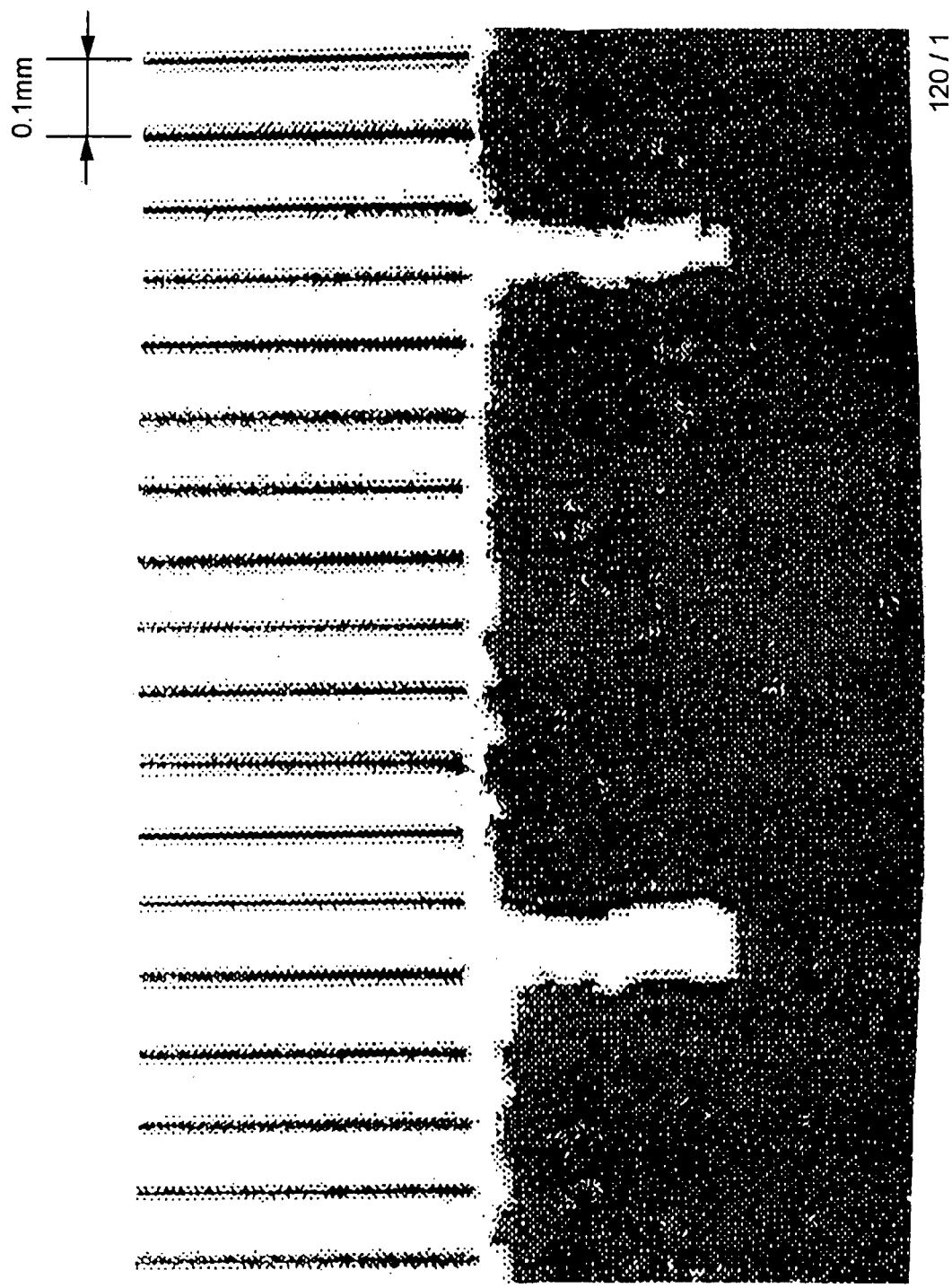
FIG. 35 is a microscopic photographic view of 120 times magnification showing a cross sectional shape of grooves of another comparative example of a polishing pad.

Microscopic photographic view of cross sections of the obtained specimens were obtained and evaluate qualities of the grooves 130 of the obtained specimens in terms of occurrence of burrs, occurrence of dulled edge of the grooves, and occurrence of raised portions on the surface of the pad. The results were also indicated in Table 1. It is noted that the evaluated grooves have radius of curvatures at around 50 mm. In this respect, FIG. 32A shows a microscopic photographic view of 30 times magnification and FIG. 32B is a microscopic photographic view of 100 times magnification in axial cross section of the groove formed on the polishing pad of the Example 1. On the other hand, FIGS. 33A, 33B correspond to the FIGS. 32A, 32B, in which the groove formed on the polishing pad of the comparative example 1 is shown in its axial cross section. FIG. 34 is a microscopic photographic view of 60 times magnification showing a cross sectional shape of a groove of the Example 2 of a polishing pad of the invention; and FIG.

35 is a microscopic photographic view of 120 times magnification showing a cross sectional shape of a groove of the comparative example 2 of a polishing pad.

TABLE 1

| | | Example 1 | Example 2 | Comparative Example 1 | Comparative Example 2 |
|---|---|---|---|---|---|
| Tool Shape | Tooth Width (mm) | 0.35 | 0.15 | 0.35 | 0.15 |
| | Wedge angle | 35° | 35° | 60° | 60° |
| | Front Clearance Angle | 45° | 45° | 20° | 20° |
| Groove Shape | Groove Width (mm) | 0.3 | 0.1 | 0.3 | 0.1 |
| | Groove Depth (mm) | 0.5 | 0.3 | 0.4 | 0.4 |
| | Groove Pitch (mm) | 2.0 | 0.5 | 1.1 | 1.0 |
| Groove Condition | Burrs | None | Almost none | Occurred | Occurred |
| | Dulled Edges | None | None | — | — |
| | Raised Portions | None | Almost none | Occurred | Occurred |
| Quality | Good/Bad | Good | Good | Bad | Bad |

Figure 36:
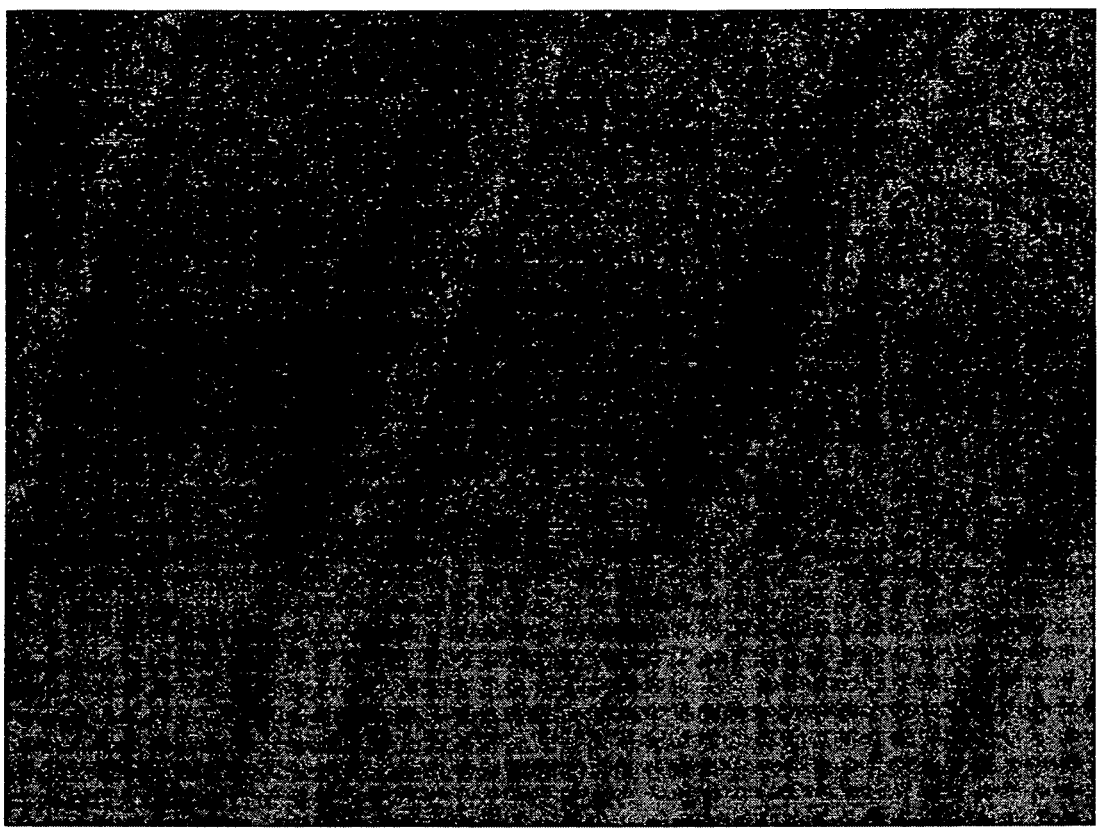
FIG. 36 is a microscopic photographic view showing grooves formed in a radially inner portion of a polishing pad of the present invention.

As is understood from Table 1, the polishing pads of the Examples 1 and 2 which were formed by using the multi edged tool 47 having cutting parts whose dimensions are held within a range of the invention, have a desired shape and never suffer from the problem of occurrence of burrs, dulled edges and raised portions. Therefore, the specimens of the polishing pads according to Examples 1 and 2 are capable of establishing a desired distribution of a slurry, and exhibiting a desired polishing effect. Further, the grooves 130 of the specimens of the polishing pads of Examples 1 and 2 were formed with high dimensional accuracy, thus eliminating or minimizing the conventionally experienced problem of variation in width of the grooves 130 after execution of the dressing process of the polishing pad. Further, the specimens of the polishing pads of Examples 1 and 2, have accurately dimensioned grooves at radially inner portions thereof as shown in FIG. 36. In FIG. 36, the grooves have radius of curvatures within at around 10 mm. Therefore, the specimens of the polishing pads of Examples 1 and 2 is able to minimize radially inner useless areas thereof.

On the other hand, the polishing pads of the comparative examples 1 and 2, which were formed by using the multi-edged tool having the cutting parts whose dimensions were not held within the range of the invention, suffer from occurrence of burrs and dulled edges. Therefore, the specimen of the polishing pad of the comparative examples 1 and 2 are incapable of exhibiting a desired polishing effect with stability, and are likely to suffer from variation in the width of the grooves after execution of the dressing process of the polishing pad.

Figure 37:
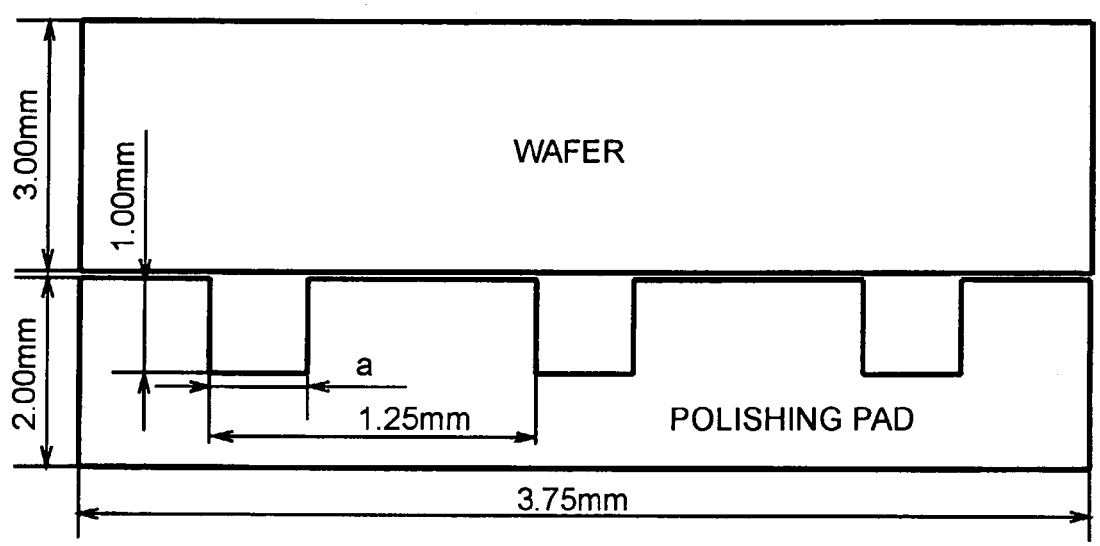
FIG. 37 is a view schematically showing a static model used in a simulation of relationship between a groove width variation and an abutting pressure variation of a polishing pad of the invention with respect to a wafer.

To further clarify technical advantages of the present invention, a relationship between variation in a groove width and a variation of an abutting pressure of a polishing pad with respect to a work, i.e., a wafer, were obtained by conducting a simulation using a static model as shown in FIG. 37. Where a groove width: "a" varies among four values: 0.2 mm, 0.2375 mm, 0.2625 mm and 0.3 mm while a groove pitch is made constant, a variation of the abutting pressure of the polishing pad applied on a surface of the wafer were calculated according to the finite element method. The obtained result as shown in graphs of FIGS. 38 and 39.

Figure 38:
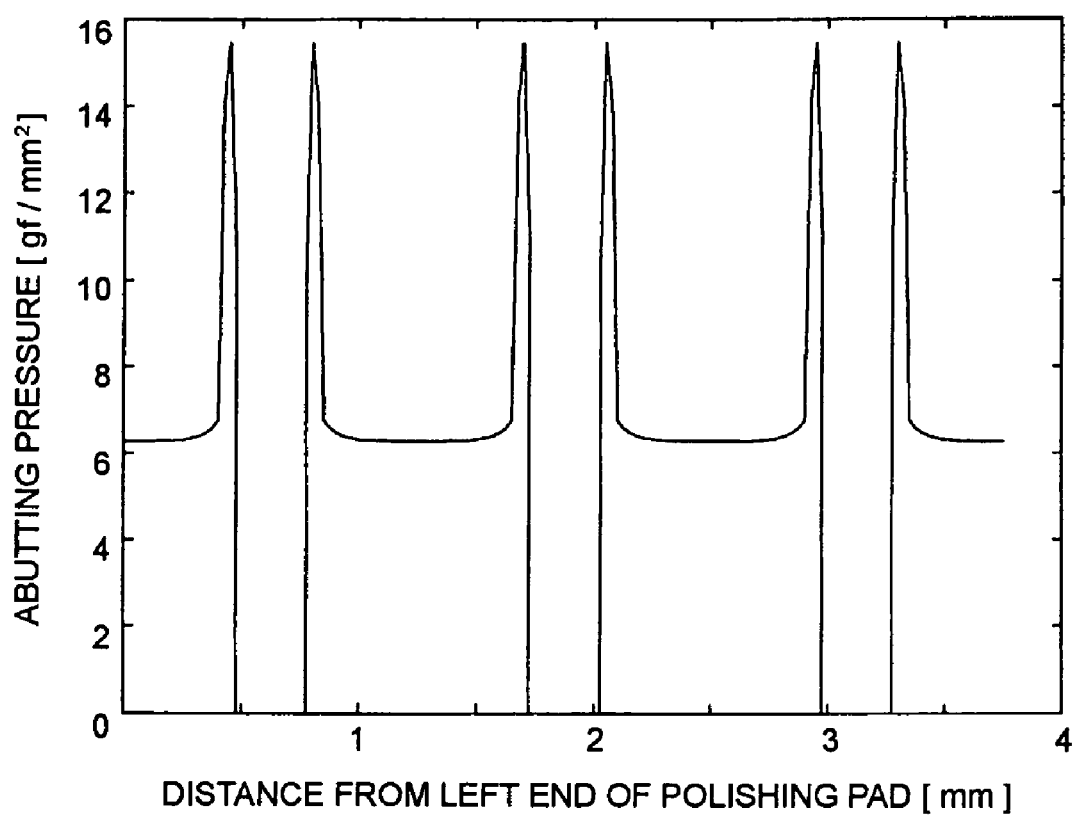
FIG. 38 is a graph showing a distribution of an abutting pressure of the polishing pad on a surface of the wafer of the static model of FIG. 37.
Figure 39:
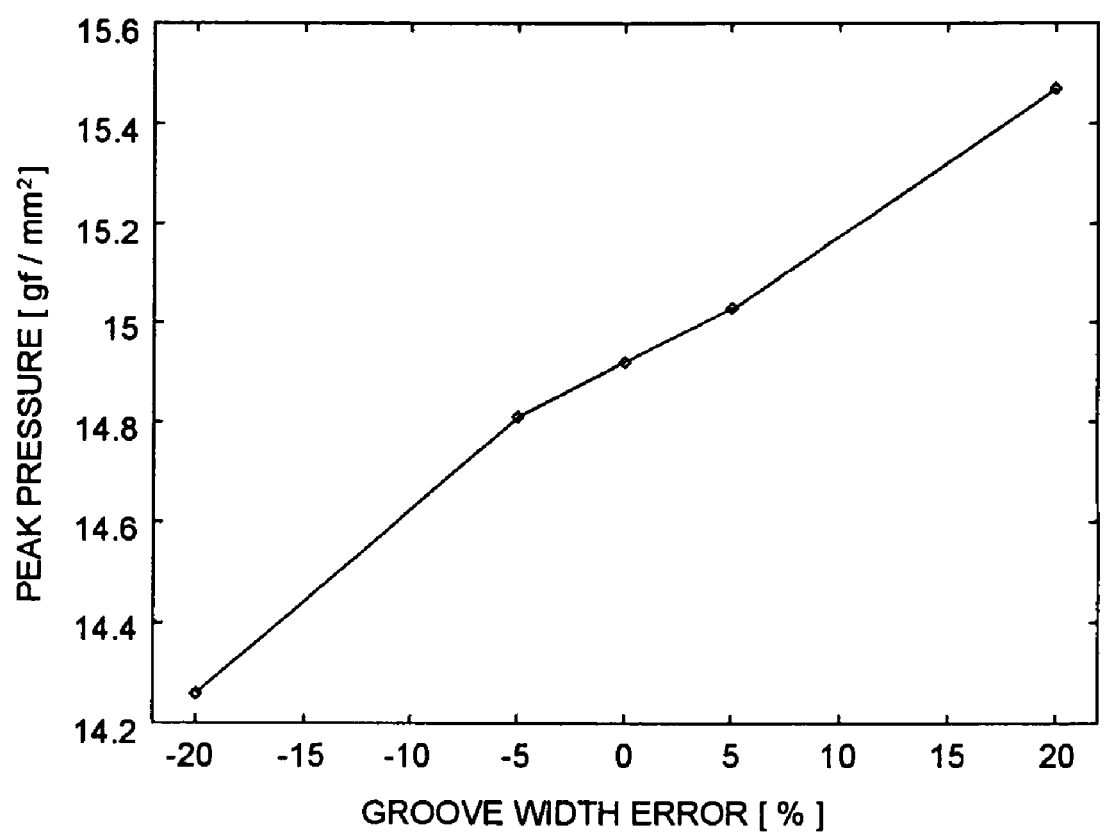
FIG. 39 is a graph showing a relationship between a peak pressure applied on the surface of the wafer and a rate of variation or error of a groove width.

As is understood from the graph of FIG. 38, the abutting pressure of the polishing pad applied on the surface of the wafer is significantly increased at open-end edge portions of each groove. Namely, a significantly high peak pressure is generated at the open-end edge portions of the each groove. As is also understood from the graph of FIG. 39, the peak pressure varies over 1.0 gf/mm$^2$ or more under the condition of a groove width variation or error of ±20%. In the case where the each groove has a relatively small width selected from a predetermined groove width range of 0.005–1.0 mm of the present invention, the groove width error of ±20% means a dimensional difference within a range of 0.002–0.40 mm. This clearly shows that a high dimensional accuracy of the grooves is significantly important to assure a desired polishing ability of the polishing pad with high stability. It should be appreciated that conventional technique for grooving the polishing pad is absolutely insufficient to form such a fine multiplicity of circumferential grooves on the base for the polishing pad with high dimensional accuracy. The aforementioned high dimensional accuracy of the grooving technique of the present invention should be appreciated as a prominence effect of the present invention, which is distinguishable from the conventional grooving techniques.

What is claimed is:

1. A method of producing a polishing pad formed of a resin material for polishing semiconductor devices, said method comprising a step of:
   cutting circumferential grooves into a surface of the resin polishing pad by using a turning tool including at least one plate-like shaped tool tip and at least one cutting part extending from one side of the at least one tool tip, wherein the at least one cutting part has a width within a range of 0.005–1.0 mm, a wedge angle within a range of 15–35 degrees, and a front clearance angle within a range of 65–45 degrees, for cutting circumferential grooves into the surface of the resin polishing pad.

2. A method of producing a polishing pad according to claim 1, wherein said at least one cutting part has a rake angle within a range of 20–10 degrees.

3. A method of producing a polishing pad according to claim 1, wherein said at least one cutting part has a side clearance angle with respect to a radially outer wall of each of said grooves, which is held within a range of 0–3 degrees.

4. A method of producing a polishing pad according to claim 1, wherein said at least one tool tip includes a multiple number of the cutting parts arranged in a predetermined direction and spaced apart by a pitch within a range of 0.2–2.0mm.

5. A method of producing a polishing pad according to claim 4, wherein the cutting parts are arranged in the predetermined direction with regular pitches.

6. A method of producing a polishing pad according to claim 4, wherein said cutting parts are integrally formed at one edge portion of said at least one tool tip so as to protrude outwardly from said one edge portion.

7. A method of producing a polishing pad according to claim 6, wherein said turning tool further includes a multiple number of said tool tips, said tool tips being fixedly arranged with each other so as to be aligned in a width direction thereof.

8. A method of producing a polishing pad according to claim 7, wherein said turning tool further includes a tool-tip holder detachably holding said tool tips.

9. A method of producing a polishing pad according to claim 1, wherein said turning tool further includes a multiple number of said tool tips, each of the tool tips having said at least one cutting part, said tool tips being detachably fixed to each other.

10. A method of producing a polishing pad according to claim 9, wherein said tool tips are superposed on and integrally fixed to one another with spacers interposed between the tool tips so that the spacers function to keep a pitch of said tool tips.

11. A method of producing a polishing pad according to claim 9, wherein said turning tool further includes a tip holder detachably holding said tool tips.

12. A method of producing a polishing pad according to claim 10, wherein said turning tool further includes a tip holder detachably holding said tool tips.

13. A method of producing a polishing pad according to claim 1, wherein said at least one cutting part has a serrated tip portion.

14. A method of producing a polishing pad according to claim 1. wherein said at least one cutting part has at least one serrated side surface.

15. A method of producing a polishing pad according to claim 1, wherein said at least one tool tip includes a multiple number of the cutting parts arranged in a predetermined direction and the cutting parts are spaced apart by a pitch given by integral multiples of a pitch of concentric grooves to be formed into the surface of the polishing pad.

16. A method of producing a polishing pad according to claim 1, wherein said at least one tool tip includes a multiple number of the cutting parts arranged in a predetermined direction and the cutting parts are spaced apart by double a pitch of concentric grooves to be formed into the surface of the polishing pad.

* * * * *